United States Patent [19]

Steffen

[11] 4,225,930
[45] Sep. 30, 1980

[54] PLANTER POPULATION MONITOR

[75] Inventor: David E. Steffen, Chatham, Ill.

[73] Assignee: Dickey-john Corporation, Auburn, Ill.

[21] Appl. No.: 939,605

[22] Filed: Sep. 5, 1978

[51] Int. Cl.² .................. G06F 15/20; G08B 21/00
[52] U.S. Cl. .................................. 364/555; 221/8; 221/13; 250/222 PC; 340/609
[58] Field of Search .............. 364/555; 235/92 DN, 235/92 FQ, 92 PK, 92 V; 250/215, 222 PC; 221/3, 6, 8, 13; 340/606, 609

[56] References Cited

U.S. PATENT DOCUMENTS

| | | | |
|---|---|---|---|
| 2,907,015 | 9/1957 | Young | 340/239 |
| 3,527,928 | 9/1970 | Ryder et al. | 235/92 |
| 3,537,091 | 10/1970 | Schenkenberg | 340/239 |
| 3,723,989 | 3/1973 | Fathauer et al. | 250/215 X |
| 3,912,121 | 10/1975 | Steffen | 221/13 |
| 3,927,400 | 12/1975 | Knepler | 250/222 PC X |
| 3,928,751 | 12/1975 | Fathauer | 235/92 DN X |
| 4,009,799 | 3/1977 | Fathauer | 221/3 |
| 4,085,862 | 4/1978 | Steffen | 221/8 |
| 4,122,974 | 10/1978 | Harbert et al. | 221/13 |

OTHER PUBLICATIONS

"Operator's Manual–Computer Scan Planter Monitor," Published by Hiniker Company, pp. 1-35, 2-1977.

Primary Examiner—Jerry Smith
Attorney, Agent, or Firm—Trexler, Wolters, Bushnell & Fosse, Ltd.

[57] ABSTRACT

A monitoring apparatus for simultaneously monitoring a plurality of functions of a machine, such as a multi-row seed plating machine, includes a programmed microprocessor. A plurality of sensors detect the machine functions to be monitored, and the microprocessor receives and stores data corresponding to the monitored functions from all of the sensors simultaneously. A user accessible control and display panel cooperates with the microprocessor to produce observable indications of the machine functions being monitored in accordance with the stored data as such functions are selected for display by the user accessible control panel. The microprocessor is further programmed to receive and utilize data inputs from the control panel, corresponding to machine parameters of the particular machine with which the monitoring apparatus is being utilized, and data corresponding to the desired maximum and minimum values of the functions to be monitored. Accordingly, the monitoring apparatus may be customized for the particular machine with which it is being utilized, and for giving an observable indication or alarm in the event the functions being monitored fail to fall within the selected maximum and minimum limits.

24 Claims, 9 Drawing Figures

PLANTER POPULATION MONITOR

BACKGROUND OF THE INVENTION

The present invention relates generally to novel monitoring apparatus, and more specifically to a novel monitoring apparatus for monitoring a plurality of functions of a machine. While the features of this invention are useful with different machines, the disclosure will be facilitated by addressing the specific problem of monitoring the planting of seeds by a multi-row seed planting machine.

As is well known, a farmer engaged in mechanized planting of seeds generally utilizes a planting machine pulled behind a tractor. One form of planting machine commonly used includes a plurality of seed planting units carried on a single frame for simultaneously planting a plurality of rows of seeds. With such multi-row planting equipment, it is often difficult for the farmer to monitor operation of all the planting units with any degree of accuracy. In this regard, it is also important to ascertain that all planting units are operating to achieve a desired seed population per acre, at least within reasonable limits. In order to determine seed population planted by each planting unit, as well as by the planting machine as a whole, it is necessary to determine the number of seeds planted by each planting unit of the planting machine, the ground speed of the planting machine, the number of rows being planted, and the row width or spacing between rows.

A number of prior monitoring systems have been proposed for monitoring seed population planted by a multi-row planting machine. Representative of these prior art systems are those described in the following U.S. Pat. Nos.: Fathauer et al 3,855,953; Steffen 3,912,121; Knepler 3,927,400; Fatheuer 3,928,751; and Steffen 4,085,862. While these prior art systems have proven particularly useful for the purposes and functions described therein, none is capable of simultaneously monitoring and storing information from all rows of a multi-row planting machine, while at the same time monitoring the distance travelled. It will be appreciated that such capability is particularly advantageous, in that the farmer can immediately ascertain the population currently being planted in any row, or, by the machine as a whole. In contrast, in the prior art system, to ascertain seed population for a given row, it was necessary for the farmer to first select the row (i.e., planting unit), and then wait for the apparatus to accumulate a seed count over a given distance for that row. Consequently, for a large planter, e.g. one having 12 or 16 planting units, the farmer would have to wait a corresponding number of distance intervals to ascertain the seed population being planted in all rows and only thereafter could he determine the population being planted by the machine as a whole. Collaterally, should one or more rows be malfunctioning or failing to achieve the desired seed population, the farmer might not become aware of the situation until a considerable amount of ground had been covered by the planting machine.

The advent of advanced electronic components, including such elements as microprocessor components and including electronic memory elements, has made possible rapid gathering, storage and retrieval of relatively large quantities of data. The present invention advantageously provides a programmed, special purpose microprocessor for simultaneously monitoring a plurality of functions of a machine such as a multi-row seed planter, and storing data corresponding thereto.

As will be more further detailed herein below, the use of a programmed, special purpose microprocessor also makes possible the storage of a plurality of data samples or data points taken of the various functions to be monitored at predetermined intervals. Such a plurality of data samples or data points are manipulated by the programmed microprocessor, to provide heretofore unavailable information to the operator. For example, the average of a plurality of data points or samples of a function being monitored may be displayed upon command. In a multi-row seed planting machine, such average values are obtained for a particular row, or for all of the rows being planted by the machine.

OBJECTS AND SUMMARY OF THE INVENTION

Accordingly, it is a general object of the present invention to provide a new and improved monitoring apparatus for simultaneously monitoring a plurality of functions of a machine.

A more specific object of the invention is to provide a new and improved monitoring apparatus especially adapted to monitor the seed population planted by a multi-row seed planting machine.

Another object is to provide a new and improved monitoring apparatus of the type described adapted to simultaneously receive and store seed population planted in all rows of a multi-row seed planting machine, and to provide therefrom useful output data in the form of observable displays or other indications, to assure the operator of proper functioning of the seed planting machine.

Briefly, in accordance with the foregoing, a monitoring apparatus in accordance with one aspect of the invention includes a special purpose computer operating in accordance with a predetermined program for simultaneously and continuously monitoring the seed population planted by all rows of a multi-row seed planting machine, and for producing observable indications of seed planting to an operator of said multi-row seed planting machine.

In accordance with another aspect of the invention, a monitoring apparatus is provided for simultaneously monitoring a plurality of functions of a machine. The monitoring apparatus includes a microprocessor operating in accordance with a predetermined program for simultaneously continuously receiving and storing data from a plurality of sensor means which detect the machine functions being monitored. User accessible control means including observable indicator or display means are coupled with the microprocessor, the microprocessor operating in accordance with the program and in response to commands from the control means to produce observable indications of the machine functions being monitored.

In another aspect of the invention, a monitoring apparatus is provided for use with a multi-row seed planting machine, which includes electronic circuit means for simultaneously continuously detecting the planting of seeds in all rows of the multi-row planting machine and storing a plurality of samples of this data, taken at predetermined intervals.

BRIEF DESCRIPTION OF THE DRAWINGS

Other objects, advantages and features of the present invention are described in more detail in the following description of the illustrated embodiment, taken together with the drawings, wherein.

DETAILED DESCRIPTION OF THE ILLUSTRATED EMBODIMENT

Figure 1:
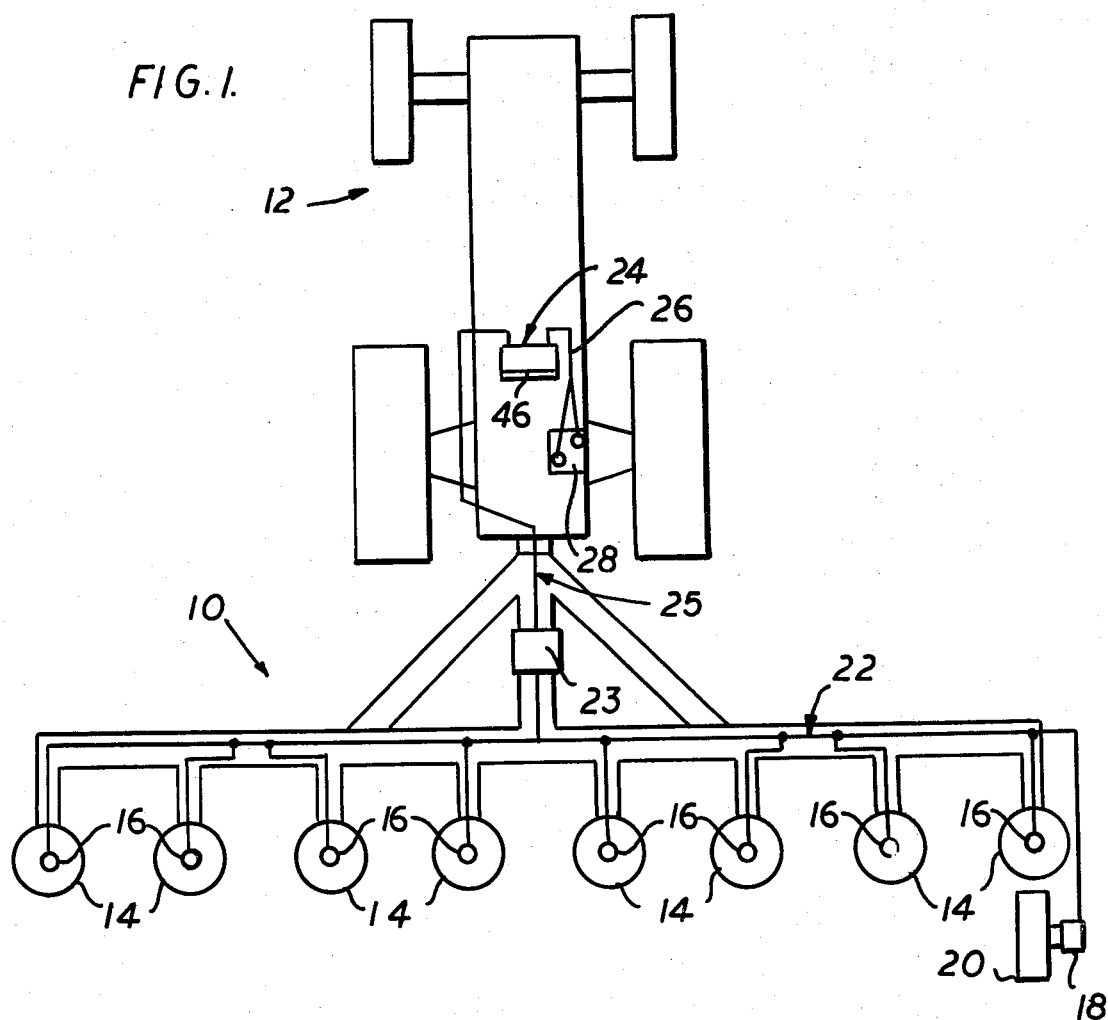
FIG. 1 is a plan view of a seed planting machine, partially in diagrammatic form, wherein the apparatus of this invention is advantageously incorporated.

Referring to the drawings, the present invention will be described in conjunction with a multi-row planting machine. However, no limitation is intended, the invention being useful in other applications as well.

FIG. 1 illustrates a mobile, multi-row seed planting machine 10, transported by a tractor 12, over a field to be planted. The planting machine or planter 10 may be of various known constructions and need not be described in detail. It suffices to state that the planter 10 includes a plurality of seed planting units or chutes 14, through which seeds are delivered to be planted in the ground. In the particular embodiment illustrated, the seed planting units or chutes 14 are eight in number. It will be understood, however, that the monitoring apparatus of the invention may be readily adapted for association with planters having any desired number of planting units or chutes 14. The planting units 14 may be of various known constructions and need not be described in detail.

The seed planting units 14 each have associated therewith a seed sensor 16, which is adapted to provide an output signal in response to the passage of a seed through the associated seed planting unit or chute 14. The sensor 16 forms no part of the present invention and will not be described in further detail. Suitable sensors for this purpose are described, for example, in U.S. Pat. Nos. 3,723,989 and 3,928,751 to Fathauer, and 3,974,377 to Steffen, all owned by the present assignee. The planter 10 also incorporates a distance or ground speed sensor 18, conveniently mounted adjacent to a wheel such as a press wheel 20 of the seed planter 10. This distance or ground speed sensor 18 also forms no part of the present invention and may comprise a tachometer or the like of known construction. The sensor 18 produces a given number of output pulses in response to a given number of rotations of, or to a given distance travelled by the wheel 20. Suitable cables, designated generally 22, electrically join the seed sensors 16 and ground speed or distance sensor 18 with a housing 23 mounted on the planter 10, which contains components of the monitoring apparatus of the invention. These components in the housing 23 in turn feed a control and display console 24 mounted on the tractor, via a cable 25. The console 24 is conveniently mounted on the tractor for viewing by the operator. This console 24 contains the remainder of the monitoring apparatus of the invention, and may be provided with suitable electrical operating power via a suitable cable or cables 26 from the tractor battery 28.

Figure 2:
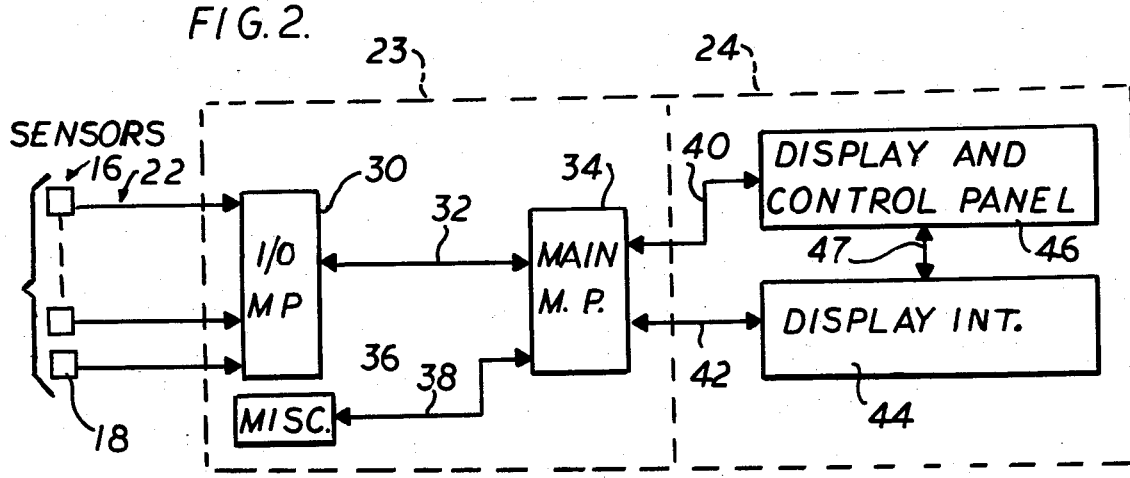
FIG. 2 is a block diagram of the monitoring apparatus of the present invention in conjunction with a plurality of sensors associated with the seed planting machine of FIG. 1.

Reference is now invited to FIG. 2, wherein the major components forming the invention are illustrated in block diagrammatic form. The seed sensors 16 and the ground speed or distance sensor 18 feed the monitoring components in the housing 23, which in turn feed the monitoring components of the console 24.

The components in the housing 23 and console 24 include a microprocessor, which will be described in detail herein below. Briefly, the microprocessor includes an input interface or input/output section 30 which receives the inputs from the sensors 16 and 18, and is joined by a bi-directional data transfer line or cable 32 with a main microprocessor section 34. Miscellaneous additional functions of the seed planting machine 10 may also be monitored at additional inputs or sensors 36, joined by bi-directional data transfer line 38 with the main microprocessor section 34. The main microprocessor section 34 is bi-directionally joined by lines 40 and 42, which form the cable 25 of FIG. 1, with elements of the console 24. These elements include display interfacing components 44 and an operator accessible display and control panel 46, bi-directionally joined by a line 47.

Figure 3:
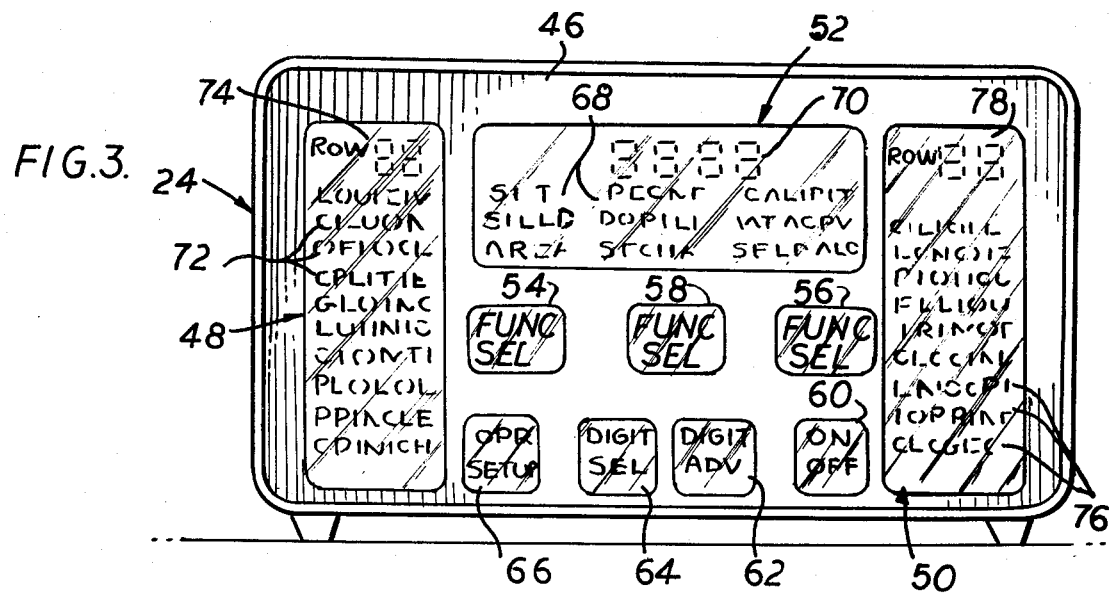
FIG. 3 is a front elevation of a control and display panel advantageously mountable for viewing by an operator of the seed planting machine of FIG. 1.

With reference to FIG. 3, the console 24 is illustrated in front elevation, revealing the display and control panel 46, as viewed by the operator of the tractor 12. Referring to the control and display panel 46 of FIG. 3, together with the block diagram of FIG. 2 the operation of the invention will now be described. The structural details of the components comprising the functional blocks of FIG. 2 will be described in detail later.

The main microprocessor 34 operates in accordance with a predetermined, stored program to continuously monitor and store the signals from all of the seed sensors 16 and from the distance or ground speed sensor 18. These signals are simultaneously received at the input interface 30 and fed to the main microprocessor 34, which calculates seed populations for each row therefrom. Advantageously, the main microprocessor is capable of storing in memory components, which will be described later, a plurality of these seed population calculations or seed counts from each sensor 16. These seed population calculations or seed counts are made, in accordance with the program, over successive, predetermined increments of distance travelled by the seed planter, as determined by the microprocessor from the input signals of the ground speed or distance sensor 18. The microprocessor is further responsive to operator input from the control panel 46, as will be described in detail later, for storing data or information corresponding to the configuration of the particular seed planting machine 10 with which the monitoring apparatus is being utilized. Thus, the monitoring apparatus of the invention may be customized for use with a particular seed planting machine such as the seed planter 10 of FIG. 1. For example, the microprocessor 34 is programmed to receive information or data corresponding to the number of rows, that is, the number of seed planting units or chutes 14 of the planter 10, and to the spacing therebetween. This data is also used by the microprocessor in calculating the seed population planted.

The display and control panel 46 includes a left-hand display portion or window 48, a right-hand display portion or window 50 and a center display portion or window 52. Function select (FUNC SEL) push-button control switches 54, 56 and 58 are associated with the left-hand display window 48, the right-hand display window 50 and the center display window 52, respectively. Additional controls include an on/off (ON/OFF) push-button switch 60, a digit advance (DIGIT ADV) push-button switch 62, a digit select (DIGIT SEL) push-button switch 64 and an operate/set up (OPR/SET UP) switch 66. The center display window 52 includes a plurality of words or symbols, designated generally 68, which are selectively back-lighted by operation of the function select control switch 58, to indicate selection of a particular function to be performed by the microprocessor. A four-digit display 70, in the middle display window 52, comprises four conventional 7-segment digit liquid crystal display characters, and is utilized to provide a display of the value of the currently selected planting machine function. The left-hand display window 48 includes a plurality of words or symbols, designated generally 72, selectively back-lighted by the operation of the function select control 54 to indicate selection of additional functions performed by the microprocessor. A two-digit display 74, also in the left-hand window 48, comprises a pair of conventional 7-segment liquid-crystal display characters, which together with a back-lighted word "ROW" adjacent thereto, are selectively lighted to indicate the row number for which a reading is being given in the display characters 70 of the center display window 52. The right-hand display window 50 also includes a plurality of back-lighted words or symbols, designated generally 76, similarly selectable by function select control 56 to indicate further microprocessor functions and to give malfunction indications to the operator. A similar two-digit display 78 together with a back-lighted word "ROW", is provided in the right-hand display window 50 to indicate the row number of the multi-row planter to which any energized display symbol 76 applies.

Initially, the microcomputer system is turned on by depressing the ON/OFF switch 60. In accordance with a feature of the invention, the microprocessor may be customized or programmed for use with a given planter 10 by depressing the OPR/SET UP control 66 to back-light a symbol "SET-UP" in the right-hand display window 50. Next, the FUNC SEL control 54 is depressed to back-light a symbol "LO FAIL SET", in the left-hand display window 48. In this mode of operation, the microprocessor will accept operator input for the lowest acceptable seed population or "low limit" of seed population to be planted. The display digits 70 of the middle window will be energized at this point, all reading zero. The operator may then actuate the DIGIT SEL control 64 to energize the digits 70 individually, depressing the DIGIT ADV control 62 to advance each energized digit to the desired number. Repeating this process with the DIGIT SEL and DIGIT ADV controls 64 and 62, the operator may then set in a number in the digital display 70 indicating the low limit seed population to be planted, in thousands. For example, a setting of 22.5 indicates a low limit seed population of 22,500 seeds per acre. Depressing the FUNC SEL control 54 will then light the symbol "HI FAIL SET" in the left-hand display window 48, whereupon the high limit of acceptable seed population may be set in, in the same fashion as for the low limit. For example, setting in a figure of 27.5 would indicate a high limit of acceptable population of 27,500 seeds per acre.

The microprocessor is provided with two memory compartments or registers for accumulating a count of area planted by the seed planting machine. The operator may utilize these two area counters or registers in any convenient fashion. For example, one register might be utilized to keep a count of the field area planted by the machine on a single day, or in a single field to be planted, while the other is utilized to accumulate a count of the total area planted by the seed planter over a planting season. In this regard, the function select push-button 54 may be depressed to selectively back-light symbols "FIELD AREA" and "TOTAL AREA" in the display window 48, thereby selecting the respective registers. The cumulative count in the selected register will then be displayed in the middle display digits 70, and the operator may use the digit select and digit advance controls 64 and 62 to set these counts to any desired starting point, in acres.

In accordance with another feature of the invention, the microprocessor is also programmed to selectively activate or de-activate any of the seed sensors 16. For example, when planting end rows of a field, the farmer may wish to use less than all of the seed planting units 14 of the planter 10. Alternatively, should a particular planting unit 14 or its sensor 16 be non-operational, the farmer would wish to exclude that particular unit or seed sensor from the monitor. Accordingly, the FUNC SEL 54 control may be depressed to light a symbol "ROW ON/OFF" in the right-hand display window 48. In this mode, a "ROW ON/OFF" symbol will also appear in the right-hand display window 50, and the symbol "ROW" and digits 74 of left-hand display 48 will be energized. By depressing the DIGIT ADV control 62, the row indicating digits 74 may be advanced sequentially from one up to the total number of rows or seed planting units 14 on the planter 10. As each row number is displayed, the operator may then depress the FUNC SEL control 56 to light either the "ON" or "OFF" symbol in the display window 50 thereby indicating that that particular row is either on or off for purposes of monitoring by the microprocessor.

The microprocessor may now be customized or programmed for the planter configuration by depressing the FUNC SEL push-button 54 to light a "NO. ROWS" symbol in the display window 48. This will also energize the "ROW" symbol and digits 74. The DIGIT ADV control 62 is then depressed to advance the digits 74 until the number of rows or seed planting units 14 of the planter 10 is indicated. The next depression of the FUNC SEL control 54 lights a "ROW SPACE" symbol in the left-hand display window 48 and energizes the digits 70 of the center display 52. The operator now utilizes the DIGIT SEL and DIGIT ADV controls 64 and 62, in similar fashion to that described above for setting the low and high limits, to set the display digits 70 to read, in inches, the spacing between rows as planted by the seed planting units 14, which number is set into the microprocessor.

In accordance with another feature of the invention, the microprocessor may be customized or programmed for giving an indication of the weight of seeds planted by the planter 10. This information is calculated from the seed count, and therefore the number of seeds per unit weight must be programmed into the monitor. This is done by again depressing the FUNC SEL control 54 whereupon a symbol "SEED/WT" is lighted in the display window 48, and the digits 70 of the display window 52 are energized. The operator then may utilize the digit select and digit advance controls 64 and 62 to set in the number of seeds per unit of weight. For example, if soybean seeds are being planted, the number of soybean seeds per one/tenth pound is set in.

In accordance with yet another feature of the invention, the microprocessor is programmed or customized in accordance with the particular type of distance or ground speed sensor 18 being utilized with the planting machine 14. This is done by further depression of the FUNC SEL control 54, which lights a symbol "DIST CAL" in the display window 48 and also symbols "SET" and "CALIBRATE" in window 52. Two methods are available for setting a suitable number in the digits 70. In the first method, the operator may determine by reference to a manual or the like provided with the distance sensing device, to ascertain how many pulses are produced by the sensor 18 per given distance of travel. From this information the operator must calculate the number of pulses per 200 feet of travel, and set this number by use of the DIGIT SEL, and DIGIT ADV push-buttons 64 and 62 in the same manner as for the previously described settings. In the second method, the operator measures off a 200 foot course and drives the planting machine 10 over this measured course. At the starting point of the measured 200 feet, the FUNC SEL control 58 is depressed, whereupon the CALIBRATE symbol will be energized and the display characters 70 will be reset to zero and begin accumulating the pulse count from the sensor 18. At the end of the measured 200 foot course, the operator again depresses the FUNC SEL control 58, which then energizes the SET indication and holds the number of pulses accumulated at that point on the display characters 70. This completes the customizing programming of the microprocessor for the particular seed planting apparatus 10 with which the monitor of the invention is being utilized.

Depression of the OPR/SET-UP control 66 will now display the symbol OPERATE in the display window 50, whereby the microprocessor is ready to begin monitoring of the planting operation. Depressing the FUNC SEL control 58 will cause display of the functions being monitored, as indicated by the lighting of appropriate ones of the symbols 68 in the center display window 52. In the illustrated embodiment, these available functions are designated as follows: SEEDS/AREA, wherein the display digits 70 indicate the number of seeds per unit area or seed population being planted, in thousands; DIST/SEED an SEEDS/DIST, wherein the display digits 70 indicate the seed spacing being planted in terms of inches per seed or its inverse, the number of seeds planted per foot; SPEED wherein the display digits 70 indicate the speed of the seed planting machine in miles per hour; AREA, wherein the digits 70 display the cumulative or total area planted, in acres; WT/AREA, wherein the display digits 70 indicate the weight of seeds planted per unit area, in pounds per acre.

Three additional functions are available in conjunction with the distance per seed, seed per distance, seeds per area and weight per area functions. These functions are selected by operation of the FUNC SEL control 54, to light the appropriate symbols in the display window 48. These functions are as follows: SCAN, wherein the collected and stored data for the seed planting units 14 are scanned, in a predetermined sequence, for display of the calculated figure (distance per seed, seeds per distance, seeds per area or weight per area, as selected) for each row in sequence; ROW SELECT, wherein the operator selects a particular row for display of the selected function, for as long as desired, by operation of the DIGIT ADV push-button 62 to indicate the number of the desired row for display in the row indicating digits 74 of the window 48; and AVG. ALL ROWS, wherein the selected function (distance per seed, seeds per distance, seeds per area or weight per area) has its value displayed for the cumulative average of all rows of the planting machine 10 as calculated by the microprocessor. In conjunction with the choice of the area function in the middle display window 52, the previously mentioned FIELD AREA or TOTAL AREA register contents may be displayed as selected by the FUNC SEL control 54.

The microprocessor is also programmed in accordance with a further feature of the invention to provide a number of failure or warning indications in the left-hand display window 50. These failure or warning signals will be displayed whenever the corresponding condition is detected in the seed planter 10, without regard for the function which has been selected for display in the center display window 52. Specifically, for every one/two hundredth of an acre travelled, any row or rows failing to fall within the present high and low limits will be displayed by row number in the digits 78 of the window 50, together with an appropriate symbol "HI" or "LOW", to indicate whether the detected population is above or below the preset limits. If more than one row fails to fall within the preset limits, the number of each such row will be shown for a predetermined time, consecutively followed by each other such row. At the same time, a symbol "WARNING" will also be energized in the display window 50. If any row or rows fall below a predetermined rate, which in the illustrated embodiment is two seeds per second, that row number will be displayed in the digits 78, together with a symbol "FAILED" in the display window 50. An audible alarm will also be sounded for this condition. In the same fashion as for the high and low limit warnings, if more than one row has failed in this latter fashion, the display will sequence through to show each failed row by number in the digits 78. Similarly, should the distance or ground sensor 18 fail to provide input pulses, a symbol "DIST INPUT FAILED", will be energized in the display window 50.

Figure 4:
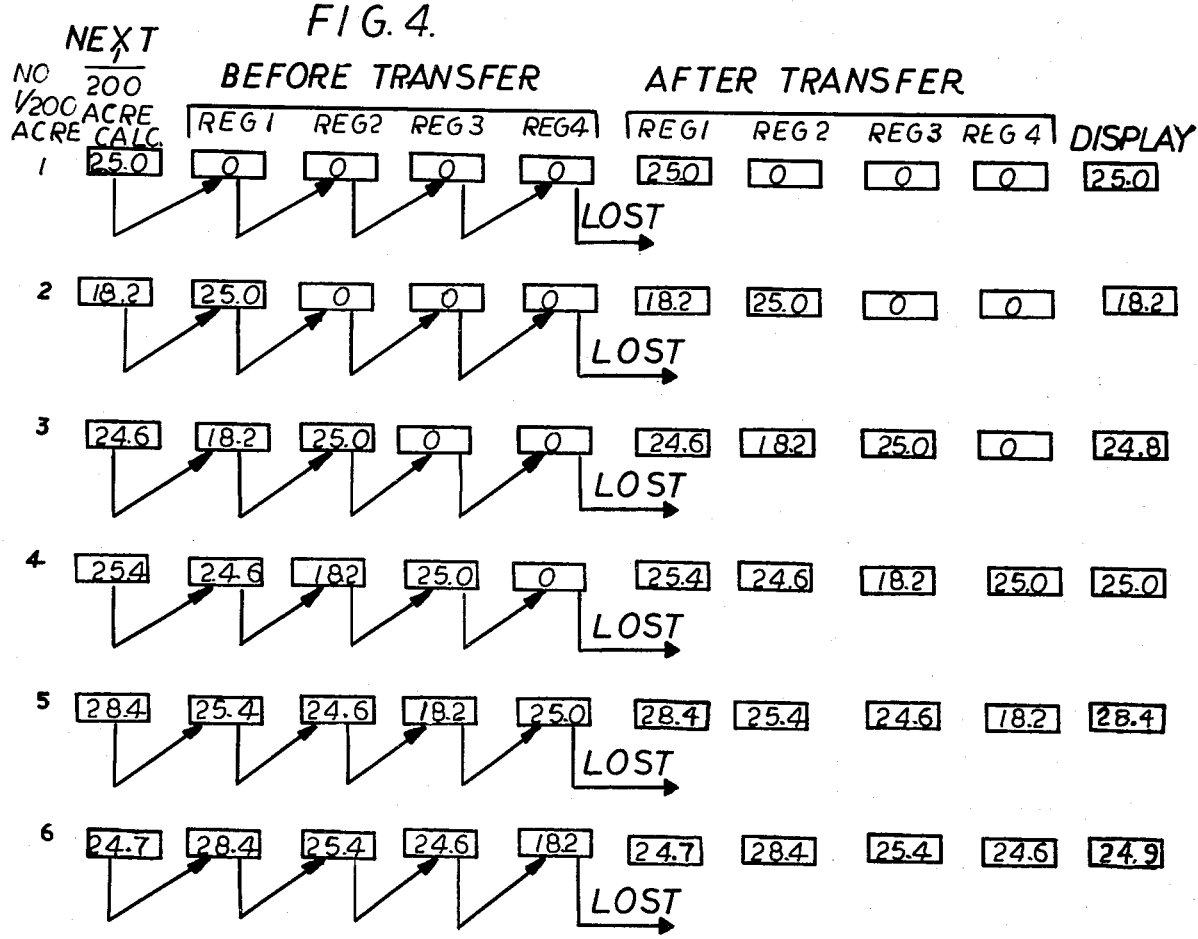
FIG. 4 is a diagram, in tabular form, illustrating one mode of operation of the monitoring apparatus, in accordance with advantageous features of the present invention.

In accordance with an important feature of the invention, the microprocessor 34 is programmed to provide an averaging or smoothing function for the population data calculated for each row of the seed planting machine 10. This operation is illustrated in tabular form in FIG. 4. In accordance with the program, the microprocessor operates to "update" or calculate a new seed population figure for all rows, for each 1/200 of an acre travelled by the planting machine 10, as determined from the distance or ground speed sensor 18 input. Referring to the horizontal lines of boxes of FIG. 4, in the illustrated embodiment, the memory or storage capacity of the microprocessor 34 includes storage space for four such successive population readings or calculations. In the table, the column headed "NO. 1/200 ACRES" gives the sequential number designation of the successive reading; the column headed "NEXT 1/200 ACRE CALC", gives an exemplary population calculation for the acreage increment indicated in the first column. The four storage positions or registers are shown in the columns headed "BEFORE TRANSFER" with their contents before the "NEXT 1/200 ACRE" calculation is entered, and in the columns headed "AFTER TRANSFER" after the "NEXT 1/200 ACRE" calculation has been entered. Finally, the column headed "DISPLAY" shows the value which the microprocessor displays in the digits 70 on the display panel 46. In the illustrated embodiment, the first horizontal line of FIG. 4 shows the first population calculation being taken, at initial start-up of the planter 10. The table of FIG. 4 illustrates the process for a single planting row or planting unit 14, it being recognized that the process is the same for each of the other planting units 14 of the planting machine 10.

Referring now to the first horizontal row of FIG. 4, in the first 1/200 of an acre the microprocessor has calculated a population figure of 25.0. In the illustrated embodiment, the population figures are calculated and displayed in thousands, whereby 25.0 corresponds to a population of 25,000 seeds per acre. Accordingly, the "BEFORE TRANSFER" column in the first horizontal row shows all zeros (0) in the storage positions, or registers ("REG. 1," "REG. 2," etc.). Referring to the "AFTER TRANSFER" column, the microprocessor has entered the value 25.0 in the first storage position or register ("REG. 1"), and, in accordance with the program, the population figure displayed is 25.0, corresponding to the first calculated population measurement. For purposes of illustration, it will be assumed that in this example the high and low limits preset into the microprocessor, as described above, are 22.5 and 27.5 respectively. These figures correspond to 22,500 and 27,500 seeds per acre population.

Referring to the second horizontal row, the microprocessor has calculated the population planted in the second 1/200 of an acre as 18.2 (18,200 seeds per acre). As indicated by the arrows, each number currently in the storage positions or registers is shifted over to the next storage position or register to the right, whereby the registers now contain, as shown in the "AFTER TRANSFER" column, 18.2, 25.0, 0 and 0, reading from left to right. In this case, the display digits 70 will show a population reading of 18.2, the microprocessor being programmed to display any calculation made which is outside of the preset high and low limits. It will be remembered that the right hand display window 50 will also be activated at this time to show the number of this row, and to display symbols indicating that the row is below the preset limit.

Referring now to the third horizontal row of FIG. 4, the third 1/200 of an acre calculation is 24.6. In similar fashion, as indicated by the arrows in the "BEFORE TRANSFER" column, the numbers in the storage positions or registers are all shifted one position to the right, whereby the zero in the right hand column is discarded, resulting, as shown in the "AFTER TRANSFER" column, in stored figures of 24.6, 18.2, 25.0 and 0. In accordance with its stored program, the microprocessor will now display, in the digits 70, the average of all readings thus far taken which are within the high and low preset limits, resulting in an average reading of 24.8, as indicated in the "DISPLAY" column.

Referring now to the fourth horizontal row, headed by the numeral 4 in the "NO. 1/200 ACRES" column, the next 1/200 of an Acre calculation is 25.4, and is entered into the storage positions or registers in similar fashion. Accordingly, the "AFTER TRANSFER" column now shows that all four of the storage positions, or registers, are filled, and the "DISPLAY" column shows the average figure 25.0, which is displayed on the digital characters 70 of the central display window 52. It will be remembered that this figure 25.0 is the average of all of the figures in the storage register which are within the high and low preset limits. Consequently, the figure 18.2, which is below the preset low limit (22.5) is disregarded for purposes of this average calculation.

Referring now to the next horizontal column, headed by the numeral 5, in the "NO. 1/200 ACRES" column, the next 1/200 of an acre calculation is 28.4. This figure is entered into the storage positions or registers, and the other figures move forward as previously described. It will be noted that the first taken calculation of 25.0 is now discarded from the last or right-hand most storage position, since the four storage positions, or registers, were filled on the previous reading. Since the population figure just calculated, 28.4, is above the preset high limit (27.5) this figure will now be displayed in the digits 70 of the central display window 52, together with the row number and symbol indicating a row exceeding the preset high limit, in the right-hand display window 50.

Referring finally to the last horizontal row, preceded by the numeral 6 in the "NO. 1/200 ACRES" column, the next 1/200 of an acre population calculation is 24.7. This figure is transferred to the first storage register, the other storage figures moving to the right by one position, and the oldest or right-most figure 18.2 being discarded, in the same fashion as described above. Accordingly, the "AFTER TRANSFER COLUMN" shows the contents of the four registers or storage positions as being 24.7, 28.4, 25.4 and 24.6. Accordingly, the average 24.9 is displayed in the digit 70. It will be remembered that this figure 24.9 is the average of the three figures currently stored which are within the preset high and low limits. From the foregoing it will be appreciated that the population displayed will be the average of those figures in the storage positions or registers which are within the high and low preset limits. However, in the case where a new 1/200 of an acre population figure is calculated which is outside of the preset high and low limits, that figure will be displayed for so long as it remains in the first storage position or register.

It will be appreciated that the calculation, storage and averaging process carried out with reference to FIG. 4 is simultaneously carried out for all of the planting units 14 of the multi-row seed planting machine 10. Accordingly, the display figures for all rows are available upon command from the operator control panel 46, selecting a particular row to be displayed, or calling for the microprocessor 34 to automatically scan through the rows, as described above.

Figure 5:
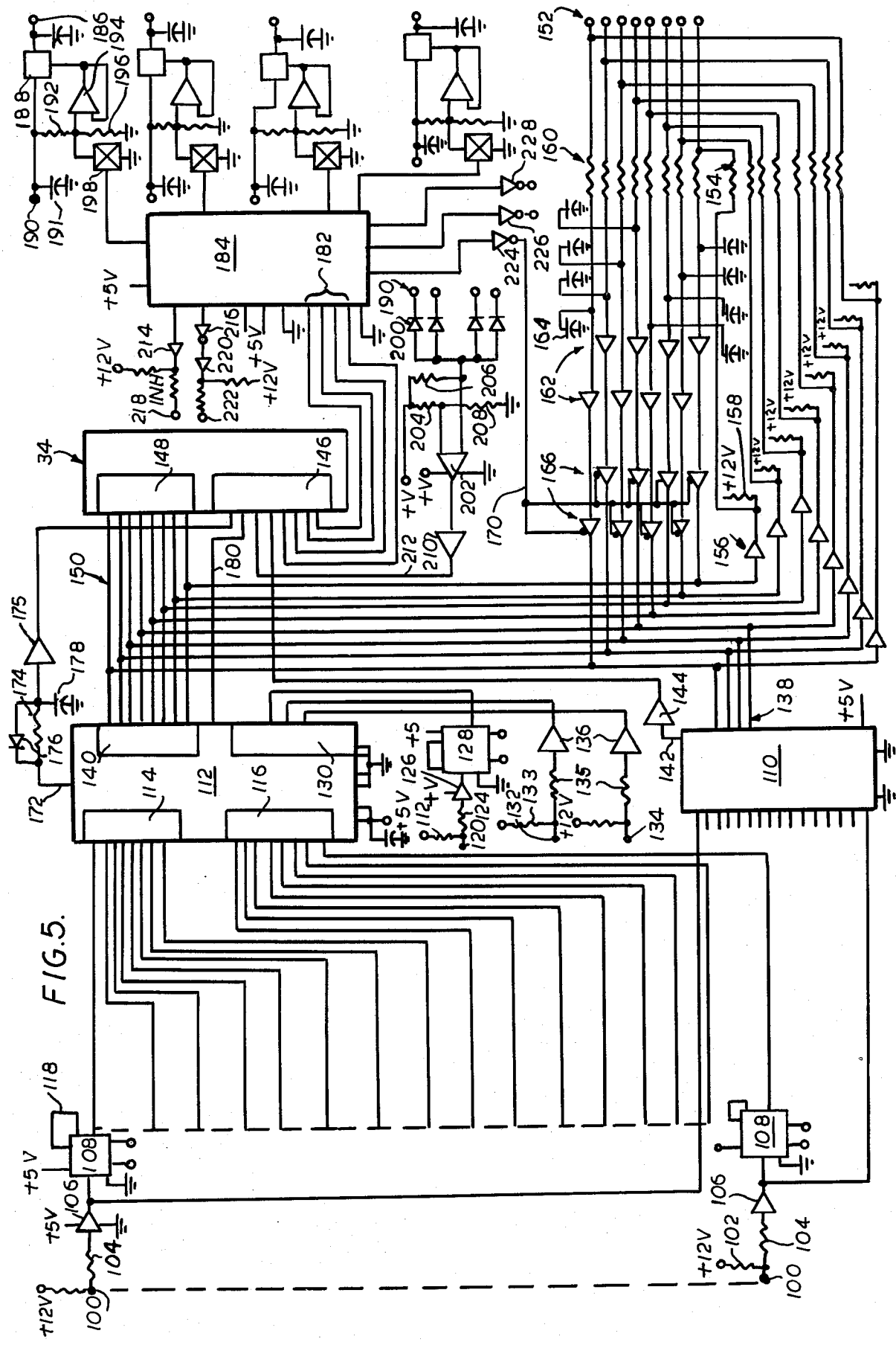
FIG. 5 is a schematic circuit diagram illustrating in additional detail, a portion of the monitoring apparatus of FIG. 2.

Referring now to FIGS. 5 through 7, the structural details of the functional blocks of FIG. 2 will now be illustrated and described.

Referring first to FIG. 5, the input interface circuitry 30 is shown in additional detail, together with the main microprocessor 34, which is again illustrated in block form. The lines 22 from the seed sensors 16 terminate in a plurality of terminals 100, each of which is provided with a pull-up resistor 102 to a positive voltage supply and a series resistor 104 feeding the input of a buffer 106. In the illustrated embodiment there are 16 such inputs 100 for accommodating planting machines of up to 16 row capacity. To facilitate clarity of illustration only the first and last circuit points 100 and associated components 102, 104 and 106 are illustrated, it being understood that one such set of components is joined with each sensor 16, via its associated line 22. Each of the buffers 106 feeds an input of a flip-flop integrated circuit 108, one such flip-flop integrated circuit 108 being provided for each seed sensor 16. The outputs of the buffers 106 also feed the respective inputs of an analog multiplexer/demultiplexer integrated circuit 110. In the illustrated embodiment the buffers 106 comprise integrated circuits of the type generally designated CD4050, the flip-flops 108 comprise integrated circuits of the type generally designated 74L74, and the analog multiplexer/demultiplexer 110 comprises an integrated circuit of the type generally designated CD4067. The Q outputs of the flip-flops 108 feed respective inputs of a circuit block designated generally 112, the first eight flip-flops 108 feeding the inputs of a port designated 114, and the last eight feeding the inputs of a port designated 116. Circuit Block 112 will be illustrated and described in detail hereinbelow. The $\overline{Q}$ outputs of the flip-flops 108 are tied back to their D terminals by respective lines 118.

The distance or ground speed sensor 18 feeds an input terminal 120, illustrated immediately below the circuit block 112. This input 120 feeds a circuit substantially identical to that associated with the seed sensor inputs 100, and comprising a pullup resistor 122, a series resistor 124 feeding a buffer 126 whose output drives a flip-flop 128. The Q output of the flip-flop 128 feeds one input terminal of a port 130 in the circuit block 112. A pair of similar input circuits emanating from circuit points 132 and 134 are provided with pullup resistors 133 to a positive voltage supply and series resistors 135 feeding buffers 136, whose outputs feed additional inputs of the port 130. These auxiliary inputs may be utilized to accommodate sensors for other functions associated with the seed planter 10.

The analog multiplexer/demultiplexer 110 is controlled by four control lines designated generally 138, which are driven from four terminals of a port 128, in the circuit block 34. The output terminal 142 of analog multiplexer/demultiplexer 110 feeds a buffer 144 which in turn feeds one terminal of a further port 146 in the microprocessor 34. A final port 148 in the microprocessor 34 has eight terminals, which are joined by data transfer lines designated generally 150 to eight terminals making up the port 140 of the circuit block 112. The first four of these eight data lines are those feeding the control lines 138 of the analog multiplexer/demultiplexer 110. The eight data lines 150 comprise bi-directional data lines, which both feed data to and receive data from eight terminals designated generally 152, at the lower right hand portion of FIG. 5. Each of the terminals 152 is fed from one of a plurality of series connected resistors 154, each of which in turn is fed from the output of one of a plurality of buffers 156. Each of the buffers 156 is provided with a pullup resistor 158 at its output to a positive voltage supply. Similarly, each of the terminals 152 feeds one of a plurality of resistors designated generally 160, each resistor 160 in turn feeding one of a plurality of buffers designated generally 162. The input of each buffer 162 is provided with a suitable capacitor 164 to ground. The buffers 162 each feed a one of a further plurality of buffers, designated generally 166, the buffers 166 feeding the port 148.

In the illustrated embodiment, the buffers 156 comprise components of integrated circuit packages of the type generally designated 7416, the buffers 162 are components of integrated circuit packages designated generally CD4050, and the buffers 166 comprise Tri-State buffers and are components integrated circuit packages of the type generally designated 74LS125. A common control line 170 feeds the control inputs of all of these latter buffers 166.

Referring again to the microprocessor 34, it will be remembered that the port 146 has eight input/output terminals. A first of these terminals is fed from a strobe output line 172 of the circuit block 112, via a circuit comprising a resistor 174 in series with a buffer 175. A diode 176 is connected in parallel with the resistor 174, its cathode being joined with the line 172 and it is anode with the input of the buffer 175, which input is also joined with a capacitor 178 running to ground. A second input/output terminal of the port 146 is joined by a line 180 to a control terminal of the circuit block 112. The last four input/output terminals of the port 146 feed four data inputs, designated generally 182, of a four-bit latch/four-to-sixteen line decoder 184, which in the illustrated embodiment comprises integrated circuit of the type generally designated CD4514. Four outputs of the integrated circuit 184 terminate, respectively, at four substantially identical voltage supply circuits. Only one such voltage supply circuit need be described in detail. The positive twelve volts obtained from the tractor battery, as will be detailed later, is fed to an input terminal 186, which feeds a positive five volt regulator 188, of the type generally designated 7805. The output of the circuit with regulator 188 provides a regulated positive eight volt supply at an output terminal 190. This output terminal 190 is also provided with a suitable smoothing capacitor 191 to ground. The output terminal 190 is also joined via a resistor 192 to the non-inverting input of an operational amplifier (op amp) 194, which in the illustrated embodiment is of the type generally designated 324. The inverting input of the amp 194 is joined with its output, which in turn is joined with a control terminal of the voltage regulator integrated circuit 188. The non-inverting terminal of the op amp 194 is also joined by a series resistor 196 to ground, and is fed from an output of a bilateral switch integrated circuit 198. An input terminal of the bilateral switch 198 is the point in the circuit fed from one of the above-mentioned output lines of the integrated circuit 184. The four regulated positive voltage supply output terminals 190 are fed to the cathodes of four diodes 200, as indicated by the repeated reference numeral 190, immediately below the integrated circuit 184. The anodes of these diodes 200 are joined together and feed the non-inverting input of an operational amplifier (op amp) 202, whose inverting input is fed by a series resistor 204 to a further positive voltage supply. A series resistor 206 also feeds the same positive voltage supply to the common anode terminals of the diodes 200. A resistor 208 joins the inverting input of the op amp 202 to the ground. In the illustrated embodiment, the op amp 202 is of the type generally designated 324. The output of the op amp 202 feeds a buffer 210, whose output feeds a line 212 which is connected to the third of the eight input/output terminals of the port 146 in the microprocessor 34.

Two of the remaining output lines of the integrated circuit 184 feed a buffer 214 and an inverter 216, respectively. The buffer 214 is provided with a pullup resistor to a positive voltage supply at its output and feeds an inhibit terminal 218 via a series resistor. The inverter 216 feeds a buffer 220 which has a similar pullup resistor to a positive voltage supply at its output and feeds a strobe terminal 222 via a series resistor. The remaining outputs of the integrated circuit 184 feed three inverters 224, 226, and 228. The inverter 224 feeds the control line 170 to the buffers 166. The inverters 226 and 228 feed a pair of terminals which are connected to the "clear" and "preset" terminals of the flip-flops 108.

Figure 6A:
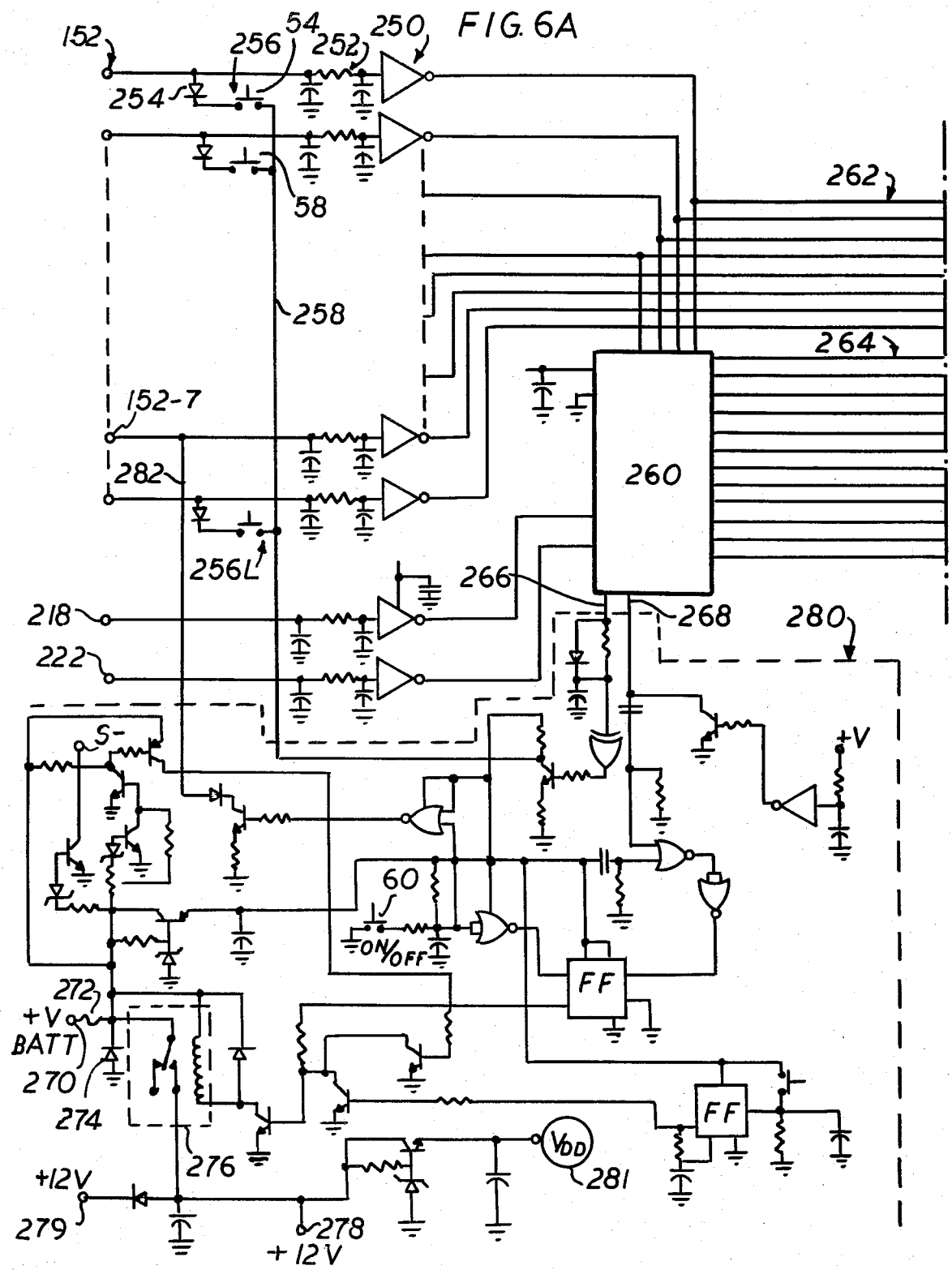
FIGS. 6A and 6B, taken together, form a schematic circuit diagram of a further portion of the monitoring apparatus of FIG. 2.
Figure 6B:
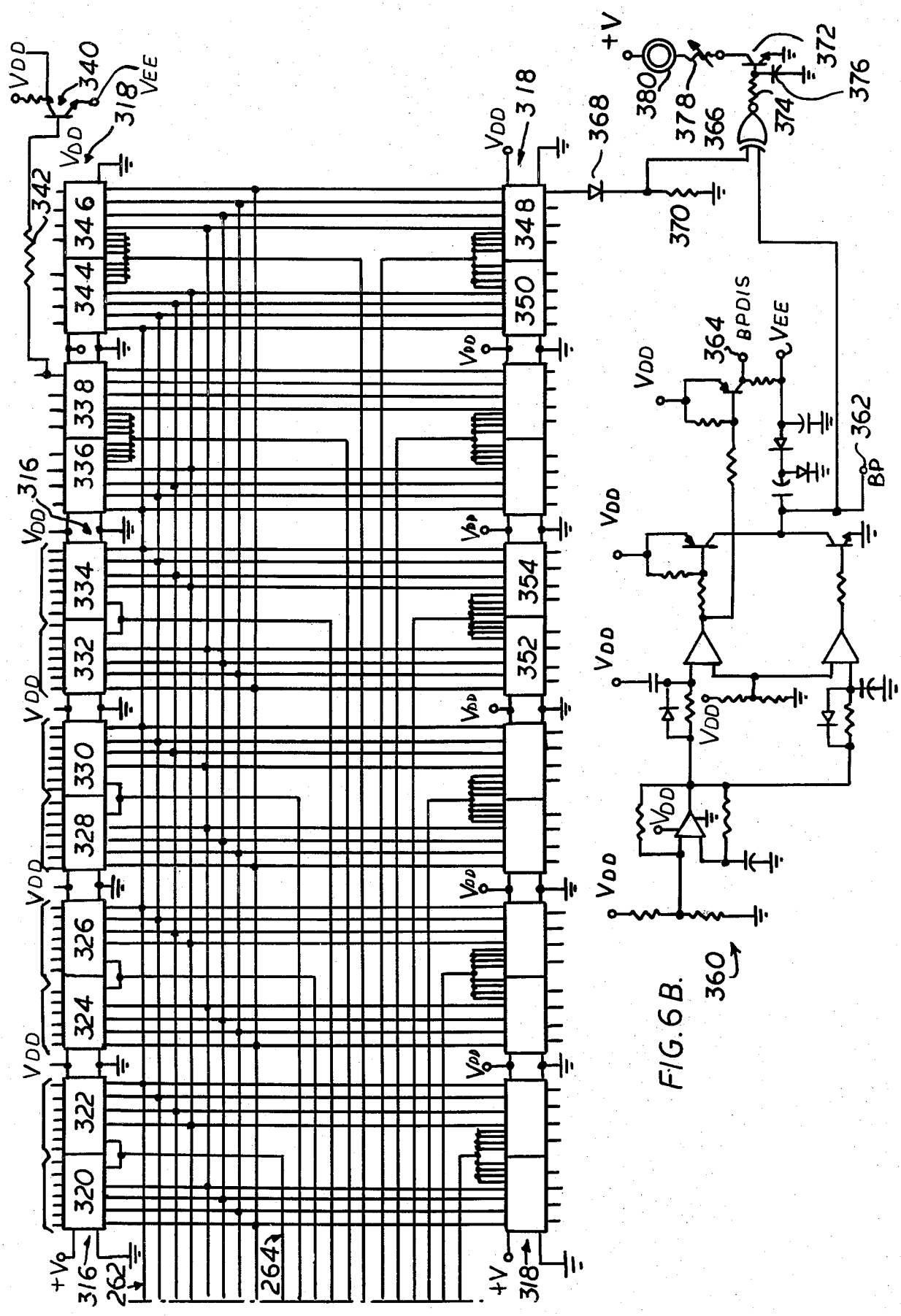

Referring now to FIGS. 6A and 6B, the display interface circuitry is illustrated. The terminals 152 of FIG. 5 are joined in the same order illustrated, top-to-bottom as indicated generally by reference numeral 152 in FIG. 6A. For clarity, only the first two and the last two of these terminals 152 and their associated components are illustrated, it being understood that the remaining terminals and associated components are substantially identical. The inhibit and strobe terminals 218 and 222 of FIG. 5 join the like-numbered terminals of FIG. 6A. Each of the terminals 152, 218 and 222 feeds one of a plurality of inverter buffers, designated generally 250, via one of a plurality of series connected resistors designated generally 252. Each of the resistors 252 has a capacitor at either side thereof running to ground. Additionally, each of the terminals 152 feeds the anode of one of a plurality of diodes, designated generally 254, whose cathodes each feed one terminal of one of a plurality of push-button switches, designated generally 256. The opposite sides or terminals of the push button switches 256 are joined in common with a line 258. It will be noted that the seventh one of the eight terminals 152, designated 152-7 is an exception to the above, in that it is not provided with a diode 254 and push-button switch 256. The first three of the push-button switches 256 comprises the push-button control switches 54, 58, and 56 respectively, of the control panel 46 of FIG. 3. The next three of the push-button switches 256 (not illustrated in FIG. 6A) comprise the digit advance, digit select and operate/setup push-button controls 62, 64 and 66 respectively, of the control panel 46 of FIG. 3. The last push-button switch 256, designated in FIG. 6A as 256 L comprises a rear panel control switch on the console 24 actuation of which causes the microprocessor 34, in accordance with the program, to convert all measurements taken from English to Metric system or vice versa.

The first four of the inverters 250 feed four inputs of a four-bit latch/four line-to-sixteen line decoder integrated circuit 260, which in the illustrated embodiment comprises the integrated circuit of the type generally designated 4514. Inhibit and strobe inputs of the integrated circuit 260 are fed from the last two of the inverters 250, which, it will be remembered, receive the inhibit and strobe inputs 218 and 222. The first eight of the inverters 250, which receive the terminals 152 from FIG. 5, also feed respective control lines designated generally 262. Twelve of the sixteen outputs of the integrated circuit 260 are utilized and are designated generally 264. Two of the remaining outputs of the integrated circuit 260 feed lines 266 and 268. The tractor battery positive 12 volt terminal is connected at a circuit point 270 which feeds a fuse 272. A suitable diode 274 has its cathode connected to the opposite side of the fuse 272 and its anode to ground. This opposite side of the fuse 272 so feeds the movable contactor of a relay 276, which relay is energized to feed two positive twelve volt output terminals 278 and 279, in response to actuation of the power on/off switch 60. The positive twelve volt terminal 278 feeds the terminals 186 of the voltage regulators 188 of FIG. 5. A "power up" logic system, designated generally 280, is provided in conjunction with the positive battery input terminal 270 and the power on/off switch 60. Remaining inputs to this logic circuit include the lines 266 and 268 from the integrated circuit 260, the line 258 from the switches 256, and a line 282 from the terminal 152-7. This circuit is illustrated in detail in FIG. 6A, and as it does not contribute to understanding of the invention, will not be described in detail herein.

Referring now to FIG. 6B, the lines designated generally 262 and 264 are the same as the like-numbered lines of FIG. 6A. These lines are connected with a plurality of liquid crystal display drivers, designated generally 316 and 318. The display drivers 316 comprise integrated circuit liquid-crystal display drivers of the type generally designated CD4056, and each drives one of the seven-segment digital display characters of the display panel 46 of FIG. 3. Specifically, the display drivers designated 320 and 322 drive the digits designated 74 in FIG. 3, the drivers 324, 326, 328, and 330 drive the digits designated 70 in FIG. 3, and the drivers 332 and 334 drive the digits designated generally 78 in FIG. 3. Accordingly, in the illustrated embodiment, the digital display characters 70, 74 and 78 all comprise seven-segment liquid crystal display components. The remaining drivers 318 comprise liquid-crystal display driver integrated circuits of the type generally designated CD4054, and are utilized to drive liquid crystal lighting panels for selectively back-lighting the function or mode indicating symbols described with reference to the display panel 46 of FIG. 3. Specifically, the display drivers 336 and 338 drive liquid crystal back-lighting units for the symbols in the left hand window 48, and for the symbols for operate and set-up modes in the left-hand window 50 of FIG. 3. With respect to the operate and set-up symbols, the last (right-hand) output terminal of the driver 338 drives the operate symbol back-light directly, and drives the set-up symbol via a circuit comprising a transistor 340 whose base terminal is joined to terminal 338 via a series resistor 342. The collector electrode of transistor 340 drives the set-up liquid crystal back-light. Transistor 340 is also provided with a collector resistor 344 to a positive voltage supply VDD and its emitter is connected to a suitable biasing voltage VEE. Further in this regard, the display drivers 344 and 346 selectively energize the liquid crystal back-lights for the symbols located in the display window 52 of the display panel 46 in FIG. 3. In similar fashion, the display drivers 348 and 350 selectively energize the liquid crystal back-lights for the symbols located in the display window 50. Further similar display drivers 352 and 354 selectively energize the remaining ones of the liquid crystal back-lights for the symbols in the display window 48. The remaining display drivers 318 are for energizing additional liquid crystal back-lights for remaining ones of the symbols in the three display windows 48, 50 and 52, and extra drivers 318 provide a capacity for driving additional such liquid crystal back-lights, for purposes of adding additional symbols and/or functions to the monitoring apparatus of the invention, if desired.

The circuit point 281, also labeled VDD in FIG. 6A, together with the circuit point labeled VEE of FIG. 6B provide suitable operating potentials for the display driver components designated generally 316 and 318 A circuit designated generally 360 provides a suitable potential at the circuit point VEE and suitable "display frequency" input signals (BP and BPDIS) at circuit points designated 362 and 364, for the display driver circuits 316 and 318 and for the seven-segment digital display elements. These signals and their derivation are known in the art for such display and driver components and need not be further described herein. The terminal 362 of the circuit 360 also provides one input to a two-input exclusive NOR gate 366, whose other input is received from one terminal of the display driver circuit 348, via a diode 368 and is held at suitable potential by a resistor 370. The exclusive NOR gate 366 feeds the base electrode of a transistor 372 via a series connected resistor 374, the base electrode also being provided with a suitable capacitor 376 to ground. The emitter electrode of transistor 372 is tied to ground, and the collector electrode thereof is connected via a variable resistor 378 to one terminal of an audible alarm 380, whose opposite terminal is connected with a suitable positive voltage supply. Accordingly, transistor 372 acts as a switch, in response to a suitable logic signal from the display driver 348, for energizing the audible alarm 380. The variable resistor 378 acts as a volume control. This audible alarm 380 is sounded in response to detection of a row failure, as described above, in addition to the energizing of the row failure symbol in the display window 50 of FIG. 3.

Figure 7A:
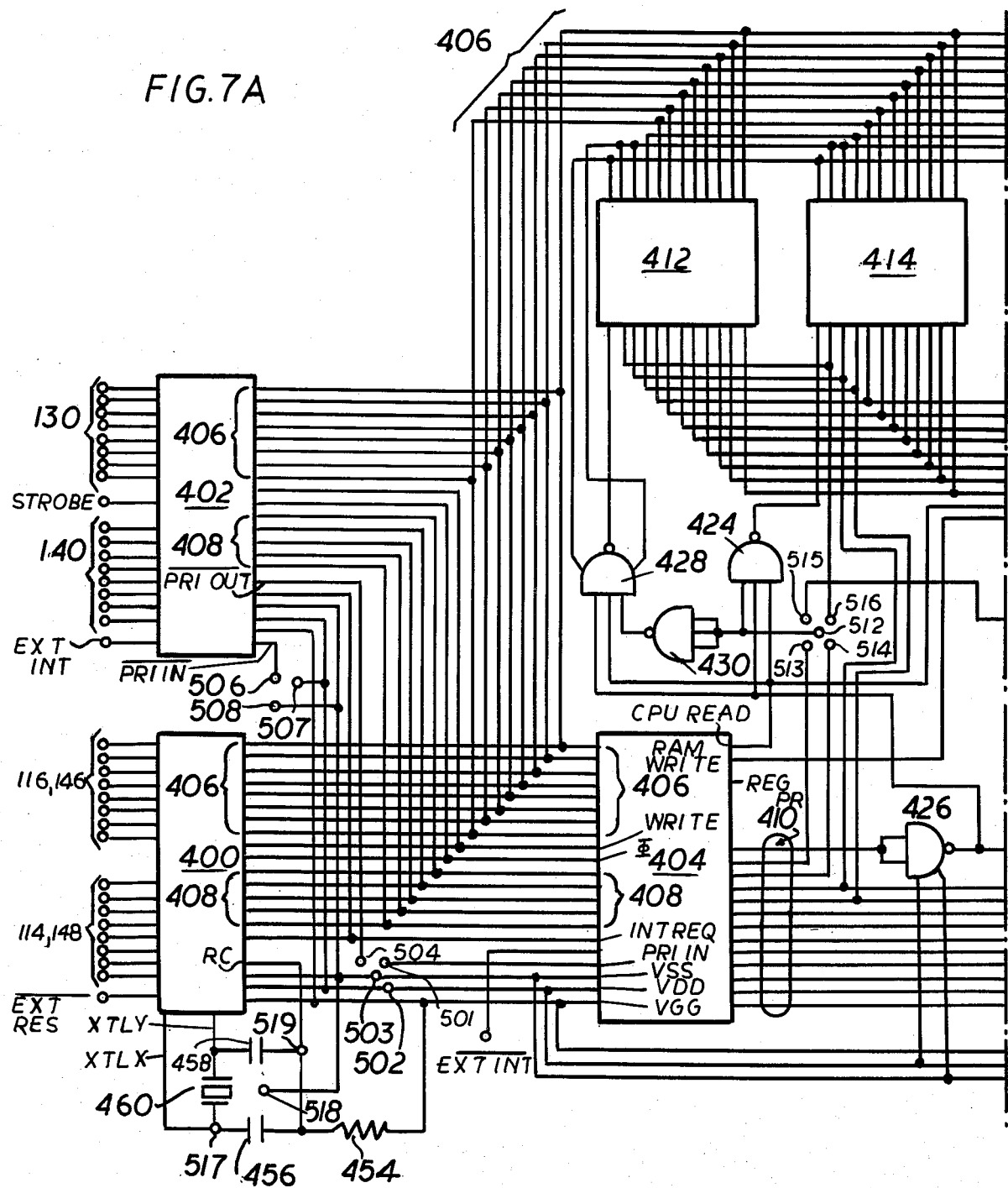
FIGS. 7A and 7B, taken together, form a schematic circuit diagram illustrating a portion of the circuit of FIG. 5 in additional detail.
Figure 7B:
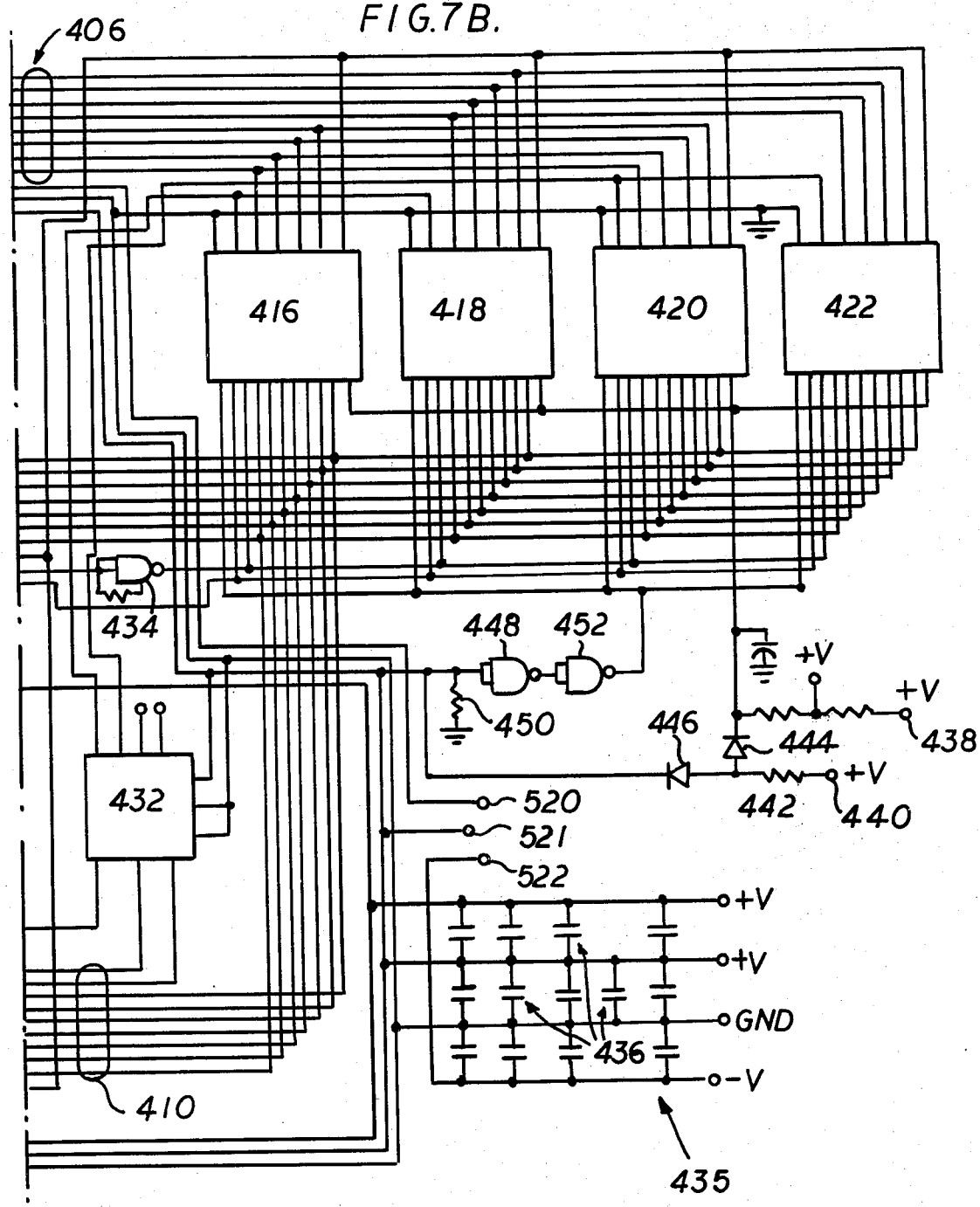

Referring now to FIGS. 7A and 7B, the structural details of the circuit block 112 and microprocessor 34 of FIG. 5 are shown. In the illustrated embodiment, the microprocessor 34 and the circuit block 112 of FIG. 5 are realized in a microprocessor system of the type generally designated F8 and manufactured by the Fairchild Corporation. The components utilized will be described briefly herein with reference to FIGS. 7A and 7B. Reference is also directed to the publications entitled "F8 Users Guide", and "Guide to Programming", Publications Nos. 67,095,665 and 67,095,664, copyright Fairchild Camera and Instrument Corporation 1976, both published by the Fairchild Micro Systems Division, 1725 Technology Drive, San Jose, California, 95110. These publications are hereby incorporated by reference.

Referring now specifically to FIG. 7A, the terminals of the ports designated 114 and 148, and the terminals of the ports designated 116 and 146, in FIG. 5, form input-/output ports of a central processing unit (CPU) 400. In the illustrated embodiment, the CPU 400 comprises a central processing unit of the type generally designated 3850 and manufactured by the Fairchild Corporation, as described in the above-referenced publications. In similar fashion, the terminals of the ports designated 130 and 140 in FIG. 5 are connected as shown to form input-/output ports of a peripheral input/output unit (PI/O) 402. In the illustrated embodiment, this PI/O 402 is of the type generally designated MK3871 and manufactured by the Mostek Co. Publications describing this component 402 are also generally available to the public. A static memory interface (SMI) 404 comprises a static memory interface integrated circuit component of the type generally designated 3853, manufactured by the Fairchild Corporation, and also described in the above-referenced Fairchild Publications.

Briefly, the microprocessor system of FIG. 7A includes eight bi-directional data transfer or data bus lines, designated generally 406, which are interconnected between the components 400, 402 and 404 as illustrated, for the bidirectional transfer of data therebetween. A group of five control lines, designated in the literature as ROMC lines are designated generally by reference numeral 408, and are interconnected between components 400, 402 and 404 as illustrated. Remaining control lines of the microprocessor components 400, 402, and 404 are designated in accordance with the terms utilized therefor in the above-referenced Publications. It will be understood that like-designated terminals are interconnected as illustrated among the three microprocessor components 400, 402 and 404.

The SMI 404 is also provided with a plurality of output address lines, designated generally 410. These address lines 410 are joined via suitable logic to a plurality of electronic memory devices, 412, 414, 416, 418, 420 and 422, for addressing the contents thereof in accordance with commands from the central processing unit 400. These memory devices 412, 414, 416, 418, 420 and 422 also comprise a part of the microprocessor system of the invention. The memory devices 412 and 414 comprise programmable read-only memories (PROM's) of the type generally designated 2708 or 2716, and manufactured by Intel. These memories are utilized for storing the microprocessor program. The remaining memory components 416, 418, 420 and 422 comprise random access memories (RAM) of the type generally designated 5101 and manufactured by Intel.

The bi-directional data bus lines 406 are interconnected with the memory component data lines to facilitate bi-directional transfer of data between the memories and the microprocessor components 400, 402 and 404. This transfer of data accomplishes the execution of the program, in the case of the memories 412 and 414, and the receiving and storage data from the sensors, the performing of required calculations, and the providing of data to the display, in accordance with the operation of the invention as described above. Suitable positive and negative voltage supplied are provided for the microprocessor and memory components. Suitable logic components are interconnected with the address lines 410 and the memories to facilitate the described transfer of data. Specifically, a "CPU READ" output of the SMI 404 feeds one input of a three-input NAND gate 424 whose output feeds a "CS/WE" control input of the PROM 414. The uppermost one of the address lines 410 feeds both inputs of a two input NAND gate 426 whose output feeds a second input of the NAND gate 424 and a first input of another three-input NAND gate 428, whose output feeds a "CS/WE" control input of the PROM 412. A three-input NAND gate 430 has its three inputs tied together at the third input of the NAND gate 424 and feeds a third input of the NAND gate 428. The "CPU READ" output of the SMI 404 also feeds the remaining input of the three-input NAND gate 428. The NAND gates 424, 428 and 430 comprise the components of a triple three-input NAND gate integrated circuit package of the type generally designated 74LS10. The output of the NAND gate 426 also feeds one input of a BCD-to-decimal decoder integrated circuit 432, which has two of its remaining inputs fed from the fourth and fifth address lines 410 of the SMI 404. The first two outputs of the decoder 432 are fed to a "CE1" input of the RAM 416, and to "CE1" inputs of the RAM's 420 and 422, respectively. The "CPU READ" line of the SMI 404 also feeds both inputs of a two input NAND gate 434 whose output feeds "OD" inputs of all four RAM's 416, 418, 420 and 422.

Referring now to the power supplies for the circuits of FIG. 7A and 7B, illustrated in FIG. 7B, it will be seen that two positive voltage supplies, and one negative voltage supply and ground are interconnected with suitable capacitors designated generally 436, and feed three power supply lines which provide all of the power supply inputs of the components of FIG. 7A and 7B, in a fashion known to those skilled in the art. Additionally, the twelve volt positive tractor battery is joined with a circuit point 438, which feeds positive voltage terminals 15 of the RAM's 416, 418, 420 and 422 via suitable current limiting resistors. A second, regulated DC voltage supply at a circuit point 440, feeds the same power supply inputs via a resistor 442 and a diode 444, and, via a diode 446, also feeds both inputs of a two-input NAND gate 448. The NAND gate 448 also has a suitable resistor 450 to ground from its inputs, which inputs are also joined with a suitable positive supply voltage from the supplies 435. The NAND gate 448 feeds both inputs of a two-input NAND gate 452 whose output feeds the "CE₂" inputs of the four RAM's 416, 418, 420 and 422.

In the case where the PROM's 412 and 414 are of the type generally designated 2708, circuit points in FIG. 7A adjacent the NAND gates 424, 428 and 430, are jumpered as follows: 512 to 514, 515 to 516. Similarly, when the PROM's 412 and 414 are chosen as integrated circuits of the type designated 2708 the circuit points 520 and 522 adjacent the power supply inputs 435 in FIG. 7 B are jumpered. When the PROM's 412 and 414 comprise integrated circuits of the type designated 2716, the foregoing points are jumpered or joined as follows: 512 to 513, 514 to 516, 520 to 521.

Referring again to FIG. 7 A the external timer components for the CPU 400 include a resistor 454, a pair of capacitors 456 and 458 and a crystal element 460. Three modes of external timing are available, as known in the art, by different interconnections of circuit points as follows: In the "crystal mode", circuit points 518 and 519 are jumpered and capacitors 456 and 458 and crystal element 460 are connected as illustrated; in the "external mode" circuit points 518 and 519 are jumpered and the resistor 454, capacitors 456 and 458 and crystal element 460 are eliminated; in the "RC" mode, circuit points 517 and 518 are jumpered, resistor 454 and capacitor 456 are connected as shown, while capacitor 458 and crystal element 460 are eliminated. The "external interrupt" (EXT INT) control lines of the SMI 404 and PI/O 402 may be alternatively enabled, with different circuit point interconnections established as follows. With neither external interrupt line enabled the following circuit points are jumpered or interconnected: 501 to 502 and 506 to 507. With the external interrupt line of the PI/O 402 only enabled, the following circuit points are interconnected or jumpered: 501 to 502 and 506 to 508. With the external interrupt control line of the SMI 404 only enabled, the following circuit points are interconnected or jumpered: 501 to 503 and 506 to 507. With the external interrupts of the SMI 404 and the PI/O 402 both enabled, the connections are as follows: 501 to 504 and 506 to 508.

For purpose of fully describing a specific embodiment of the invention, the following pages include an exemplary program for the microprocessor of this invention. This program is reproduced as a source statement including Mnemonic, Operand and comments as appropriate.

```
                                    SOURCE STATEMENT
                        0001
                        0002   *
                        0003   *
0000 60                 0004         LISU   0
0001 6F                 0005         LISL   7         CLR ALL REGS
0002 70                 0006         CLR
0003 5E                 0007  S8     LR     D,A
0004 8FFE     0003      0008         BR7    S8
0006 61                 0009         LISU   1
0007 5E                 0010  S9     LR     D,A
0008 8FFE     0007      0011         BR7    S9
000A 62                 0012         LISU   2
000B 5E                 0013  T1     LR     D,A
000C 8FFE     000B      0014         BR7    T1
000E 63                 0015         LISU   3
000F 5E                 0016  T2     LR     D,A
0010 8FFE     000F      0017         BR7    T2
0012 64                 0018         LISU   4
0013 5E                 0019  T3     LR     D,A
0014 8FFE     0013      0020         BR7    T3
0016 65                 0021         LISU   5
0017 5E                 0022  T4     LR     D,A
0018 8FFE     0017      0023         BR7    T4
001A 66                 0024         LISU   6
001B 5E                 0025  T6     LR     D,A
001C 8FFE     001B      0026         BR7    T6
001E 9005     0024      0027         BR     AMA
0020 50                 0028         LR     0,A
```

```
0021 2908A0 08A0 0029          JMP   H'08A0'
0024 67          0030   AMA    LISU  7
0025 5E          0031   T7     LR    D,A
0026 8FFE  0025  0032          BR7   T7
0028 63          0033          LISU  3
0029 6B          0034          LISL  3
002A 71          0035          LIS   1
002B 5D          0036          LR    I,A
002C 6F          0037          LISL  7
002D 2021        0038          LI    H'21'
002F 5C          0039          LR    S,A
0030 64          0040          LISU  4
0031 78          0041          LIS   8
0032 5D          0042          LR    I,A
0033 2A1080 1080 0043          DCI   H'1080'
0036 2024        0044          LI    H'24'    PREPARE TO RESET 36
                 0045   *                       MEMORY LOCATIONS
0038 57          0046          LR    7,A      STORE IN R7
0039 70          0047          CLR
003A 17          0048   T8     ST
003B 37          0049          DS    7
003C 94FD  003A  0050          BNZ   T8       E STORAGE REGISTERS
                 0051   *                       RESET
003E 62          0052          LISU  2        INITIAL TIMER SET
003F 2011        0053          LI    H'11'
0041 5D          0054          LR    I,A      T2 SET (OFFSET BY 3/16
                 0055   *                       SEC) 1/4 SEC
0042 2019        0056          LI    H'19'
0044 5C          0057          LR    S,A      T5 SET (OFFSET BY 1/8
                 0058   *                       SEC) 1/2 SEC
0045 6B          0059          LISL  3        SELECT T3
0046 2029        0060          LI    H'29'
0048 5D          0061          LR    I,A      T3 SET (OFFSET BY 1/16
                 0062   *                       SEC) 1 SEC
0049 204E        0063          LI    H'4E'
004B 5C          0064          LR    S,A      T4 SET (NO OFFSET) 2 SEC
004C 70          0065          LIS   0
004D B7          0066          OUTS  7        SET MODULO-N REGISTER
004E 20EA        0067          LI    H'EA'
0050 B6          0068          OUTS  6        SET INTERRUPT CONTROL PORT
0051 63          0069          LISU  3        RESTORE S1 & S2
0052 68          0070          LISL  0
0053 2A10B5 10B5 0071          DCI   H'10B5'
0056 16          0072          LM
0057 5D          0073          LR    I,A
0058 16          0074          LM
0059 5C          0075          LR    D,A      S1 & S2 RESTORED
005A 20FD        0076          LI    H'FD'
005C CC          0077          AS    S
005D 9203  0061  0078          BNC   OK
005F 70          0079          LIS   0
0060 5C          0080          LR    S,A
0061 69          0081   OK     LISL  1
0062 20FA        0082          LI    H'FA'
0064 CC          0083          AS    S
0065 9203  0069  0084          BNC   A15
0067 75          0085          LIS   5
0068 5C          0086          LR    S,A
0069 1B          0087   A15    EI
006A 63          0088          LISU  3
                 0089   *
006B 6E          0090          LISL  6
006C 74          0091          LIS   4
006D FC          0092          NS    S
006E 941C  008B  0093          BNZ   BB2      JUMP IF SET-UP MODE
                 0094   *                       SELECTED
0070 64          0095          LISU  4
0071 6F          0096          LISL  7
0072 71          0097          LIS   1
0073 FC          0098          NS    S        TEST FR2 FOR S1 SET
0074 941F  0094  0099          BNZ   T9       JUMP IF S1 FR2 SET
```

```
0076 63            0100          LISU  3           SELECT S1 REGISTER
0077 68            0101          LISL  0
0078 70            0102          LIS   0
0079 EC            0103          XS    S           TEST FOR SCAN SELECTION
007A 9407   0082   0104          BNZ   U1          JUMP IF SCAN NOT SELECTED
007C 64            0105          LISU  4
007D 2041          0106          LI    H'41'
007F 5C            0107          LR    S,A         L4 REGISTER SET FOR SCAN
0080 9032   00B3   0108          BR    U2          JUMP TO PROCESS L5
0082 71            0109  U1      LIS   1
0083 EC            0110          XS    S           TEST FOR AVG. ALL ROWS
0084 9409   008E   0111          BNZ   U3          JUMP IF AVG. ALL ROWS
                   0112    *                           NOT SELECTED
0086 64            0113          LISU  4
0087 72            0114          LIS   2
0088 5C            0115          LR    S,A         L4 REGISTER SET FOR AVG.
                   0116    *                           ALL ROWS
0089 9029   00B3   0117          BR    U2          JUMP TO PROCESS L5
008B 2903DD 03DD   0118  BR2     JMP   A86
008E 64            0119  U3      LISU  4           ROW SELECT SELECTED
008F 2044          0120          LI    H'44'
0091 5C            0121          LR    S,A         L4 REGISTER SET FOR
                   0122    *                           ROW SELECT
0092 9020   00B3   0123          BR    U2          JUMP TO PROCESS L5
0094 64            0124  T9      LISU  4
0095 68            0125          LISL  0
0096 77            0126          LIS   7
0097 5C            0127          LR    S,A         L4 SET FOR FULL DISPLAY
0098 63            0128          LISU  3
0099 6E            0129          LISL  6
009A 70            0130          CLR
009B CC            0131          AS    S
009C 63            0132          LISL  0
009D 810B   00A9   0133          BP    U6
009F 2A06D2 06D2   0134          DCI   TBL1+1
00A2 4C            0135          LR    A,S
00A3 8E            0136          ADC
00A4 16            0137          LM
00A5 18            0138          COM
00A6 64            0139          LISU  4
00A7 FC            0140          NS    S
00A8 5C            0141          LR    S,A
00A9 63            0142  U6      LISU  3
00AA 71            0143          LIS   1
00AB EC            0144          NS    S
00AC 8406   00B3   0145          BZ    U2          JUMP IF AVG ALL ROWS
                   0146    *                           SELECTED TO PROCESS L5
00AE 64            0147          LISU  4
00AF 2040          0148          LI    H'40'
00B1 CC            0149          AS    S           SET R17 6 (ROW) OF L4
00B2 5C            0150          LR    S,A         RESTORE NEW L4 CODE
00B3 64            0151  U2      LISU  4
00B4 6F            0152          LISL  7
00B5 72            0153          LIS   2
00B6 FC            0154          NS    S           TEST FR2 FOR S2 SET
00B7 940D   00C5   0155          BNZ   U4          JUMP IF S2 REGISTER
                   0156    *                           SET
00B9 63            0157          LISU  3           SELECT S2 REGISTER
00BA 69            0158          LISL  1
00BB 2A06D2 06D2   0159          DCI   TBL1+1
00BE 4C            0160          LR    A,S         S2 COUNT TO ACC
00BF 8E            0161          ADC
00C0 16            0162          LM
00C1 64            0163          LISU  4
00C2 5C            0164          LR    S,A         L5 CODE SET
00C3 9017   00DB   0165          BR    U5          JUMP TO PROCESS L7
00C5 69            0166  U4      LISL  1
00C6 203F          0167          LI    H'3F'
00C8 5C            0168          LR    S,A         L5 SET FOR FULL DISPLAY
00C9 63            0169          LISU  3
00CA 6E            0170          LISL  6
```

```
00CB 70            0171        CLR
00CC CC            0172        AS    S
00CD 8101   00DB   0173        BP    U5
00CF 69            0174        LISL  1
00D0 2A06D2 06D2   0175        DCI   TBL1+1
00D3 63            0176        LISU  3
00D4 40            0177        LR    A,S
00D5 8E            0178        ADC
00D6 16            0179        LM
00D7 18            0180        COM
00D8 64            0181        LISU  4
00D9 FC            0182        NS    S
00DA 5C            0183        LR    S,A        SELECTED FUNCTION BLANKED
00DB 64            0184  U5    LISU  4
00DC 68            0185        LISL  3
00DD 2080          0186        LI    H'80'
00DF FC            0187        NS    S
00E0 5D            0188        LR    I,A        L7 SET
00E1 70            0189        CLR
00E2 5D            0190        LR    I,A        L8 RESET
00E3 5C            0191        LR    S,A        L9 RESET
00E4 63            0192        LISU  3          TEST FOR AREA SELECTION
00E5 69            0193        LISL  1
00E6 71            0194        LIS   1
00E7 EC            0195        XS    S
00E8 9416   00FF   0196        BNZ   UU6        JUMP IF AREA NOT SELECTED
00EA 6E            0197        LISL  6          SELECT US REGISTER
00EB 70            0198        CLR
00EC CC            0199        AS    S
                   0200   *                     STATUS REGISTER ACTIVATED
                                                TO US REGISTER
00ED 9107   00F5   0201        BM    U7         JUMP IF SELECTION TO BE
                   0202   *                     BLANKED
00EF 64            0203        LISU  4          SELECT L9
00F0 6D            0204        LISL  5
00F1 7C            0205        LIS   H'C'
00F2 5C            0206        LR    S,A        FIELD AREA & TOTAL AREA
                   0207   *                     SET ON
00F3 940B   00FF   0208        BR    UU6        JUMP TO PROCESS L11
00F5 64            0209  U7    LISU  4
00F6 6F            0210        LISL  7
00F7 40            0211        LR    A,S
00F8 12            0212        SR    1
00F9 18            0213        COM
00FA 210C          0214        NI    H'0C'      MASK FOR FIELD AREA &
                   0215   *                     TOTAL AREA BITS
00FC 64            0216        LISU  4
00FD 6D            0217        LISL  5
00FE 5C            0218        LR    S,A        L9 SET UP
00FF 64            0219  UU6   LISU  4
0100 6E            0220        LISL  6
0101 2010          0221        LI    H'10'      TURN DECIMAL POINT ON
                   0222   *                     MIDDLE DISPLAY
0103 5C            0223        LR    S,A
0104 63            0224        LISU  3          C3 & C4 SETTING
0105 69            0225        LISL  1
0106 70            0226        LIS   0
0107 EC            0227        XS    S
0108 940E   0117   0228        BNZ   A01        TEST FOR SPEED SELECTION
                   0229   *                     JUMP IF SPEED NOT
                                                SELECTED
010A 64            0230        LISU  4
010B 68            0231        LISL  0
010C 70            0232        CLR
010D 5C            0233        LR    S,A
010E 61            0234        LISU  1          SELECT C3
010F 6A            0235        LISL  2
0110 70            0236        CLR
0111 5D            0237        LR    I,A
0112 48            0238        LR    A,S
0113 5C            0239        LR    S,A        MPH & C3C4
0114 2902D1 02D1   0240        JMP   U8         JUMP TO LATCH PROCESSING
0117 71            0241  A01   LIS   1
```

| | | | | | | |
|---|---|---|---|---|---|---|
| 0118 | EC | | 0242 | | XS | S | TEST FOR AREA SELECTION |
| 0119 | 9419 | 0133 | 0243 | | BNZ | U9 | JUMP IF AREA NOT SELECTED |
| 011B | 64 | | 0244 | | LISU | 4 | |
| 011C | 68 | | 0245 | | LISL | 0 | |
| 011D | 70 | | 0246 | | CLR | | |
| 011E | 5C | | 0247 | | LR | S,A | |
| 011F | 64 | | 0248 | | LISU | 4 | TEST FOR FIELD AREA OR |
| | | | 0249 | * | | | TOTAL AREA |
| 0120 | 6F | | 0250 | | LISL | 7 | |
| 0121 | 2018 | | 0251 | | LI | H'18' | |
| 0123 | FC | | 0252 | | NS | S | MASK FOR BITS 3 & 4 |
| 0124 | 12 | | 0253 | | SR | 1 | |
| 0125 | 12 | | 0254 | | SR | 1 | SET UP DCO APPER |
| 0126 | 2A10A2 | 10A2 | 0255 | | DCI | H'10A2' | |
| 0129 | 8E | | 0256 | | ADC | | DCO POINTING TO CO OF |
| | | | 0257 | * | | | DESIRED AREA |
| 012A | 61 | | 0258 | | LISU | 1 | |
| 012B | 6B | | 0259 | | LISL | 3 | |
| 012C | 16 | | 0260 | | LM | | |
| 012D | 5E | | 0261 | | LR | D,A | |
| 012E | 16 | | 0262 | | LM | | |
| 012F | 5C | | 0263 | | LR | S,A | STORED AREA TRANSFERRED |
| | | | 0264 | * | | | TO C3C4 |
| 0130 | 2902D1 | 02D1 | 0265 | | JMP | U8 | JUMP TO LATCH PROCESSING |
| 0133 | 63 | | 0266 | U9 | LISU | 3 | TEST FOR AVG ALL ROWS |
| 0134 | 68 | | 0267 | | LISL | 0 | |
| 0135 | 71 | | 0268 | | LIS | 1 | |
| 0136 | EC | | 0269 | | XS | S | |
| 0137 | 9460 | 0198 | 0270 | | BNZ | V1 | JUMP IF AVG ALL ROWS NOT |
| | | | 0271 | * | | | SELECTED |
| 0139 | 67 | | 0272 | | LISU | 7 | |
| 013A | 6B | | 0273 | | LISL | 3 | |
| 013B | 70 | | 0274 | ANA | CLR | | |
| 013C | 5E | | 0275 | | LR | D,A | |
| 013D | 8FFD | 013B | 0276 | | BR7 | ANA | RESET R60-R63 |
| 013F | 66 | | 0277 | | LISU | 6 | |
| 0140 | 6B | | 0278 | | LISL | 3 | |
| 0141 | 70 | | 0279 | | CLR | | |
| 0142 | 5E | | 0280 | KKK | LR | D,A | |
| 0143 | 8FFE | 0142 | 0281 | | BR7 | KKK | |
| 0145 | 20FF | | 0282 | | LI | H'FF' | |
| 0147 | 56 | | 0283 | | LR | 6,A | |
| 0148 | 2010 | | 0284 | | LI | H'10' | |
| 014A | 57 | | 0285 | | LR | 7,A | CYCLE COUNTER SET TO 16 |
| 014B | 2A10AC | 10AC | 0286 | | DCI | H'10AC' | |
| 014E | 16 | | 0287 | | LM | | |
| 014F | 55 | | 0288 | | LR | 5,A | |
| 0150 | 16 | | 0289 | | LM | | |
| 0151 | 54 | | 0290 | | LR | 4,A | |
| 0152 | 2A1000 | 1000 | 0291 | | DCI | H'1000' | |
| 0155 | 66 | | 0292 | ANE | LISU | 6 | |
| 0156 | 6B | | 0293 | | LISL | 3 | |
| 0157 | 16 | | 0294 | | LM | | |
| 0158 | 5E | | 0295 | | LR | D,A | |
| 0159 | 16 | | 0296 | | LM | | |
| 015A | 5D | | 0297 | | LR | I,A | |
| 015B | 71 | | 0298 | | LIS | 1 | |
| 015C | F5 | | 0299 | | NS | 5 | |
| 015D | 9405 | 0163 | 0300 | | BNZ | ANB | |
| 015F | 28078F | 078F | 0301 | | PI | SUBPLS | |
| 0162 | 36 | | 0302 | | DS | 6 | |
| 0163 | 45 | | 0303 | ANB | LR | A,5 | |
| 0164 | 12 | | 0304 | | SR | 1 | |
| 0165 | 55 | | 0305 | | LR | 5,A | |
| 0166 | 37 | | 0306 | | DS | 7 | |
| 0167 | 840B | 0173 | 0307 | | BZ | ANC | |
| 0169 | 78 | | 0308 | | LIS | 8 | |
| 016A | C7 | | 0309 | | XS | 7 | |
| 016B | 8403 | 016F | 0310 | | BZ | AND | |
| 016D | 90E7 | 0155 | 0311 | | BR | ANE | |
| 016F | 44 | | 0312 | AND | LR | A,4 | |

```
0170 55            0313         LR    5,A
0171 90E3   0155  0314         BR    ANE
0173 46           0315  ANC    LR    A,6
0174 18           0316         COM
0175 66           0317         LISU  6
0176 69           0318         LISL  1
0177 5E           0319         LR    D,A
0178 70           0320         CLR
0179 5C           0321         LR    S,A
017A 280730 0730  0322         PI    SUBDIV
017D 65           0323         LISU  5
017E 6A           0324         LISL  2
017F 4C           0325         LR    A,S
0180 13           0326         SL    1
0181 5D           0327         LR    I,A
0182 2080         0328         LI    H'80'
0184 FC           0329         NS    S
0185 9405   018B  0330         BZ    V6
0187 6A           0331         LISL  2
0188 71           0332         LIS   1
0189 CC           0333         AS    S
018A 5D           0334         LR    I,A
018B 4C           0335  V6     LR    A,S
018C 13           0336         SL    1
018D 5C           0337         LR    S,A
018E 4C           0338         LR    A,S
018F 61           0339         LISU  1
0190 5D           0340         LR    D,A
0191 65           0341         LISU  5
0192 4C           0342         LR    A,S
0193 61           0343         LISU  1
0194 5C           0344         LR    S,A
0195 290242 0242  0345         JMP   N4              JMP TO CORRECT READOUT
                  0346   *                           PROCESSING
                  0347   *
0198 67           0348  V1     LISU  7
0199 6B           0349         LISL  3
019A 70           0350         CLR
019B 5E           0351  A02    LR    D,A
019C 8FFE  019B  0352         BR7   A02
019E 66           0353         LISU  6
019F 6B           0354         LISL  3
01A0 5E           0355  A03    LR    D,A
01A1 8FFE  01A0  0356         BR7   A03
01A3 200FFE 0FFE 0357         DCI   H'FFE'
01A6 63           0358         LISU  3
01A7 6B           0359         LISL  3
01A8 4C           0360         LR    A,S
01A9 13           0361         SL    1
01AA 8E           0362         ADC                   DC0 -> "A" OF C0 ROW SEL
01AB 70           0363         LIS   0
01AC 54           0364         LR    4,A             RESET # READINGS
                  0365   *                           COUNTER
01AD 57           0366         LR    7,A             RESET EFFECTIVE
                  0367   *                           READINGS COUNTER
01AE 2C           0368  N2     XDC
01AF 2010A3 10A3 0369         DCI   H'10A3'          DC0 POINTING TO C1 OF HI
                  0370   *                           FAIL SET
01B2 2C           0371         XDC
01B3 16           0372         LM                    B C0 TO ACC
01B4 66           0373         LISU  6
01B5 6B           0374         LISL  3
01B6 5E           0375         LR    D,A
01B7 16           0376         LM                    B C1 TO ACC
01B8 5D           0377         LR    I,A
01B9 2C           0378         XDC
01BA 67           0379         LISU  7
01BB 4E           0380         LR    A,D
01BC 56           0381         LR    6,A
01BD 4E           0382         LR    A,D
01BE 55           0383         LR    5,A
```

```
01BF 4E              0384            LR      A,D
01C0 53              0385            LR      3,A
01C1 70              0386            CLR
01C2 5C              0387            LR      S,A
01C3 6A              0388            LISL    2
01C4 16              0389            LM
01C5 5D              0390            LR      1,A
01C6 16              0391            LM
01C7 12              0392            SR      1
01C8 5E              0393            LR      D,A
01C9 71              0394            LIS     1
01CA FC              0395            NS      S
01CB 8406  01D2 0396            BZ      BUD
01CC 6B              0397            LISL    3
01CE 2080            0398            LI      H'80'
01D0 CC              0399            AS      S
01D1 5E              0400            LR      D,A
01D2 4C              0401    BUD     LR      A,S
01D3 12              0402            SR      1
01D4 5E              0403            LR      D,A
01D5 70              0404            CLR
01D6 5E              0405            LR      D,A
01D7 5C              0406            LR      S,A
01D8 2807A2 07A2 0407            PI      SUBMIN
01DB 9224  0200 0408            BNC     W2A
01DD 6A              0409            LISL    2
01DE 16              0410            LM
01DF 5D              0411            LR      1,A
01E0 16              0412            LM
01E1 12              0413            SR      1
01E2 5E              0414            LR      D,A
01E3 71              0415            LIS     1
01E4 FC              0416            NS      S
01E5 8406  01EC 0417            BZ      DUB
01E7 6B              0418            LISL    3
01E8 2080            0419            LI      H'C0'
01EA CC              0420            AS      S
01EB 5E              0421            LR      D,A
01EC 4C              0422    DUB     LR      A,S
01ED 12              0423            SR      1           HI - LO INSERT
01EE 5E              0424            LR      D,A
01EF 70              0425            CLR
01F0 5E              0426            LR      D,A
01F1 5C              0427            LR      S,A
01F2 2807A2 07A2 0428            PI      SUBMIN
01F5 6B              0429            LISL    3
01F6 46              0430            LR      A,6
01F7 5E              0431            LR      D,A
01F8 45              0432            LR      A,5
01F9 5E              0433            LR      D,A
01FA 43              0434            LR      A,3
01FB 5E              0435            LR      D,A
01FC 70              0436            CLR
01FD 5C              0437            LR      S,A
01FE 9213  0212 0438            BNC     W3A
0200 6B              0439    W2A     LISL    3
0201 46              0440            LR      A,6
0202 5E              0441            LR      D,A
0203 45              0442            LR      A,5
0204 5E              0443            LR      D,A
0205 43              0444            LR      A,3
0206 5E              0445            LR      D,A
0207 70              0446            CLR
0208 5C              0447            LR      S,A
0209 909E  0212 0448            BR      W1
020B 28078F 078F 0449    V9      PI      SUBPLS
020E 71              0450            LIS     1
020F 57              0451            LR      7,A
0210 9016  0227 0452            BR      V1A
0212 28078F 078F 0453    W3A     PI      SUBPLS
                     0454    *                               GENERATED
```

```
0215 47            0455          LR      A,7
0216 1F            0456          INC
0217 57            0457          LR      7,A     INCREMENT EFFECTIVE
                   0458  *                       READINGS COUNTER
0218 70            0459  W1      CLR
0219 E7            0460          XS      7
021A 94F0  020B    0461          BZ      V9
021C 44            0462          LR      A,4
021D 1F            0463          INC
021E 54            0464          LR      4,A    INCREMENT # READINGS
                   0465  *                       COUNTER
021F 74            0466          LIS     4
0220 E4            0467          XS      4      TEST IF THROUGH ALL 4
                   0468  *                       READINGS (A,B,C & D)
0221 2C            0469          XDC
0222 201E          0470          LI      H'1E'
0224 8E            0471          ADC
0225 9488  01AE    0472          BNZ     W2     JUMP IF NOT DONE
0227 66            0473  V1A     LISU    6
0228 69            0474          LISL    1
0229 47            0475          LR      A,7
022A 5E            0476          LR      D,A
022B 70            0477          CLR
022C 5C            0478          LR      S,A
022D 280730 0730   0479          PI      SUBDIV
0230 66            0480          LISU    6
0231 6A            0481          LISL    2
0232 70            0482          CLR
0233 5D            0483          LR      I,A
0234 72            0484          LIS     2
0235 5C            0485          LR      S,A
0236 2806E2 06E2   0486          PI      SUBMUL
0239 67            0487          LISU    7
023A 6B            0488          LISL    3
023B 4C            0489          LR      A,S
023C 61            0490          LISU    1
023D 5E            0491          LR      D,A
023E 67            0492          LISU    7
023F 4C            0493          LR      A,S
0240 61            0494          LISU    1
0241 5C            0495          LR      S,A
0242 63            0496  W4      LISU    3      SELECT S2 REGISTER
0243 69            0497          LISL    1
0244 75            0498          LIS     5
0245 EC            0499          XS      S      TEST FOR SEEDS/AREA
                   0500  *                       SELECTION
0246 841E  0265    0501          BZ      BB4    JUMP IF SEEDS/AREA
0248 72            0502          LIS     2
0249 EC            0503          XS      S
024A 8451  029C    0504          BZ      X4     JUMP IF DIST/SEED
                   0505  *                       SELECTED
024C 61            0506          LISU    1      PREPARE FOR MULTIPLICATION
                   0507  *                       BY ADDITION
024D 6B            0508          LISL    3
024E 4C            0509          LR      A,S
024F 65            0510          LISU    5
0250 5E            0511          LR      D,A
0251 61            0512          LISU    1
0252 4C            0513          LR      A,S
0253 65            0514          LISU    5
0254 5E            0515          LR      D,A
0255 63            0516          LISU    3      S2 SELECTED
0256 74            0517          LIS     4
0257 EC            0518          XS      S      TEST FOR WT/AREA SELECTION
0258 840F  0268    0519          BZ      W6     JUMP IF WT/AREA SELECTED
025A 2A10AF 10AF   0520          DCI     H'10AF' DCO ADDRESS OF CO ROW SPH
025D 66            0521          LISU    6      TRANSFER MULTYPLIER #
025E 6B            0522          LISL    3
025F 16            0523          LM
0260 5E            0524          LR      D,A
0261 16            0525          LM
```

| | | | | | |
|---|---|---|---|---|---|
| 0262 | 5D | | 0526 | | LR I,A |
| 0263 | 900B | 026F | 0527 | | BR W7 | JUMP TO DO MULTIPLICATION |
| 0265 | 2902D1 | 02D1 | 0528 | BB4 | JMP U8 |
| 0268 | 66 | | 0529 | W6 | LISU 6 | MULTYPLIER = D'100' |
| 0269 | 6B | | 0530 | | LISL 3 |
| 026A | 2064 | | 0531 | | LI H'64' |
| 026C | 5E | | 0532 | | LR D,A |
| 026D | 70 | | 0533 | | CLR |
| 026E | 5D | | 0534 | | LR I,A |
| 026F | 2806E2 | 06E2 | 0535 | W7 | PI SUBMUL |
| 0272 | 63 | | 0536 | W9 | LISU 3 |
| 0273 | 69 | | 0537 | | LISL 1 |
| 0274 | 73 | | 0538 | | LIS 3 |
| 0275 | EC | | 0539 | | XS S | TEST FOR SEED/DIST |
| | | | 0540 | * | | SELECTION |
| 0276 | 940B | 0282 | 0541 | | BNZ X2 | JUMP IF SEED/DIST NOT |
| | | | 0542 | * | | SELECTED |
| 0278 | 66 | | 0543 | | LISU 6 |
| 0279 | 69 | | 0544 | | LISL 1 |
| 027A | 206B | | 0545 | | LI H'6B' | DIVIDER OF D'5227' |
| 027C | 5E | | 0546 | | LR D,A |
| 027D | 2014 | | 0547 | | LI H'14' |
| 027F | 5E | | 0548 | | LR D,A | DIVIDER STORED |
| 0280 | 900A | 028B | 0549 | | BR X3 | JUMP TO PROCESS DIVIDE |
| 0282 | 66 | | 0550 | X2 | LISU 6 |
| 0283 | 69 | | 0551 | | LISL 1 |
| 0284 | 2A10B1 | 10B1 | 0552 | | DCI H'10B1' | DCD POINTING TO SEED/WT |
| | | | 0553 | * | | CO ADDRESS |
| 0287 | 16 | | 0554 | | LM |
| 0288 | 5E | | 0555 | | LR D,A |
| 0289 | 16 | | 0556 | | LM |
| 028A | 5E | | 0557 | | LR D,A | DIVIDER STORED |
| 028B | 280730 | 0730 | 0558 | X3 | PI SUBDIV |
| 028E | FC | | 0559 | | NS S | MASK FOR DIGIT SELECT |
| | | | 0560 | * | | BITS 0 & 1 OF DS |
| | | | 0561 | * | | REGISTER |
| 028F | 55 | | 0562 | | LR 5,A |
| 0290 | 70 | | 0563 | | LIS 0 | TEST FOR 1ST DIGIT |
| 0291 | 65 | | 0564 | X9 | LISU 5 | TRANSFER RESULT TO C3 C4 |
| 0292 | 6B | | 0565 | | LISL 3 |
| 0293 | 4C | | 0566 | | LR A,S |
| 0294 | 61 | | 0567 | | LISU 1 |
| 0295 | 5E | | 0568 | | LR D,A |
| 0296 | 65 | | 0569 | | LISU 5 |
| 0297 | 4C | | 0570 | | LR A,S |
| 0298 | 61 | | 0571 | | LISU 1 |
| 0299 | 5C | | 0572 | | LR S,A |
| 029A | 9036 | 02D1 | 0573 | | BR U8 | JUMP TO LATCH PROCESSING |
| 029C | 2A10AF | 10AF | 0574 | X4 | DCI H'10AF' | DIST/SEED SELECTED |
| 029F | 66 | | 0575 | | LISU 6 |
| 02A0 | 69 | | 0576 | | LISL 1 |
| 02A1 | 16 | | 0577 | | LM |
| 02A2 | 5E | | 0578 | | LR D,A |
| 02A3 | 16 | | 0579 | | LM |
| 02A4 | 5C | | 0580 | | LR S,A |
| 02A5 | 67 | | 0581 | | LISU 7 |
| 02A6 | 6B | | 0582 | | LISL 3 |
| 02A7 | 2058 | | 0583 | | LI H'58' |
| 02A9 | 5E | | 0584 | | LR D,A |
| 02AA | 20B6 | | 0585 | | LI H'B6' |
| 02AC | 5E | | 0586 | | LR D,A |
| 02AD | 205F | | 0587 | | LI H'5F' |
| 02AF | 5E | | 0588 | | LR D,A |
| 02B0 | 70 | | 0589 | | CLR |
| 02B1 | 5C | | 0590 | | LR S,A | DIVIDER SET |
| 02B2 | 280730 | 0730 | 0591 | | PI SUBDIV |
| 02B5 | 65 | | 0592 | | LISU 5 |
| 02B6 | 6B | | 0593 | | LISL 3 |
| 02B7 | 4C | | 0594 | | LR A,S |
| 02B8 | 67 | | 0595 | | LISU 7 |
| 02B9 | 5E | | 0596 | | LR D,A |

```
02BA 65              0597        LISU  5
02BB 4C              0598        LR    A,S
02BC 67              0599        LISU  7
02BD 5E              0600        LR    D,A
02BE 70              0601        CLR
02BF 5E              0602        LR    D,A
02C0 5C              0603        LR    S,A
02C1 61              0604        LISU  1
02C2 6B              0605        LISL  3
02C3 4C              0606        LR    A,S
02C4 66              0607        LISU  6
02C5 69              0608        LISL  1
02C6 5D              0609        LR    I,A
02C7 61              0610        LISU  1
02C8 4C              0611        LR    A,S
02C9 66              0612        LISU  6
02CA 68              0613        LISL  0
02CB 5C              0614        LR    S,A
02CC 280730 0730 0615           PI    SUBDIV
02CF 90C1  0291 0616            BR    X9           TRANSFER RESULT TO C3-C4
02D1 63              0617  U8    LISU  3           SELECT S1 COUNTER
02D2 68              0618        LISL  0
02D3 71              0619        LIS   1
02D4 ED              0620        XS    I           TEST IF AVG ALL ROWS
                     0621  *                         SELECTED
02D5 843A  0310 0622            BZ    Y7           JUMP IF AVG ALL ROWS
                     0623  *                         SELECTED
02D7 69              0624        LISL  1
02D8 70              0625        LIS   0
02D9 EC              0626        XS    S           TEST IF SPEED SELECTED
02DA 8435  0310 0627            BZ    Y7           JUMP IF SPEED SELECTED
02DC 71              0628        LIS   1
02DD EC              0629        XS    S           TEST IF AREA SELECTED
02DE 8431  0310 0630            BZ    Y7           JUMP IF AREA SELECTED
02E0 6B              0631  Y2    LISL  3           SELECT C1
02E1 20F6            0632        LI    H'F6'       CONVERT C1 FROM BINARY
                     0633  *                         TO DECIMAL
02E3 CC              0634        AS    S           TEST IF C1 > ROW 9
02E4 8205  02EA 0635            BC    Y8           JUMP IF NO BORROW
                     0636  *                         (ROW # >9)
02E6 4C              0637        LR    A,S
02E7 57              0638        LR    7,A         STORE C1 CODE IN R7
02E9 9004  02ED 0639            BR    Y9           JUMP TO PROCESS ANY
                     0640  *                         DIGIT BLANK/FLASH
02EA 76              0641  Y8    LIS   6           CONVERT TO DECIMAL
02EB CC              0642        AS    S
02EC 57              0643        LR    7,A         STORE C1 CODE IN R7
02ED 63              0644  Y9    LISU  3
02EE 6E              0645        LISL  6           TEST FOR OPERATE OR
                     0646  *                         SET-UP MODE
02EF 74              0647        LIS   4
02F0 FC              0648        NS    S           OPERATE/SET-UP BIT
                     0649  *                         MASKED FOR
02F1 9414  0306 0650            BNZ   Z1           JUMP IF IN SET-UP MODE
02F3 20F0            0651  Z4    LI    H'F0'
02F5 F7              0652        NS    7           TEST FOR LEADING 0
02F6 941C  0313 0653            BNZ   Z3           JUMP IF NO LEADING 0
02F8 47              0654        LR    A,7
02F9 22F0            0655        OI    H'F0'
02FB 57              0656        LR    7,A         BLANK (F) LEADING 0
02FC 9016  0313 0657            BR    Z3           JUMP TO DISPLAY C1
02FE 6B              0658  AGA   LISL  3           NO. ROWS TO C1
02FF 2A10AE 10AE 0659           DCI   H'10AE'
0302 16              0660        LM
0303 5C              0661        LR    S,A
0304 90EE  02F3 0662            BR    Z4
0306 6A              0663  Z1    LISL  2           IN SET-UP MODE CHECK
                     0664  *                         FOR S3 SELECTION
0307 63              0665        LISU  3
0308 75              0666        LIS   5
0309 EC              0667        XS    S           TEST FOR NO. ROWS
```

|  |  |  |  |  |  |  |
|---|---|---|---|---|---|---|
|  |  |  | 0668 | * |  |  |
| 030A | 84F3 | 02FE | 0669 |  | BZ | AGA |
|  |  |  | 0670 | * |  |  |
|  |  |  | 0671 | * |  |  |
| 030C | 74 |  | 0672 |  | LIS | 4 |
| 030D | EC |  | 0673 |  | XS | S |
|  |  |  | 0674 | * |  |  |
| 030E | 84E4 | 02F3 | 0675 |  | BZ | Z4 |
|  |  |  | 0676 | * |  |  |
| 0310 | 20FF |  | 0677 | Y7 | LI | H'FF' |
| 0312 | 57 |  | 0678 |  | LR | 7,A |
| 0313 | 70 |  | 0679 | Z3 | CLR |  |
| 0314 | 54 |  | 0680 |  | LR | 4,A |
| 0315 | 60 |  | 0681 |  | LISU | 0 |
| 0316 | 6F |  | 0682 |  | LISL | 7 |
| 0317 | 2807B9 | 07B9 | 0683 |  | PI | SUBOUT |
| 031A | 61 |  | 0684 |  | LISU | 1 |
| 031B | 6B |  | 0685 |  | LISL | 3 |
| 031C | 4C |  | 0686 |  | LR | A,S |
| 031D | 67 |  | 0687 |  | LISU | 7 |
| 031E | 5E |  | 0688 |  | LR | D,A |
| 031F | 61 |  | 0689 |  | LISU | 1 |
| 0320 | 4C |  | 0690 |  | LR | A,S |
| 0321 | 67 |  | 0691 |  | LISU | 7 |
| 0322 | 5E |  | 0692 |  | LR | D,A |
| 0323 | 70 |  | 0693 |  | CLR |  |
| 0324 | 5E |  | 0694 |  | LR | D,A |
| 0325 | 5E |  | 0695 |  | LR | D,A |
| 0326 | 2807F4 | 07F4 | 0696 |  | PI | SUBDEC |
| 0329 | 6E |  | 0697 |  | LISL | 6 |
| 032A | 63 |  | 0698 |  | LISU | 3 |
| 032B | 74 |  | 0699 |  | LIS | 4 |
| 032C | FC |  | 0700 |  | NS | S |
| 032D | 941D | 034B | 0701 |  | BNZ | Z8 |
| 032F | 20F0 |  | 0702 |  | LI | H'F0' |
|  |  |  | 0703 | * |  |  |
| 0331 | F6 |  | 0704 |  | NS | 6 |
| 0332 | 945B | 038E | 0705 |  | BNZ | Z9 |
|  |  |  | 0706 | * |  |  |
| 0334 | 46 |  | 0707 |  | LR | A,6 |
| 0335 | 22F0 |  | 0708 |  | OI | H'F0' |
| 0337 | 56 |  | 0709 |  | LR | 6,A |
| 0338 | 7F |  | 0710 |  | LIS | H'F' |
| 0339 | F6 |  | 0711 |  | NS | 6 |
| 033A | 9453 | 038E | 0712 |  | BNZ | Z9 |
|  |  |  | 0713 | * |  |  |
| 033C | 56 |  | 0714 |  | LR | 6,A |
| 033D | 22FF |  | 0715 |  | OI | H'FF' |
| 033F | 56 |  | 0716 |  | LR | 6,A |
|  |  |  | 0717 | * |  |  |
| 0340 | 20F0 |  | 0718 |  | LI | H'F0' |
| 0342 | F7 |  | 0719 |  | NS | 7 |
| 0343 | 944A | 038E | 0720 |  | BNZ | Z9 |
|  |  |  | 0721 | * |  |  |
| 0345 | 47 |  | 0722 |  | LR | A,7 |
| 0346 | 22F0 |  | 0723 |  | OI | H'F0' |
| 0348 | 57 |  | 0724 |  | LR | 7,A |
|  |  |  | 0725 | * |  |  |
| 0349 | 9044 | 038E | 0726 |  | BR | Z9 |
| 034B | 6C |  | 0727 | Z8 | LISL | 4 |
| 034C | 70 |  | 0728 |  | CLR |  |
| 034D | 5C |  | 0729 |  | LR | S,A |
| 034E | 6A |  | 0730 |  | LISL | 2 |
| 034F | 74 |  | 0731 |  | LIS | 4 |
|  |  |  | 0732 | * |  |  |
| 0350 | EC |  | 0733 |  | XS | S |
| 0351 | 841E | 0370 | 0734 |  | BZ | AA1 |
|  |  |  | 0735 | * |  |  |
| 0353 | 75 |  | 0736 |  | LIS | 5 |
|  |  |  | 0737 | * |  |  |
| 0354 | EC |  | 0738 |  | XS | S |

SELECTION
JUMP TO TEST FOR DIGIT
 FLASH IF NO. ROWS
 SELECTED

TEST FOR ROW ON/OFF
 SELECTION
JUMP IF ROW ON/OFF
 SELECTED

TEST FOR OPERATE/SET-UP
 MODE

JUMP IF IN SET-UP MODE
PROCESS LEADING 0
 SUPPRESSION

JUMP TO DISPLAY C3C4 IF
 NO SUPPRESSION REQ'D

1ST DIGIT SUPPRESSED

JUMP TO DISPLAY C3C4 IF
 NO SUPPRESSION REQ'D

1ST & 2ND DIGIT
 SUPPRESSED

JUMP TO DISPLAY C3C4 IF NO
 MORE SUPPRESSION REQ'D

1ST, 2ND, & 3RD DIGIT
 SUPPRESSED
JUMP TO DISPLAY C3C4

SELECT S3 REGISTER
TEST FOR ROW ON/OFF
 SELECTION

JUMP IF ROW ON/OFF
 SELECTED
TEST FOR NO. ROWS
 SELECTION

```
0355 841A   0370 0739           BZ    AA1       JUMP IF NO ROWS SELECTED
0357 79          0740           LIS   9         TEST FOR TEST MODE SELECT
0358 EC          0741           XS    S
0359 8416   0370 0742           BZ    AA1       JUMP IF TEST MODE SELECTED
035B 6E          0743           LISL  6         PROCESS DIGIT BLANKING
035C 70          0744           CLR             MASK FOR DIGIT ON-BLANK
                 0745   *                       BIT
035D CC          0746           AS    S
035E 812F   038E 0747           BP    Z9        JUMP IF NO BLANK TO
                 0748   *                       DISPLAY C3C4
0360 73          0749           LIS   3
0361 FC          0750           NS    S         MASK FOR DIGIT SELECT
                 0751   *                       BITS 0 & 1 OF DS
                 0752   *                       REGISTER
0362 55          0753           LR    5,A
0363 70          0754           LIS   0         TEST FOR 1ST DIGIT
                 0755   *                       BLANKING
0364 E5          0756           XS    5
0365 9410   0376 0757           BNZ   AA2       JUMP IF 1ST DIGIT NOT
                 0758   *                       TO BE BLANKED
0367 46          0759           LR    A,6
0368 22F0        0760           OI    H'F0'
036A 56          0761           LR    6,A       1ST DIGIT BLANKED
036B 22F0        0762           OI    H'F0'
036D 56          0763           LR    6,A       1ST DIGIT BLANKED
036E 901F   038E 0764           BR    Z9        JUMP TO DISPLAY C3C4
0370 20FF        0765   AA1     LI    H'FF'
0372 56          0766           LR    6,A
0373 57          0767           LR    7,A
0374 9019   038E 0768           BR    Z9
0376 71          0769   AA2     LIS   1         TEST FOR 2ND DIGIT
                 0770   *                       BLANKING
0377 E5          0771           XS    5
0378 9407   0380 0772           BNZ   AA3       JUMP IF 2ND DIGIT NOT
                 0773   *                       TO BE BLANKED
037A 46          0774           LR    A,6
037B 220F        0775           OI    H'0F'
037D 56          0776           LR    6,A       2ND DIGIT BLANKED
037E 900F   038E 0777           BR    Z9        JUMP TO DISPLA C3C4
0380 72          0778   AA3     LIS   2         TEST FOR 3RD DIGIT
                 0779   *                       BLANKING
0381 E5          0780           XS    5
0382 9407   038A 0781           BNZ   AA4       JUMP IF 3RD DIGIT NOT
                 0782   *                       TO BE BLANKED
0384 47          0783           LR    A,7
0385 22F0        0784           OI    H'F0'
0387 57          0785           LR    7,A       3RD DIGIT BLANKED
0388 9005   038E 0786           BR    Z9        JUMP TO DISPLAY C3C4
038A 47          0787   AA4     LR    A,7       BLANK 4TH DIGIT
038B 220F        0788           OI    H'0F'
038D 57          0789           LR    7,A       4TH DIGIT BLANKED
038E 63          0790   Z9      LISU  3
038F 6C          0791           LISL  4
0390 20F6        0792           LI    H'F6'
0392 CC          0793           AS    S
0393 8204   0398 0794           BC    DES
0395 4D          0795           LR    A,I
0396 9003   039A 0796           BR    SED
0398 76          0797   DES     LIS   6
0399 CD          0798           AS    I
039A 55          0799   SED     LR    5,A
039B 20F0        0800           LI    H'F0'
039D F5          0801           NS    5
039E 940C   03AB 0802           BNZ   CIV
03A0 45          0803           LR    A,5
03A1 22F0        0804           OI    H'F0'
03A3 55          0805           LR    5,A
03A4 7F          0806           LIS   H'F'
03A5 F5          0807           NS    5
03A6 9404   03AB 0808           BNZ   CIV
03A8 20FF        0809           LI    H'FF'
```

```
03AA 55           0810         LR    5,A
03AB 60           0811  CIV    LISU  0
03AC 73           0812         LIS   3
03AD 54           0813         LR    4,A
03AE 2807B9 07B9  0814         PI    SUBOUT
03B1 34           0815         DS    4
03B2 2807B9 07B9  0816         PI    SUBOUT
03B5 34           0817         DS    4
03B6 2807B9 07B9  0818         PI    SUBOUT
03B9 64           0819         LISU  4             PREPARE TO DISPLAY L4-L11
03BA 68           0820         LISL  0
03BB 74           0821         LIS   4
03BC 54           0822         LR    4,A           STARTING STROBE CODE FOR
                  0823  *                           L4
03BD 2807B9 07B9  0824  AB4    PI    SUBOUT
03C0 44           0825         LR    A,4
03C1 1F           0826         INC
03C2 54           0827         LR    4,A           NEXT STROBE CODE
03C3 7A           0828         LIS   H'A'
03C4 E4           0829         XS    4
03C5 9407 03CD    0830         BNZ   A05
03C7 4C           0831         LR    A,S
03C8 56           0832         LR    6,A
03C9 70           0833         CLR
03CA 5C           0834         LR    S,A
03CB 90F1 03BD    0835         BR    AB4
03CD 7B           0836  A05    LIS   H'B'
03CE E4           0837         XS    4
03CF 9406 03D6    0838         BNZ   A04
03D1 6E           0839         LISL  6
03D2 46           0840         LR    A,6
03D3 5C           0841         LR    S,A
03D4 90E8 03BD    0842         BR    AB4
03D6 7C           0843  A04    LIS   H'C'
03D7 E4           0844         XS    4
03D8 94E4 03BD    0845         BNZ   AB4
03DA 2905A5 05A5  0846         JMP   AB5           JUMP TO TEST FOR
                  0847  *                           FAILURE MODES
                  0848  *
                  0849  *
                  0850  *------------------------------------
                  0851  *
                  0852  *      END  OF  FIRST  TAPE
                  0853  *
                  0854  *------------------------------------
                  0855  *
                  0856  *
03DD 63           0857  AB6    LISU  3             SELECT S3 REGISTER
03DE 6A           0858         LISL  2
03DF 74           0859         LIS   4             TEST FOR ROW ON/OFF
                  0860  *                           SELECTION
03E0 EC           0861         XS    S
03E1 64           0862         LISU  4             SELECT L4
03E2 68           0863         LISL  0
03E3 9428 040C    0864         BNZ   AB7           JUMP IF ROW ON/OFF NOT
                  0865  *                           SELECTED
03E5 63           0866         LISU  3
03E6 6B           0867         LISL  3
03E7 20F7         0868         LI    H'F7'         TEST FOR ROW # > 8
03E9 CC           0869         AS    S
03EA 2A06D1 06D1  0870         DCI   TBL1
03ED 4C           0871         LR    A,S
03EE 8E           0872         ADC
03EF 16           0873         LM
03F0 8206 03F7    0874         BC    AAA
03F2 2A10AC 10AC  0875         DCI   H'10AC'
03F5 9004 03FA    0876         BR    ABA
03F7 2A10AD 10AD  0877  AAA    DCI   H'10AD'
03FA 3A           0878  ABA    NM
03FB 8405 0401    0879         BZ    ACA
03FD 2031         0880         LI    H'31'
```

```
03FF 9003   0403 0881         BR    ADA
0401 2029        0882   ACA   LI    H'29'
0403 6F          0883   ADA   LISL  7
0404 50          0884         LR    S,A
0405 64          0885         LISU  4
0406 68          0886         LISL  0
0407 20C0        0887         LI    H'C0'
0409 5D          0888         LR    I,A        L4 UPDATED
040A 9004   040F 0889         BR    AB8        JUMP TO UPDATE L5
040C 2080        0890   AB7   LI    H'80'
040E 5D          0891         LR    I,A        L4 UPDATED
040F 63          0892   AB8   LISU  3          SELECT S3 REGISTER
0410 6A          0893         LISL  2
0411 78          0894         LIS   8
0412 EC          0895         XS    S
                 0896   *                      TEST FOR DIST. CAL
                                                SELECTION
0413 9425   0439 0897         BNZ   AB9        JUMP IF DIST. CAL
                 0898   *                       NOT SELECTED
0415 6F          0899         LISL  7
0416 74          0900         LIS   4
0417 FC          0901         NS    S
0418 8411   042A 0902         BZ    LEE
041A 61          0903         LISU  1
041B 6B          0904         LISL  3
041C 2026        0905         LI    H'26'
041E 54          0906         LR    4,A
041F 2807E0 07E0 0907         PI    SUBACK
0422 44          0908         LR    A,4
0423 1F          0909         INC
0424 54          0910         LR    4,A
0425 2807E0 07E0 0911         PI    SUBACK
0428 900A   0433 0912         BR    EARL
042A 61          0913   LEE   LISU  1          DIST CAL TO C3C4
042B 6B          0914         LISL  3
042C 2A10B3 10B3 0915         DCI   H'10B3'
042F 16          0916         LM
0430 5E          0917         LR    D,A
0431 16          0918         LM
0432 5E          0919         LR    D,A
0433 64          0920   EARL  LISU  4
0434 2040        0921         LI    H'40'
0436 5D          0922         LR    I,A
0437 9010   0448 0923         BR    AC1        JUMP TO UPDATE L6
0439 79          0924   AB9   LIS   9
043A EC          0925         XS    S
                 0926   *                      TEST FOR TEST MODE
                                                SELECTION
043B 9408   0444 0927         BNZ   AC2        JUMP IF TEST MODE NOT
                 0928   *                       SELECTED
043D 64          0929         LISU  4
043E 69          0930         LISL  1
043F 2080        0931         LI    H'80'
0441 5D          0932         LR    I,A        L5 UPDATED
0442 9005   0448 0933         BR    AC1        JUMP TO UPDATE L6
0444 64          0934   AC2   LISU  4
0445 69          0935         LISL  1
0446 70          0936         LIS   0
0447 5D          0937         LR    I,A        L5 UPDATED
0448 70          0938   AC1   CLR
0449 5D          0939         LR    I,A        L6 UPDATED
044A 63          0940         LISU  3          SELECT S3 REGISTER
044B 6A          0941         LISL  2
044C 74          0942         LIS   4
044D EC          0943         XS    S          TEST FOR ROW ON/OFF
                 0944   *                       SELECTION
044E 64          0945         LISU  4
044F 6B          0946         LISL  3
0450 9406   0457 0947         BNZ   AC3        JUMP IF ROW ON/OFF NOT
                 0948   *                       SELECTED
0452 2040        0949         LI    H'40'
0454 5D          0950         LR    I,A        L7 UPDATED
0455 9003   0459 0951         BR    AC4        JUMP TO UPDATE L8
```

```
0457 70              0952  AC3    LIS    0
0458 5D              0953         LR     I,A        L7 UPDATED
0459 63              0954  AC4    LISU   3          SELECT S3 REGISTER
045A 6A              0955         LISL   2
045B 72              0956         LIS    2
045C EC              0957         XS     S          TEST FOR FIELD AREA
                     0958  *                           SELECTION
045D 840C    046A    0959         BZ     AC5        JUMP IF FIELD AREA
                     0960  *                           SELECTED
045F 73              0961         LIS    3
0460 EC              0962         XS     S          TEST FOR TOTAL AREA
                     0963  *                           SELECTION
0461 9426    0488    0964         BNZ    AC6        JUMP IF TOTAL AREA NOT
                     0965  *                           SELECTED
0463 61              0966         LISU   1          TOTAL AREA TO C3-C4
0464 6B              0967         LISL   3
0465 2A10A6  10A6    0968         DCI    H'10A6'
0468 9006    046F    0969         BR     AEA
046A 61              0970  AC5    LISU   1          FIELD AREA TO C3-C4
046B 6B              0971         LISL   3
046C 2A10A4  10A4    0972         DCI    H'10A4'
046F 16              0973  AEA    LM
0470 5E              0974         LR     D,A
0471 16              0975         LM
0472 5C              0976         LR     S,A
0473 63              0977         LISU   3
0474 6E              0978         LISL   6          SELECT DS REGISTER
0475 70              0979         CLR
0476 CD              0980         AS     I          MASK FOR DIGIT ON-BLANK
                     0981  *                           BIT
0477 9107    047F    0982         BM     AC7        JUMP IF LEGEND TO BE
                     0983  *                           FLASHED
0479 64              0984         LISU   4          SELECT L8
047A 6C              0985         LISL   4
047B 73              0986         LIS    3
047C 5D              0987         LR     I,A        L8 UPDATED
047D 9058    04D6    0988         BR     AC8        JUMP TO UPDATE L9
047F 4C              0989  AC7    LR     A,S
0480 18              0990         COM
0481 2103            0991         NI     H'03'
0483 64              0992         LISU   4          SELECT L8
0484 6C              0993         LISL   4
0485 5D              0994         LR     I,A        L8 UPDATED
0486 904F    04D6    0995         BR     AC8        JUMP TO UPDATE L9
0488 74              0996  AC6    LIS    4
0489 EC              0997         XS     S          TEST FOR ROW ON/OFF
                     0998  *                           SELECTION
048A 9416    04A1    0999         BNZ    AC9        JUMP IF ROW ON/OFF
                     1000  *                           NOT SELECTED
048C 6E              1001         LISL   6          SELECT DS REGISTER
048D 70              1002         CLR
048E CD              1003         AS     I          MASK FOR DIGIT ON-BLANK
                     1004  *                           BIT
048F 9108    0498    1005         BM     AD1        JUMP IF LEGEND TO BE
                     1006  *                           FLASHED
0491 64              1007         LISU   4          SELECT L8
0492 6C              1008         LISL   4
0493 2018            1009         LI     H'18'
0495 5D              1010         LR     I,A        L8 UPDATED
0496 903F    04D6    1011         BR     AC8        JUMP TO UPDATE L9
0498 4C              1012  AD1    LR     A,S
0499 18              1013         COM
049A 2118            1014         NI     H'18'
049C 64              1015         LISU   4          SELECT L8
049D 6C              1016         LISL   4
049E 5D              1017         LR     I,A        L8 UPDATED
049F 9036    04D6    1018         BR     AC8        JUMP TO UPDATE L9
04A1 78              1019  AC9    LIS    8
04A2 EC              1020         XS     S          TEST FOR DIST. CAL
                     1021  *                           SELECTION
04A3 9415    04B9    1022         BNZ    AD2        JUMP IF DIST. CAL NOT
                     1023  *                           SELECTED
```

```
04A5 6E              1024            LISL   6        SELECT DS REGISTER
04A6 70              1025            CLR
04A7 CD              1026            AS     I        MASK FOR DIST. ON-BLANK
                     1027   *                         BIT
04A8 9107   04B0     1028            BM     AD3      JUMP IF LEGEND TO BE
                     1029   *                         FLASHED
04AA 64              1030            LISU   4        SELECT L8
04AB 6C              1031            LISL   4
04AC 75              1032            LIS    5
04AD 5D              1033            LR     I,A      L8 UPDATED
04AE 9027   04D6     1034            BR     AC8      JUMP TO UPDATE L9
04B0 4C              1035    AD3     LR     A,S
04B1 18              1036            COM
04B2 2105            1037            NI     H'05'
04B4 64              1038            LISU   4        SELECT L8
04B5 6C              1039            LISL   4
04B6 5D              1040            LR     I,A      L8 UPDATED
04B7 901E   04D6     1041            BR     AC8      JUMP TO UPDATE L9
04B9 79              1042    AD2     LIS    9
04BA EC              1043            XS     S        TEST FOR TEST MODE
                     1044   *                         SELECTION
04BB 9416   04D2     1045            BNZ    AD4      JUMP IF TEST MODE NOT
                     1046   *                         SELECTED
04BD 6E              1047            LISL   6        SELECT DS REGISTER
04BE 70              1048            CLR
04BF CD              1049            AS     I        MASK FOR DIGIT ON-BLANK
                     1050   *                         BIT
04C0 9100   04C9     1051            BM     AD5      JUMP IF LEGEND TO BE
                     1052   *                         FLASHED
04C2 64              1053            LISU   4        SELECT L8
04C3 6C              1054            LISL   4
04C4 2060            1055            LI     H'60'
04C6 5D              1056            LR     I,A      L8 UPDATED
04C7 900E   04D6     1057            BR     AC8      JUMP TO UPDATE L9
04C9 4C              1058    AD5     LR     A,S
04CA 18              1059            COM
04CB 2160            1060            NI     H'60'
04CD 64              1061            LISU   4        SELECT L8
04CE 6C              1062            LISL   4
04CF 5D              1063            LR     I,A      L8 UPDATED
04D0 9005   04D6     1064            BR     AC8      JUMP TO UPDATE L9
04D2 64              1065    AD4     LISU   4        SELECT L8
04D3 6C              1066            LISL   4
04D4 70              1067            CLR
04D5 5D              1068            LR     I,A      L8 UPDATED
04D6 63              1069    AC8     LISU   3        SELECT S3 REGISTER
04D7 6A              1070            LISL   2
04D8 4C              1071            LR     A,S      S3 COUNT TRANSFERRED
                     1072   *                         TO R7
04D9 1F              1073            INC
04DA 57              1074            LR     7,A
04DB 71              1075            LIS    1
04DC 37              1076    AD7     DS     7
04DD 8456   0534     1077            BZ     AD6
04DF 13              1078            SL     1
04E0 94FB   04DC     1079            BNZ    AD7
04E2 78              1080            LIS    8
04E3 EC              1081            XS     S        TEST FOR DIST. CAL.
                     1082   *                         SELECTION
04E4 9414   04F9     1083            BNZ    AD8      JUMP IF DIST. CAL. NOT
                     1084   *                         SELECTED
04E6 64              1085            LISU   4        SELECT FR2 REGISTER
04E7 6F              1086            LISL   7
04E8 74              1087            LIS    4
04E9 FC              1088            NS     S        TEST FOR S3 UNBLANKING
04EA 941D   0508     1089            BNZ    AD9      JUMP IF S3 DISPLAY TO BE
                     1090   *                         LIT
04EC 64              1091            LISU   4        SELECT L5
04ED 69              1092            LISL   1
04EE 4C              1093            LR     A,S
04EF 2240            1094            OI     H'40'    SET BIT 6
```

```
04F1 217F          1095           NI     H'7F'     RESET BIT 7
04F3 5C            1096   AE3     LR     S,A       L5 UPDATED
04F4 6D            1097           LISL   5         SELECT L9
04F5 70            1098           CLR
04F6 5D            1099           LR     I,A       L9 UPDATED
04F7 905D  0555    1100           BR     AE1       JUMP TO UPDATE L11
04F9 64            1101   AD8     LISU   4         SELECT FR2 REGISTER
04FA 6F            1102           LISL   7
04FB 74            1103           LIS    4
04FC FC            1104           NS     S         TEST FOR S3 UNBLANKING
04FD 9426  0524    1105           BNZ    AE2       JUMP IF S3 DISPLAY TO
                   1106   *                          BE LIT
04FF 64            1107           LISU   4         SELECT L5
0500 69            1108           LISL   1
0501 4C            1109           LR     A,S
0502 2280          1110           OI     H'80'     SET BIT 7
0504 213F          1111           NI     H'3F'     RESET BIT 6
0506 90EC  04F3    1112           BR     AE3
0508 63            1113   AD9     LISU   3         SELECT DS REGISTER
0509 6E            1114           LISL   6
050A 70            1115           CLR
050B CC            1116           AS     S         TEST FOR DIGIT ON-BLANK
                   1117   *                          BIT
050C 810F  051C    1118           BP     AE4       JUMP IF LEGEND NOT TO
                   1119   *                          BE BLANKED
050E 64            1120           LISU   4         SELECT L5
050F 69            1121           LISL   1
0510 4C            1122           LR     A,S
0511 2280          1123           OI     H'80'     SET BIT 7
0513 21BF          1124           NI     H'BF'     RESET BIT 6
0515 5C            1125           LR     S,A       L5 UPDATED
0516 6D            1126   AE5     LISL   5         SELECT L9
0517 20FF          1127           LI     H'FF'
0519 5D            1128           LR     I,A       L9 UPDATED
051A 903A  0555    1129           BR     AE1       JUMP TO UPDATE L11
051C 64            1130   AE4     LISU   4         SELECT L5
051D 69            1131           LISL   1
051E 4C            1132           LR     A,S
051F 22C0          1133           OI     H'C0'     SET BITS 6 & 7
0521 5C            1134           LR     S,A       L5 UPDATED
0522 90F3  0516    1135           BR     AE5       JUMP TO UPDATE L9
0524 63            1136   AE2     LISU   3
0525 6E            1137           LISL   6
0526 70            1138           LIS    0
0527 CC            1139           AS     S
0528 81F3  051C    1140           BP     AE4
052A 64            1141           LISU   4
052B 69            1142           LISL   1
052C 4C            1143           LR     A,S
052D 2240          1144           OI     H'40'
052F 217F          1145           NI     H'7F'
0531 5C            1146           LR     S,A
0532 90E3  0516    1147           BR     AE5
0534 57            1148   AD6     LR     7,A       SAVE LEGEND CODE
0535 64            1149           LISU   4         SELECT FR2 REGISTER
0536 6F            1150           LISL   7
0537 74            1151           LIS    4
0538 FC            1152           NS     S         TEST FOR S3 UNBLANKING
0539 940B  0545    1153           BNZ    AE6       JUMP IF S3 DISPLAY TO
                   1154   *                          BE LIT
053B 69            1155           LISL   1         SELECT L5
053C 4C            1156           LR     A,S
053D 213F          1157           NI     H'3F'     RESET BITS 6 & 7
053F 5C            1158           LR     S,A       L5 UPDATED
0540 6D            1159           LISL   5         L9 SELECTED
0541 47            1160           LR     A,7
0542 5D            1161           LR     I,A       L9 UPDATED
0543 9011  0555    1162           BR     AE1       JUMP TO UPDATE L11
0545 69            1163   AE6     LISL   1         SELECT L5
0546 4C            1164           LR     A,S
0547 22C0          1165           OI     H'C0'     SET BITS 6 & 7
```

```
0549 5C              1166           LR    S,A      L5 UPDATED
054A 63              1167           LISU  3        SELECT DS REGISTER
054B 6E              1168           LISL  6
054C 70              1169           CLR
054D CC              1170           AS    S        TEST FOR DIGIT ON-BLANK
                     1171 *                           BIT
054E 64              1172           LISU  4
054F 81C6   0516     1173           BP    AE5      JUMP IF LEGEND NOT TO
                     1174 *                           BE BLANKED
0551 6D              1175           LISL  5        SELECT L9
0552 47              1176           LR    A,7
0553 18              1177           COM
0554 5D              1178           LR    I,A      L9 UPDATED
0555 63              1179 AE1       LISU  3        SELECT S3 REGISTER
0556 6A              1180           LISL  2
0557 20FC            1181           LI    H'FC'    SUBTRACT 4 FROM S3
0559 CC              1182           AS    S
055A 9214   056F     1183           BNC   AE7      JUMP IF DECIMAL POINT TO
                     1184 *                           BE LIT
055C 76              1185           LIS   6
055D EC              1186           XS    S        TEST FOR ROW SPACE
                     1187 *                           SELECTION
055E 8407   0566     1188           BZ    AFA      JUMP IF ROW SPACE SELECTED
                     1189 *                           & DECIMAL POINT TO BE
                     1190 *                           LIT
0560 64              1191           LISU  4
0561 6E              1192           LISL  6
0562 70              1193           CLR
0563 5C              1194           LR    S,A      L11 UPDATED
0564 900F   0574     1195           BR    AE8
0566 61              1196 AFA       LISU  1        ROW SPACE TO C3-C4
0567 6B              1197           LISL  3
0568 2A10AF 10AF     1198           DCI   H'10AF'
056B 16              1199           LM
056C 5E              1200           LR    D,A
056D 16              1201           LM
056E 5C              1202           LR    S,A
056F 64              1203 AE7       LISU  4
0570 6E              1204           LISL  6
0571 2010            1205           LI    H'10'
0573 5C              1206           LR    S,A      L11 UPDATED
0574 63              1207 AE8       LISU  3
0575 6A              1208           LISL  2
0576 70              1209           LIS   0        TEST FOR LO FAIL SET SELEC
0577 EC              1210           XS    S
0578 8414   058D     1211           BZ    AHA      JUMP IF LO FAIL SET SELECT
057A 71              1212           LIS   1        TEST FOR HI FAIL SET SELEC
057B EC              1213           XS    S
057C 841B   0598     1214           BZ    AJA      JUMP IF HI FAIL SET SELECT
057E 77              1215           LIS   7        TEST FOR SEED/WT SELECTION
057F EC              1216           XS    S
0580 9420   05A1     1217           BNZ   AIA      JUMP IF SEED/WT NOT SELECT
0582 61              1218           LISU  1
0583 6B              1219           LISL  3
0584 2A10B1 10B1     1220           DCI   H'10B1'  SEED WT TO C3-C4
0587 16              1221           LM
0588 5E              1222           LR    D,A
0589 16              1223           LM
058A 5C              1224           LR    S,A
058B 9015   05A1     1225           BR    AIA
058D 61              1226 AHA       LISU  1
058E 6A              1227           LISL  2
058F 2A10AA 10AA     1228           DCI   H'10AA'  LO FAIL SET TO C3-C4
0592 16              1229           LM
0593 5D              1230           LR    I,A
0594 16              1231           LM
0595 5C              1232           LR    S,A
0596 900A   05A1     1233           BR    AIA
0598 61              1234 AJA       LISU  1
0599 6A              1235           LISL  2
059A 2A10A8 10A8     1236           DCI   H'10A8'  HI FAIL SET TO C3-C4
```

```
059D  16              1237        LM
059E  5D              1238        LR    I,A
059F  16              1239        LM
05A0  5C              1240        LR    S,A
05A1  63              1241  AIA   LISU  3
05A2  2902E0  02E0    1242        JMP   Y2
05A5  63              1243  AB5   LISU  3
05A6  6E              1244        LISL  6
05A7  74              1245        LIS   4
05A8  FD              1246        NS    I
05A9  8405    05AF    1247        BZ    SAD
05AB  74              1248        LIS   4
05AC  FC              1249        NS    S
05AD  9475    0623    1250        BNZ   AG6
05AF  67              1251  SAD   LISU  7                CHECK FOR .1 ACRE UPDATE
05B0  6B              1252        LISL  3                2614 DC/RW N
05B1  2036            1253        LI    H'36'
05B3  5E              1254        LR    D,A
05B4  7A              1255        LIS   H'A'
05B5  5E              1256        LR    D,A
05B6  70              1257        CLR
05B7  5E              1258        LR    D,A
05B8  5E              1259        LR    D,A
05B9  66              1260        LISU  6
05BA  69              1261        LISL  1
05BB  2A10AE  10AE    1262        DCI   H'10AE'
05BE  16              1263        LM
05BF  5E              1264        LR    D,A
05C0  70              1265        CLR
05C1  5C              1266        LR    S,A
05C2  280730  0730    1267        PI    SUBDIV
05C5  2A10B3  10B3    1268        DCI   H'10B3'
05C8  66              1269        LISU  6
05C9  6B              1270        LISL  3
05CA  16              1271        LM
05CB  5E              1272        LR    D,A
05CC  16              1273        LM
05CD  5C              1274        LR    S,A
05CE  2806E2  06E2    1275        PI    SUBMUL
05D1  2A10AF  10AF    1276        DCI   H'10AF'
05D4  66              1277        LISU  6
05D5  69              1278        LISL  1
05D6  16              1279        LM
05D7  5E              1280        LR    D,A
05D8  16              1281        LM
05D9  5E              1282        LR    D,A
05DA  280730  0730    1283        PI    SUBDIV
05DD  65              1284        LISU  5
05DE  6B              1285        LISL  3
05DF  4C              1286        LR    A,S
05E0  67              1287        LISU  7
05E1  5E              1288        LR    D,A
05E2  65              1289        LISU  5
05E3  4C              1290        LR    A,S
05E4  67              1291        LISU  7
05E5  5E              1292        LR    D,A
05E6  70              1293        CLR
05E7  5E              1294        LR    D,A
05E8  5E              1295        LR    D,A
05E9  66              1296        LISU  6
05EA  6B              1297        LISL  3
05EB  2026            1298        LI    H'26'             GET AC CHIP DIST ACC .1A
05ED  54              1299        LR    4,A
05EE  2807E0  07E0    1300        PI    SUBACK
05F1  2027            1301        LI    H'27'             GET AC CHIP DIST ACCUM .1
05F3  54              1302        LR    4,A
05F4  2807E0  07E0    1303        PI    SUBACK
05F7  70              1304        CLR
05F8  5E              1305        LR    D,A
05F9  5E              1306        LR    D,A
05FA  2807A2  07A2    1307        PI    SUBMIN
```

```
05FD 8225    0623 1308           BC    AG6
05FF 6B           1309           LISL  3
0600 20A6         1310           LI    H'A6'       RESET DIST ACCUM .1A C0
0602 54           1311           LR    4,A
0603 2807E0 07E0 1312            PI    SUBACK
0606 20A7         1313           LI    H'A7'       RESET DIST ACCUM .1A C1
0608 54           1314           LR    4,A
0609 2807E0 07E0 1315            PI    SUBACK
060C 2A10A4 10A4 1316            DCI   H'10A4'     INC FIELD AREA
060F 2C           1317           XDC
0610 2A10A4 10A4 1318            DCI   H'10A4'
0613 16           1319           LM
0614 1F           1320           INC
0615 2C           1321           XDC
0616 17           1322           ST
0617 16           1323           LM
0618 19           1324           LNK
0619 2C           1325           XDC
061A 17           1326           ST                FIELD AREA INC
061B 16           1327           LM                INC TOTAL AREA
061C 1F           1328           INC
061D 2C           1329           XDC
061E 17           1330           ST
061F 16           1331           LM
0620 19           1332           LNK
0621 2C           1333           XDC
0622 17           1334           ST                TOTAL AREA INC
0623 65           1335     AG6   LISU  5           TEST FOR 1/200TH OF ACRE
0624 6B           1336           LISL  3           131 DC/RN
0625 2083         1337           LI    H'83'       D '131'
0627 5E           1338           LR    D,A         R53-D131
0628 70           1339           CLR
0629 5D           1340           LR    I,A         R52 TO
062A 66           1341           LISU  6
062B 2A10B3 10B3 1342            DCI   H'10B3'
062E 16           1343           LM
062F 5E           1344           LR    D,A
0630 16           1345           LM
0631 5C           1346           LR    S,A
0632 2806E2 06E2 1347            PI    SUBMUL
0635 66           1348           LISU  6
0636 69           1349           LISL  1
0637 2A10AF 10AF 1350            DCI   H'10AF'
063A 16           1351           LM
063B 5E           1352           LR    D,A
063C 16           1353           LM
063D 5C           1354           LR    S,A
063E 280730 0730 1355            PI    SUBDIV
0641 65           1356           LISU  5           TRANS R52-53 TO R70-73
0642 6B           1357           LISL  3
0643 4C           1358           LR    A,S
0644 67           1359           LISU  7
0645 5E           1360           LR    D,A
0646 65           1361           LISU  5
0647 4C           1362           LR    A,S
0648 67           1363           LISU  7
0649 5E           1364           LR    D,A
064A 70           1365           CLR
064B 5E           1366           LR    D,A
064C 5C           1367           LR    S,A
064D 66           1368           LISU  6
064E 6B           1369           LISL  3
064F B0           1370           OUTS  0
0650 2020         1371           LI    H'20'       GET AC CHIP DIST ACCUM
                  1372    *                        1/200 ACRE   C0
0652 54           1373           LR    4,A
0653 2807E0 07E0 1374            PI    SUBACK
0656 2021         1375           LI    H'21'       GET AC CHIP DIST ACCUM
                  1376    *                        1/200 ACRE C1
0658 54           1377           LR    4,A
0659 2807E0 07E0 1378            PI    SUBACK
```

```
065C 70            1379         CLR
065D 5E            1380         LR    D,A
065E 5C            1381         LR    S,A
065F 2807A2 07A2   1382         PI    SUBMIN
0662 826B   06CE   1383         BC    YYY        JMP IF NO BORROW 'DIST
                   1384   *                        ACCUM LESS THAN 1/200 AC
0664 20A0          1385         LI    H'A0'      RESET DIST. ACCUM
                   1386   *                        (1/200 ACRE)  C0
0666 54            1387         LR    4,A
0667 6C            1388         LISL  4
0668 2807E0 07E0   1389         PI    SUBACK
066B 20A1          1390         LI    H'A1'      RESET DIST. ACCUM.
                   1391   *                        (1/200 ACRE)  C1
066D 54            1392         LR    4,A
066E 2807E0 07E0   1393         PI    SUBACK
0671 2020          1394         LI    H'20'      TRANSFER C->D
0673 57            1395         LR    7,A        SET UP CYCLE COUNTER
0674 2A1040 1040   1396         DCI   H'1040'
0677 2C            1397         XDC
0678 2A1060 1060   1398         DCI   H'1060'
067B 2C            1399   A18   XDC
067C 16            1400         LM
067D 2C            1401         XDC
067E 17            1402         ST
067F 37            1403         DS    7
0680 94FA   067B   1404         BNZ   A18
0682 2020          1405         LI    H'20'      TRANSFER B->C
0684 57            1406         LR    7,A
0685 2A1020 1020   1407         DCI   H'1020'
0688 2C            1408         XDC
0689 2A1040 1040   1409         DCI   H'1040'
068C 2C            1410   AI9   XDC
068D 16            1411         LM
068E 2C            1412         XDC
068F 17            1413         ST
0690 37            1414         DS    7
0691 94FA   068C   1415         BNZ   AI9
0693 2020          1416         LI    H'20'      TRANSFER A->B
0695 57            1417         LR    7,A
0696 2A1000 1000   1418         DCI   H'1000'
0699 2C            1419         XDC
069A 2A1020 1020   1420         DCI   H'1020'
069D 2C            1421   AJ1   XDC
069E 16            1422         LM
069F 2C            1423         XDC
06A0 17            1424         ST
06A1 37            1425         DS    7
06A2 94FA   069D   1426         BNZ   AJ1
06A4 2A1000 1000   1427         DCI   H'1000'    TRANSFER AC CHIP ->A
06A7 2080          1428         LI    H'80'      SET UP POSITION DECODE
                   1429   *                        W/RESET
06A9 54            1430         LR    4,A
06AA 2807E0 07E0   1431   AJ3   PI    SUBACK
06AD 4D            1432         LR    A,I        DUMMY INST. TO INC ISAR
06AE 4C            1433         LR    A,S        DATA
06AF 17            1434         ST
06B0 44            1435         LR    A,4
06B1 1F            1436         INC
06B2 54            1437         LR    4,A
06B3 20A0          1438         LI    H'A0'
06B5 E4            1439         XS    4
06B6 94F3   06AA   1440         BNZ   AJ3
06B8 2A1080 1080   1441         DCI   H'1080'    RESET ALL SEED DIST.
                   1442   *                        REF. REGISTERS
06BB 2024          1443         LI    H'24'      SET UP CYCLE COUNTER
06BD 57            1444         LR    7,A
06BE 70            1445         CLR
06BF 17            1446   AJ4   ST
06C0 37            1447         DS    7
06C1 94FD   06BF   1448         BNZ   AJ4        ALL SEED DIST. REF.
                   1449   *                        REGISTERS RESET
```

```
06C3 62              1450          LISU   2
06C4 6A              1451          LISL   2
06C5 2013            1452          LI     H'13'
06C7 5D              1453          LR     I,A              1-SEC ALARM COUNTER TO SET
06C8 204E            1454          LI     H'4E'
06CA 5D              1455          LR     I,A              1-SEC MPH COUNTER TO RESET
06CB 204E            1456          LI     H'4E'
06CD 5C              1457          LR     S,A              2-SEC UPDATE SEED/SEC COUNT
                     1458   *                              T1 RESET
06CE 290069 0069     1459   YYY    JMP    A15              ALL DONE, GO DO IT AGAIN
                     1460   *------------------------------------------
                     1461   *      TBL1
                     1462   *------------------------------------------
06D1 00              1463   TBL1   DC     H'00'
06D2 01              1464          DC     H'01'
06D3 02              1465          DC     H'02'
06D4 04              1466          DC     H'04'
06D5 08              1467          DC     H'08'
06D6 10              1468          DC     H'10'
06D7 20              1469          DC     H'20'
06D8 40              1470          DC     H'40'
06D9 80              1471          DC     H'80'
06DA 01              1472          DC     H'01'
06DB 02              1473          DC     H'02'
06DC 04              1474          DC     H'04'
06DD 08              1475          DC     H'08'
06DE 10              1476          DC     H'10'
06DF 20              1477          DC     H'20'
06E0 40              1478          DC     H'40'
06E1 80              1479          DC     H'80'
                     1480   *------------------------------------------
                     1481   *      SUBMUL
                     1482   *------------------------------------------
06E2 1A              1483   SUBMUL DI
06E3 2010            1484          LI     H'10'            MULTIPLICATION SUB XY=Z
06E5 50              1485          LR     0,A              X=R52-53  Y=R62-63
                     1486   *                              Z=R70-73
06E6 65              1487          LISU   5                CYCLE CNTER -> 16 BITS
06E7 69              1488          LISL   1
06E8 70              1489          CLR
06E9 5E              1490          LR     D,A
06EA 5C              1491          LR     S,A              REG 50 - 51 RESET
06EB 67              1492          LISU   7
06EC 6B              1493          LISL   3
06ED 5E              1494   AK1    LR     D,A
06EE 8FFE 06ED       1495          BR7    AK1              Z (RESULT COUNTER) RESET
06F0 66              1496   AK8    LISU   6
06F1 6A              1497          LISL   2
06F2 70              1498          LIS    0
06F3 CD              1499          AS     I
06F4 8110 0705       1500          BP     AK2
06F6 18              1501          COM                     INITIALLY CLEAR CARRY STAT
06F7 65              1502   AK3    LISU   5                X+Z -> Z
06F8 4C              1503          LR     A,S
06F9 67              1504          LISU   7
06FA 19              1505          LNK
06FB 1E              1506          LR     J,W
06FC CC              1507          AS     S
06FD 5E              1508          LR     D,A
06FE 49              1509          LR     A,9
06FF 1E              1510          LR     J,W
0700 E9              1511          XS     9
0701 59              1512          LR     9,A
0702 1D              1513          LR     W,J
0703 8FF3 06F7       1514          BR7    AK3              X+Z -> Z
0705 30              1515   AK2    DS     0
0706 8427 072E       1516          BZ     AK4              JUMP IF DONE
0708 73              1517          LIS    3                SHIFT Z LEFT ONE
0709 51              1518          LR     1,A
070A 67              1519          LISU   7
070B 68              1520          LISL   0
```

```
070C 4C        1521 AK6    LR    A,S
070D 13        1522        SL    1
070E 5D        1523        LR    I,A
070F 70        1524        LIS   0
0710 CC        1525        AS    S
0711 8105 0717 1526        BP    AK5
0713 5E        1527        LR    D,A     DUMMY INSTRUCTION TO
               1528 *                     DEC. ISAR
0714 71        1529        LIS   1
0715 CC        1530        AS    S
0716 5D        1531        LR    I,A
0717 31        1532 AK5    DS    1
0718 94F3 070C 1533        BNZ   AK6
071A 4C        1534        LR    A,S
071B 13        1535        SL    1
071C 5E        1536        LR    D,A
071D 66        1537        LISU  6         SHIFT Y LEFT ONE
071E 4C        1538        LR    A,S
071F 13        1539        SL    1
0720 5D        1540        LR    I,A
0721 70        1541        LIS   0
0722 CC        1542        AS    S
0723 8105 0729 1543        BP    AK7
0725 5E        1544        LR    D,A       DUMMY INST. TO DEC. ISAR
0726 71        1545        LIS   1
0727 CC        1546        AS    S
0728 5D        1547        LR    I,A
0729 4C        1548 AK7    LR    A,S
072A 13        1549        SL    1
072B 5C        1550        LR    S,A
072C 90C3 06F0 1551        BR    AK8
072E 1B        1552 AK4    EI
072F 1C        1553        POP
               1554 *---------------------------------------
               1555 *     SUB-DIVIDE
               1556 *---------------------------------------
0730 1A        1557 SUBDIV DI
0731 2010      1558        LI    H'10'     DIV SUBROUTINE Z/Y=X
0733 50        1559        LR    0,A       X=R52-R53  Y=R60-R61
               1560 *                       Z=R70-R73
0734 65        1561        LISU  5         CYCLE CNTER -> 16 BITS
0735 6A        1562        LISL  2
0736 70        1563        CLR
0737 5D        1564        LR    I,A
0738 5C        1565        LR    S,A
0739 66        1566        LISU  6
073A 5E        1567        LR    D,A
073B 5C        1568        LR    S,A       R52-53 & R62-63 RESET
073C 65        1569 AL8    LISU  5         SHIFT X LEFT 1
073D 6A        1570        LISL  2
073E 4C        1571        LR    A,S
073F 13        1572        SL    1
0740 5D        1573        LR    I,A
0741 70        1574        CLR
0742 CC        1575        AS    S
0743 8105 0749 1576        BP    AL1
0745 5E        1577        LR    D,A       DUMMY INSRUCTION TO DEC
               1578 *                       ISAR
0746 71        1579        LIS   1
0747 CC        1580        AS    S
0748 5D        1581        LR    I,A
0749 4C        1582 AL1    LR    A,S
074A 13        1583        SL    1
074B 5C        1584        LR    S,A
074C 66        1585        LISU  6         SHIFT Y RIGHT 1
074D 4C        1586 AL3    LR    A,S
074E 12        1587        SR    1
074F 5E        1588        LR    D,A
0750 8F33 0784 1589        BR7   AL2       JMP IF SHIFT DONE
0751 72        1590        LIS   2         Z - Y -> Z
0753 59        1591        LR    9,A
```

```
0754 1D            1592          LR     W,J         CARRY INITIALLY SET
0755 6B            1593          LISL   3
0756 67            1594   AL5    LISU   7
0757 4C            1595          LR     A,S
0758 19            1596          LNK
0759 51            1597          LR     1,A
075A 1E            1598          LR     J,W
075B 66            1599          LISU   6
075C 4C            1600          LR     A,S
075D 18            1601          COM
075E C1            1602          AS     1
075F 67            1603          LISU   7
0760 5E            1604          LR     D,A
0761 8202  0764    1605          BC     AL4
0763 1D            1606          LR     W,J
0764 8FF1  0756    1607   AL4    BR7    AL5         SUBTRACTION DONE
0766 8216  077D    1608          BC     AL6         JMP IF Z > 0
0768 18            1609          COM                Z + Y -> Z
0769 6B            1610          LISL   3
076A 66            1611   AL7    LISU   6
076B 4C            1612          LR     A,S
076C 19            1613          LNK
076D 1E            1614          LR     J,W
076E 67            1615          LISU   7
076F CC            1616          AS     S
0770 5E            1617          LR     D,A
0771 49            1618          LR     A,9
0772 1E            1619          LR     J,W
0773 E9            1620          XS     9
0774 59            1621          LR     9,A
0775 1D            1622          LR     W,J
0776 8FF3  076A    1623          BR7    AL7         ADDITION DONE
0778 30            1624   AL9    DS     0
0779 94C2  073C    1625          BNZ    AL8         JMP IF ALL 16 DIGITS NOT
                   1626    *                          DONE
077B 1B            1627          EI
077C 1C            1628          POP
077D 65            1629   AL6    LISU   5
077E 6B            1630          LISL   3
077F 71            1631          LIS    1
0780 CC            1632          AS     S
0781 5E            1633          LR     D,A
0782 90F5  0778    1634          BR     AL9
0784 71            1635   AL2    LIS    1           TEST FOR TRANSFER BIT
0785 FC            1636          NS     S
0786 84C6  074D    1637          BZ     AL3         JMP IF TRANS BIT NOT SET
0788 FD            1638          NS     I           DUMMY INST TO INC ISAR
0789 2080          1639          LI     H'80'
078B CC            1640          AS     S
078C 5E            1641          LR     D,A
078D 90BF  074D    1642          BR     AL3
                   1643   *-----------------------
                   1644   *      SUBPLS
                   1645   *-----------------------
078F 1A            1646   SUBPLS DI
0790 18            1647          COM                ADD  Z + Y -> Z
0791 6B            1648          LISL   3           Y = R60-63   Z = R70-73
0792 66            1649   AM3    LISU   6
0793 4C            1650          LR     A,S
0794 19            1651          LNK
0795 1E            1652          LR     J,W
0796 67            1653          LISU   7
0797 CC            1654          AS     S
0798 5E            1655          LR     D,A
0799 49            1656          LR     A,9
079A 1E            1657          LR     J,W
079B E9            1658          XS     9
079C 59            1659          LR     9,A
079D 1D            1660          LR     W,J
079E 8FF3  0792    1661          BR7    AM3         ADDITION DONE
07A0 1B            1662          EI
```

```
07A1 1C        1663              POP
               1664   *------------------------------------------------
               1665   *    SUB-MINUS
               1666   *------------------------------------------------
07A2 1A        1667   SUBMIN   DI
07A3 72        1668            LIS    2              SUB ROUTINE Z - Y -> Z
07A4 59        1669            LR     9,A            Z = R70-73   Y = R60-63
07A5 1D        1670            LR     W,J            CARRY INITIALLY SET
07A6 6B        1671            LISL   3
07A7 67        1672   AM2      LISU   7
07A8 4C        1673            LR     A,S
07A9 19        1674            LNK
07AA 51        1675            LR     1,A
07AB 1E        1676            LR     J,W
07AC 66        1677            LISU   6
07AD 4C        1678            LR     A,S
07AE 18        1679            COM
07AF C1        1680            AS     1
07B0 67        1681            LISU   7
07B1 5E        1682            LR     D,A
07B2 8202 07B5 1683            BC     AM1
07B4 1D        1684            LR     W,J
07B5 8FF1 07A7 1685   AM1      BR7    AM2            SUBTRACTION DONE
07B7 1B        1686            EI
07B8 1C        1687            POP
               1688   *------------------------------------------------
               1689   *    SUBOUT
               1690   *------------------------------------------------
07B9 1A        1691   SUBOUT   DI
07BA 44        1692            LR     A,4
07BB B0        1693            OUTS   0
07BC 7E        1694            LIS    H'E'
07BD B1        1695            OUTS   1
07BE 2030      1696            LI     H'30'
07C0 50        1697            LR     0,A
07C1 30        1698   Z6A      DS     0
07C2 94FE 07C1 1699            BNZ    Z6A
07C4 70        1700            CLR
07C5 B1        1701            OUTS   1
07C6 2030      1702            LI     H'30'
07C8 50        1703            LR     0,A
07C9 30        1704   Z6B      DS     0
07CA 94FE 07C9 1705            BNZ    Z6B
07CC 4D        1706            LR     A,I
07CD B0        1707            OUTS   0
07CE 7D        1708            LIS    H'D'
07CF B1        1709            OUTS   1
07D0 2030      1710            LI     H'30'
07D2 50        1711            LR     0,A
07D3 30        1712   Z6C      DS     0
07D4 94FE 07D3 1713            BNZ    Z6C
07D6 70        1714            CLR
07D7 B1        1715            OUTS   1
07D8 2030      1716            LI     H'30'
07DA 50        1717            LR     0,A
07DB 30        1718   Z6D      DS     0
07DC 94FE 07DB 1719            BNZ    Z6D
07DE 1B        1720            EI
07DF 1C        1721            POP
               1722   *------------------------------------------------
               1723   *    SUBACK
               1724   *------------------------------------------------
07E0 1A        1725   SUBACK   DI
07E1 44        1726            LR     A,4
07E2 B0        1727            OUTS   0              SEND OUT REGISTER CODE
07E3 2040      1728            LI     H'40'
07E5 B1        1729            OUTS   1              AC CHIP INTERRUPTED
07E6 A1        1730   AG3      INS    1
07E7 81FE 07E6 1731            BP     AG3            WAIT FOR ACKNOWLEDGE
07E9 70        1732            CLR
07EA B0        1733            OUTS   0
```

```
07EB A0      1734            INS    0         READ DATA
07EC 5E      1735            LR     D,A
07ED 70      1736            CLR
07EE B1      1737            OUTS   1         RESET INTERRUPT REQUEST
07EF A1      1738    REA     INS    1
07F0 81FE 07EF 1739          BP     REA
07F2 1B      1740            EI
07F3 1C      1741            POP
             1742    *-------------------------------
             1743    *       DECIMAL CONVERSION SUBROUTINE
             1744    *-------------------------------
07F4 1A      1745    SUBDEC  DI
07F5 6C      1746            LISL   4
07F6 65      1747            LISU   5
07F7 01      1748            LR     A,KL
07F8 5D      1749            LR     I,A
07F9 00      1750            LR     A,KU
07FA 5C      1751            LR     S,A
07FB 08      1752            LR     K,P
07FC 66      1753            LISU   6
07FD 6B      1754            LISL   3
07FE 20E8    1755            LI     H'E8'
0800 5E      1756            LR     D,A
0801 73      1757            LIS    3
0802 5E      1758            LR     D,A
0803 70      1759            CLR
0804 5E      1760            LR     D,A
0805 5E      1761            LR     D,A
0806 56      1762            LR     6,A
0807 57      1763            LR     7,A
0808 2307A2 07A2 1764  I3    PI     SUBMIN
080B 1A      1765            DI
080C 9206 0813 1766          BNC    I1
080E 46      1767            LR     A,6
080F 1F      1768            INC
0810 56      1769            LR     6,A
0811 90F6 0808 1770          BR     I3
0813 28078F 078F 1771  I1    PI     SUBPLS
0816 1A      1772            DI
0817 46      1773            LR     A,6
0818 15      1774            SL     4
0819 56      1775            LR     6,A
081A 66      1776            LISU   6
081B 6B      1777            LISL   3
081C 2064    1778            LI     H'64'
081E 5E      1779            LR     D,A
081F 70      1780            CLR
0820 5E      1781            LR     D,A
0821 2307A2 07A2 1782  M3    PI     SUBMIN
0824 1A      1783            DI
0825 9206 082C 1784          BNC    I5
0827 46      1785            LR     A,6
0828 1F      1786            INC
0829 56      1787            LR     6,A
082A 90F6 0821 1788          BR     M3
082C 28078F 078F 1789  I5    PI     SUBPLS
082F 1A      1790            DI
0830 66      1791            LISU   6
0831 6B      1792            LISL   3
0832 7A      1793            LIS    H'A'
0833 5E      1794            LR     D,A
0834 70      1795            CLR
0835 5E      1796            LR     D,A
0836 2307A2 07A2 1797  M5    PI     SUBMIN
0839 1A      1798            DI
083A 9206 0841 1799          BNC    M4
083C 47      1800            LR     A,7
083D 1F      1801            INC
083E 57      1802            LR     7,A
083F 90F6 0836 1803          BR     M5
0841 28078F 078F 1804  M4    PI     SUBPLS
```

```
0844 1A          1805           DI
0845 47          1806           LR      A,7
0846 15          1807           SL      4
0847 57          1808           LR      7,A
0848 67          1809           LISU    7
0849 6B          1810           LISL    3
084A 4D          1811           LR      A,1
084B C7          1812           AS      7
084C 57          1813           LR      7,A
084D 09          1814           LR      P,K
084E 65          1815           LISU    5
084F 4D          1816           LR      A,1
0850 85          1817           LR      KL,A
0851 4C          1818           LR      A,S
0852 04          1819           LR      KU,A
0853 1B          1820           EI
0854 1C          1821           POP
                 0001
                 0002   *
                 0003   *
                 0004   *
                 0005   *
                 0006           ORG     H'08A0'
08A0 0A          0007           LR      A,IS        ISAR TO ACC. FOR SAVING
08A1 51          0008           LR      1,A         PREPARE TO SAVE ISAR
08A2 0E          0009           LR      Q,DC        DC0 TO Q REGISTERS
08A3 2A10B7 10B7 0010          DCI     H'10B7'
08A6 02          0011           LR      A,QU
08A7 17          0012           ST
08A8 03          0013           LR      A,QL
08A9 17          0014           ST                  DCA STORED
08AA 2C          0015           XDC
08AB 0E          0016           LR      Q,DC        DC1 STORED IN Q
08AC 2C          0017           XDC
08AD 60          0018           LISU    0
08AE 68          0019           LISL    0
08AF 4D          0020   ST1     LR      A,I         STORE R0 THRU R6
08B0 17          0021           ST
08B1 8FFD   08AF 0022           BR7     ST1
08B3 47          0023           LR      A,7
08B4 17          0024           ST                  STORE R7
08B5 49          0025           LR      A,9
08B6 17          0026           ST                  STORE R9
08B7 65          0027           LISU    5
08B8 6B          0028           LISL    3
08B9 4E          0029   ST2     LR      A,D         STORE R50 THRU R53
08BA 17          0030           ST
08BB 8FFD   08B9 0031           BR7     ST2
08BD 66          0032           LISU    6
08BE 6B          0033           LISL    3
08BF 4E          0034   ST3     LR      A,D         STORE R60 THRU R63
08C0 17          0035           ST
08C1 8FFD   08BF 0036           BR7     ST3
08C3 67          0037           LISU    7
08C4 6B          0038           LISL    3
08C5 4E          0039   ST4     LR      A,D         STORE R70 THRU R73
08C6 17          0040           ST
08C7 8FFD   08C5 0041           BR7     ST4
08C9 00          0042           LR      A,KU
08CA 50          0043           LR      0,A         STORE ROW FAIL REGISTER
08CB 01          0044           LR      A,KL
08CC 51          0045           LR      1,A
08CD 08          0046           LR      K,P         PREP TO SAVE PC1
08CE 00          0047           LR      A,KU
08CF 17          0048           ST
08D0 01          0049           LR      A,KL
08D1 17          0050           ST                  PC1 SAVED
08D2 40          0051           LR      A,0
08D3 04          0052           LR      KU,A
08D4 41          0053           LR      A,1
08D5 05          0054           LR      KL,A        ROW FAIL REGS. RESTORED
```

```
08D6  1E              0055        LR    J,W
08D7  49              0056        LR    A,9
08D8  17              0057        ST
08D9  62              0058        LISU  2
08DA  68              0059        LISL  0
08DB  3D              0060        DS    I              DEC TIMER T2
08DC  3D              0061        DS    I              DEC TIMER T5
08DD  70              0062        LIS   0              PREPARE TO DEC TIMER T6
08DE  CC              0063        AS    S              STATUS REGISTER ACTIVATED
08DF  8402  08E2      0064        BZ    A2             IF COUNTER STOPPED (H'FF')
                      0065   *                            DO NOT DECREMENT
08E1  3C              0066        DS    S              DEC TIMER T6
08E2  6B              0067  A2    LISL  3              PREPARE TO DEC CNTER T3
08E3  3D              0068        DS    I              DEC TIMER T3
08E4  3D              0069        DS    I              DEC TIMER T4
08E5  70              0070        LIS   0              PREPARE TO DEC CNTER T1
08E6  CC              0071        AS    S              STATUS REG ACTIVATED
08E7  9102  08EA      0072        BM    A3             IF CNTER STOPPED (H'FF')
                      0073   *                            DO NOT DEC
08E9  3C              0074        DS    S              DEC TIMER T1
08EA  68              0075  A3    LISL  0              PREPARE TO CHECK T2(1/4SE
08EB  70              0076        LIS   0              PREPARE TO ACT STAT REG
08EC  CD              0077        AS    I              STAT REG ACTIVATED TO T2
08ED  940B  08F9      0078        BNZ   D8             JUMP IF T2 IS NOT 0
08EF  63              0079        LISU  3              PREPARE TO COMP FLASH BI
08F0  6E              0080        LISL  6              DS REG SELECTED
08F1  2080            0081        LI    H'80'          COMP MASK FOR BIT 7
08F3  EC              0082        XS    S              BIT 7 COMP
08F4  5C              0083        LR    S,A            RESULT RESTORED IN DS REG
08F5  62              0084  C8    LISU  2              PREPARE TO RESET T2(1/4SE
08F6  68              0085        LISL  0
08F7  7A              0086        LIS   H'A'           TIMER CNT OF 10 TO BE LDE
08F8  5D              0087        LR    I,A            T2 RELOADED
08F9  70              0088  D8    LIS   0              PREPARE TO CHECK T5(1/2SE
08FA  CD              0089        AS    I              STAT REG ACTIVATED TO T5
08FB  9448  0944      0090        BNZ   BA1            JUMP IF T5 IS NOT 0
08FD  63              0091        LISU  3
08FE  6E              0092        LISL  6
08FF  74              0093        LIS   4
0900  FC              0094        NS    S
0901  943B  093D      0095        BNZ   B/B
0903  2020            0096        LI    H'20'
0905  FC              0097        NS    S
0906  9426  092D      0098        BNZ   NOD
0908  61              0099        LISU  1              PREPARE TO CHECK ROW FAIL
0909  6C              0100        LISL  4
090A  4D              0101        LR    A,I
090B  50              0102        LR    0,A            RFR1 ROW FAIL CODE IN R0
090C  4E              0103        LR    A,D
090D  51              0104        LR    1,A            RFR2 ROW FAIL CODE IN R1
090E  4D              0105        LR    A,I            RFR1 TO ACC.
090F  CC              0106        AS    S              ADD RFR2 TO RFR1
0910  19              0107        LNK                  ADD IN ANY CARRY
0911  345A  0962      0108        BZ    E1             JUMP IF NO ROW FAILED TO
                      0109   *                            CHECK FOR ROW HI-LO
0913  63              0110        LISU  3
0914  6C              0111        LISL  4              SELECT C2 CNTER
0915  71              0112        LIS   1              ADD 1 TO ROW#
0916  CC              0113        AS    S              NEXT ROW TO BE TESTED
0917  5C              0114        LR    S,A            RESTORE NEW ROW#
0918  2011            0115        LI    H'11'
091A  EC              0116        XS    S
091B  8437  0953      0117        BZ    G5
091D  2A06D1  06D1    0118  E6    DCI   TBL1           PREPARE TO RETRIEVE ROW
                      0119   *                            FAIL CODE
0920  4C              0120        LR    A,S            PREPARE TO ADD ROW # TO 1
0921  8E              0121        ADC                  DCO NOW POINTING TO ROW
                      0122   *                            FAIL CODE
0922  20F7            0123  E3    LI    H'F7'          PREPARE TEST FOR ROWS 1-
                      0124   *                            OR 9-16
0924  CC              0125        AS    S              C2-9
```

| | | | | | | |
|---|---|---|---|---|---|---|
| 0925 8221 | 0947 | 0126 | | BC | E2 | JUMP IF ROW # >8 |
| 0927 16 | | 0127 | | LM | | ROW FAIL CODE TO ACC. |
| 0928 F0 | | 0128 | | NS | 0 | ROW FAIL INDICATOR MASKED |
| | | 0129 | * | | | FOR |
| 0929 9430 | 095A | 0130 | | BNZ | E4 | JUMP IF ROW FAILURE FOUND |
| 092B 901F | 094B | 0131 | | BR | E5 | JUMP TO TEST NEXT ROW |
| 092D 64 | | 0132 | NOD | LISU | 4 | |
| 092E 6A | | 0133 | | LISL | 2 | |
| 092F 2050 | | 0134 | | LI | H'50' | |
| 0931 5D | | 0135 | | LR | 1,A | |
| 0932 4C | | 0136 | | LR | A,S | |
| 0933 2280 | | 0137 | | OI | H'80' | |
| 0935 5C | | 0138 | | LR | S,A | |
| 0936 63 | | 0139 | | LISU | 3 | |
| 0937 6C | | 0140 | | LISL | 4 | |
| 0938 70 | | 0141 | | LIS | 0 | |
| 0939 5C | | 0142 | | LR | S,A | |
| 093A 290A01 | 0A01 | 0143 | | JMP | G2 | |
| 093D C4 | | 0144 | BYB | LISU | 4 | |
| 093E 6A | | 0145 | | LISL | 2 | |
| 093F 70 | | 0146 | | CLR | | |
| 0940 5C | | 0147 | | LR | S,A | |
| 0941 2909F3 | 09F3 | 0148 | | JMP | F9 | |
| 0944 290A12 | 0A12 | 0149 | BA1 | JMP | D9 | |
| 0947 16 | | 0150 | E2 | LM | | ROW FAIL CODE TO ACC. |
| 0948 F1 | | 0151 | | NS | 1 | ROW FAIL INDICATOR MASKED |
| | | 0152 | * | | | FOR |
| 0949 9410 | 095A | 0153 | | BNZ | E4 | JUMP IF ROW FAILURE FOUND |
| 094B 71 | | 0154 | E5 | LIS | 1 | ADD 1 TO ROW # |
| 094C CC | | 0155 | | AS | S | NEXT ROW TO BE TESTED |
| 094D 5C | | 0156 | | LR | S,A | RESTORE NEW ROW # |
| 094E 2011 | | 0157 | | LI | H'11' | PREPARE TO TEST IF UP TO |
| | | 0158 | * | | | ROW 17 |
| 0950 EC | | 0159 | | XS | S | |
| 0951 94D0 | 0922 | 0160 | | BNZ | E3 | JUMP TO TEST NEXT ROW IF |
| | | 0161 | * | | | NOT ROW 17 |
| 0953 71 | | 0162 | G5 | LIS | 1 | START OVER WITH ROW 1 |
| 0954 5C | | 0163 | | LR | S,A | ROW 1 STORED IN C2 |
| 0955 2A06D2 | 06D2 | 0164 | | DCI | TBL1+1 | ROW # CODE ADDRESS FOR |
| | | 0165 | * | | | ROW 1 |
| 0958 90C9 | 0922 | 0166 | | BR | E3 | GO DO NEXT ROW |
| 095A 64 | | 0167 | E4 | LISU | 4 | SELECT LATCH WITH ROW |
| | | 0168 | * | | | FAILED |
| 095B 6A | | 0169 | | LISL | 2 | |
| 095C 2011 | | 0170 | | LI | H'11' | SET BITS 0 & 4 (ROW |
| | | 0171 | * | | | FAILED) |
| 095E 5C | | 0172 | | LR | S,A | RESTORE L6 CODE |
| 095F 2909EC | 09EC | 0173 | | JMP | G4 | GO PROCESS ALARM |
| 0962 63 | | 0174 | E1 | LISU | 3 | SELECT C2 COUNTER (ROW |
| | | 0175 | * | | | HI - LO CHECK |
| 0963 6C | | 0176 | | LISL | 4 | |
| 0964 71 | | 0177 | | LIS | 1 | ADD 1 TO ROW # |
| 0965 CC | | 0178 | | AS | S | NEXT ROW TO BE TESTED |
| 0966 5C | | 0179 | | LR | S,A | RESTORE NEW ROW # |
| 0967 2011 | | 0180 | | LI | H'11' | PREPARE TO TEST IF UP TO |
| | | 0181 | * | | | ROW 17 |
| 0969 EC | | 0182 | | XS | S | |
| 096A 9403 | 096E | 0183 | | BNZ | E7 | JUMP IF NOT ROW 17 |
| 096C 71 | | 0184 | G6 | LIS | 1 | START OVER WITH ROW 1 |
| 096D 5C | | 0185 | | LR | S,A | ROW 1 STORED IN C2 |
| 096E 2010 | | 0186 | E7 | LI | H'10' | SET UP CYCLE COUNTER |
| 0970 52 | | 0187 | | LR | 2,A | 16 ROW CYCLE COUNTER |
| 0971 2A06D1 | 06D1 | 0188 | F3 | DCI | TBL1 | PREPARE TO RETRIEVE ROW |
| | | 0189 | * | | | ROW MASK CODE |
| 0974 4C | | 0190 | | LR | A,S | PREPARE TO ADD ROW # TO |
| | | 0191 | * | | | DC0 |
| 0975 8E | | 0192 | | ADC | | DC0 NOW POINTING TO ROW |
| | | 0193 | * | | | MASK CODE |
| 0976 20F7 | | 0194 | | LI | H'F7' | TEST FOR ROWS 1-8 OR 9-16 |
| 0978 CC | | 0195 | | AS | S | C2-9 |
| 0979 16 | | 0196 | | LM | | ROW MASK CODE TO ACC |

| | | | | | | |
|---|---|---|---|---|---|---|
| 097A | 8206 | 9981 | 0197 | | BC | E8 | JUMP IF ROW # >8 |
| 097C | 2A10AC | 10AC | 0198 | | DCI | H'10AC' | DCO POINTING TO ROW ON/OFF |
| | | | 0199 | * | | | CODE ROWS 1-8 |
| 097F | 9604 | 0984 | 0200 | | BR | F4 | |
| 0981 | 2A10AD | 10AD | 0201 | | DCI | H'10AD' | DCO POINTING TO ROW ON/OFF |
| | | | 0202 | * | | | CODE ROWS 9-16 |
| 0984 | 8A | | 0203 | F4 | NM | | SELECTED ROW'S ON/OFF CODE |
| | | | 0204 | * | | | MASKED FOR |
| 0985 | 9444 | 09CA | 0205 | | BNZ | F7 | IF ROW OFF GO TRY NEXT ROW |
| 0987 | 2A0FFE | 0FFE | 0206 | | DCI | H'0FFE' | |
| 098A | 4C | | 0207 | | LR | A,S | |
| 098B | 13 | | 0208 | | SL | 1 | |
| 098C | 8E | | 0209 | | ADC | | |
| 098D | 66 | | 0210 | | LISU | 6 | |
| 098E | 6B | | 0211 | | LISL | 3 | |
| 098F | 16 | | 0212 | | LM | | |
| 0990 | 5E | | 0213 | | LR | D,A | |
| 0991 | 16 | | 0214 | | LM | | |
| 0992 | 5E | | 0215 | | LR | D,A | |
| 0993 | 70 | | 0216 | | CLR | | |
| 0994 | 5E | | 0217 | | LR | D,A | |
| 0995 | 5C | | 0218 | | LR | S,A | |
| 0996 | 2A10A9 | 10A9 | 0219 | | DCI | H'10A9' | |
| 0999 | 67 | | 0220 | | LISU | 7 | |
| 099A | 5D | | 0221 | | LR | I,A | |
| 099B | 5D | | 0222 | | LR | I,A | |
| 099C | 16 | | 0223 | | LM | | |
| 099D | 50 | | 0224 | | LR | 0,A | |
| 099E | 12 | | 0225 | | SR | 1 | |
| 099F | 5D | | 0226 | | LR | I,A | |
| 09A0 | 16 | | 0227 | | LM | | |
| 09A1 | 12 | | 0228 | | SR | 1 | |
| 09A2 | 5C | | 0229 | | LR | S,A | |
| 09A3 | 71 | | 0230 | | LIS | 1 | |
| 09A4 | F0 | | 0231 | | NS | 0 | |
| 09A5 | 8405 | 09AB | 0232 | | BZ | DUD | |
| 09A7 | 2080 | | 0233 | | LI | H'80' | |
| 09A9 | CC | | 0234 | | AS | S | |
| 09AA | 5C | | 0235 | | LR | S,A | |
| 09AB | 2307A2 | 07A2 | 0236 | DUD | PI | SUBMIN | |
| 09AE | 1A | | 0237 | | DI | | |
| 09AF | 922B | 09DB | 0238 | | BNC | F9 | |
| 09B1 | 68 | | 0239 | | LISL | 0 | |
| 09B2 | 70 | | 0240 | | CLR | | |
| 09B3 | 5D | | 0241 | | LR | I,A | |
| 09B4 | 5D | | 0242 | | LR | I,A | |
| 09B5 | 16 | | 0243 | | LM | | |
| 09B6 | 50 | | 0244 | | LR | 0,A | |
| 09B7 | 12 | | 0245 | | SR | 1 | |
| 09B8 | 5D | | 0246 | | LR | I,A | |
| 09B9 | 16 | | 0247 | | LM | | |
| 09BA | 12 | | 0248 | | SR | 1 | |
| 09BB | 5C | | 0249 | | LR | S,A | |
| 09BC | 71 | | 0250 | | LIS | 1 | |
| 09BD | F0 | | 0251 | | NS | 0 | |
| 09BE | 8405 | 09C4 | 0252 | | BZ | UDU | |
| 09C0 | 2080 | | 0253 | | LI | H'80' | |
| 09C2 | CC | | 0254 | | AS | S | |
| 09C3 | 5C | | 0255 | | LR | S,A | |
| 09C4 | 2307A2 | 07A2 | 0256 | UDU | PI | SUBMIN | |
| 09C7 | 1A | | 0257 | | DI | | |
| 09C8 | 8219 | 09E2 | 0258 | | BC | F1 | DECREMENT CYCLE COUNTER |
| 09CA | 32 | | 0259 | F7 | DS | 2 | JUMP IF THROUGH ALL 16 |
| 09CB | 8430 | 0A08 | 0260 | | BZ | F2 | ROWS |
| | | | 0261 | * | | | |
| 09CD | 63 | | 0262 | | LISU | 3 | ISAR POINTING TO C2 |
| 09CE | 6C | | 0263 | | LISL | 4 | PREPARE TO ADD 1 TO ROW# |
| 09CF | 71 | | 0264 | | LIS | 1 | NEXT ROW TO BE TESTED |
| 09D0 | CC | | 0265 | | AS | S | RESTORE NEW ROW # |
| 09D1 | 5C | | 0266 | | LR | S,A | PREPARE TO TEST IF UP TO |
| 09D2 | 2011 | | 0267 | | LI | H'11' | ROW 17 |
| | | | 0268 | * | | | |

| | | | | | | |
|---|---|---|---|---|---|---|
| 09D4 EC | | 0269 | | XS | S | |
| 09D5 949B | 0971 | 0270 | | BNZ | F3 | IF NOT ROW 17 GO TEST NEW ROW FOR HI-LO |
| | | 0271 | * | | | |
| 09D7 71 | | 0272 | | LIS | 1 | START OVER WITH ROW 1 |
| 09D8 5C | | 0273 | | LR | S,A | ROW 1 STORED IN C2 |
| 09D9 9097 | 0971 | 0274 | | BR | F3 | GO TEST NEW ROW FOR HI-LO |
| 09DB 64 | | 0275 | E9 | LISU | 4 | ROW POP > HI FAIL SET |
| 09DC 6A | | 0276 | | LISL | 2 | SELECT LATCH WITH HI-LO WARNING |
| | | 0277 | * | | | |
| 09DD 200D | | 0278 | | LI | H'0D' | SET BITS 0,2,&3 (ROW,HI, WARNING) |
| | | 0279 | * | | | |
| 09DF 5C | | 0280 | | LR | S,A | RESTORE L6 CODE |
| 09E0 9006 | 09E7 | 0281 | | BR | F8 | GO CHECK ALARM COUNTER T6 |
| 09E2 64 | | 0282 | F1 | LISU | 4 | ROW POP < LO FAIL SET |
| 09E3 6A | | 0283 | | LISL | 2 | |
| 09E4 200B | | 0284 | | LI | H'0B' | SET BITS 0,1,&3 (ROW,LO, WARNING) |
| | | 0285 | * | | | |
| 09E6 5C | | 0286 | | LR | S,A | RESTORE L6 CODE |
| 09E7 62 | | 0287 | F8 | LISU | 2 | CHECK ALARM COUNTER T6 |
| 09E8 70 | | 0288 | | LIS | 0 | PREPARE TO ACTIVATE STATUS REGISTER |
| | | 0289 | * | | | |
| 09E9 CC | | 0290 | | AS | S | STATUS REGISTER ACTIVATED TO T6 |
| | | 0291 | * | | | |
| 09EA 8403 | 09F3 | 0292 | | BZ | F9 | JUMP IF ALARM SHOULD BE TURNED OFF |
| | | 0293 | * | | | |
| 09EC 63 | | 0294 | G4 | LISU | 3 | CHECK IF DISTANCE PRESENT |
| 09ED 6E | | 0295 | | LISL | 6 | |
| 09EE 2040 | | 0296 | | LI | H'40' | MASK FOR NO DIST. INDICATOR BIT 6 |
| | | 0297 | * | | | |
| 09F0 FC | | 0298 | | NS | S | NO DIST. INDICATOR BIT MASKED FOR |
| | | 0299 | * | | | |
| 09F1 8409 | 09FB | 0300 | | BZ | G1 | JUMP IF DIST. PRESENT |
| 09F3 64 | | 0301 | F9 | LISU | 4 | |
| 09F4 6B | | 0302 | | LISL | 3 | |
| 09F5 4C | | 0303 | | LR | A,S | PREPARE TO TURN ALARM OFF |
| 09F6 217F | | 0304 | | NI | H'7F' | RESET BIT 7 (ALARM) |
| 09F8 5C | | 0305 | | LR | S,A | RESTORE L7 CODE |
| 09F9 9007 | 0A01 | 0306 | | BR | G2 | JUMP TO RESET T5 COUNTER |
| 09FB 64 | | 0307 | G1 | LISU | 4 | |
| 09FC 6B | | 0308 | | LISL | 3 | |
| 09FD 4C | | 0309 | | LR | A,S | PREPARE TO TURN ALARM ON |
| 09FE 2280 | | 0310 | | OI | H'80' | SET BIT 7 (ALARM) |
| 0A00 5C | | 0311 | | LR | S,A | RESTORE L7 CODE |
| 0A01 62 | | 0312 | G2 | LISU | 2 | PREPARE TO RESET T5 |
| 0A02 69 | | 0313 | | LISL | 1 | |
| 0A03 2014 | | 0314 | | LI | H'14' | TIMER COUNT FOR 1/2 SEC |
| 0A05 5C | | 0315 | | LR | S,A | TIMER T5 RESET |
| 0A06 900B | 0A12 | 0316 | | BR | D9 | JUMP TO TEST FOR T3 |
| 0A08 64 | | 0317 | F2 | LISU | 4 | ROW POP OK |
| 0A09 6A | | 0318 | | LISL | 2 | SELECT LATCH WITH HI-LO WARNING |
| | | 0319 | * | | | |
| 0A0A 70 | | 0320 | | LIS | 0 | RESET BITS 0,1,2,3,4,&5 (ROW,LO,HI,WARNING, FAILED & AUX) |
| | | 0321 | * | | | |
| | | 0322 | * | | | |
| 0A0B 5C | | 0323 | | LR | S,A | RESTORE L6 CODE |
| 0A0C 63 | | 0324 | | LISU | 3 | SELECT C2 COUNTER |
| 0A0D 6C | | 0325 | | LISL | 4 | |
| 0A0E 70 | | 0326 | | CLR | | PREPARE TO BLANK C2 DISPLAY |
| | | 0327 | * | | | |
| 0A0F 5C | | 0328 | | LR | S,A | C2 NOW H'FF' (BLANK) |
| 0A10 90E2 | 09F3 | 0329 | | BR | F9 | GO TURN ALARM OFF |
| 0A12 62 | | 0330 | D9 | LISU | 2 | PREPARE TO CHECK T3 (MPH) |
| 0A13 6B | | 0331 | | LISL | 3 | |
| 0A14 70 | | 0332 | | CLR | | PREPARE TO ACTIVATE STATUS REGISTER |
| | | 0333 | * | | | |
| 0A15 CC | | 0334 | | AS | S | STATUS REGISTER ACTIVATED TO T3 |
| | | 0335 | * | | | |
| 0A16 945C | 0A73 | 0336 | | BNZ | G3 | JUMP IF T3 NOT 0 |
| 0A18 63 | | 0337 | | LISU | 3 | |
| 0A19 6E | | 0338 | | LISL | 6 | |
| 0A1A 74 | | 0339 | | LIS | 4 | |

| | | | | | |
|---|---|---|---|---|---|
| 0A1B | FC | | 0340 | NS | S |
| 0A1C | 9451 | 0A6E | 0341 | BNZ | MPH |
| 0A1F | 2020 | | 0342 | LI | H'20'  PREPARE TO RETRIEVE C0 PRESENT COUNT |
| | | | 0343 * | | |
| 0A20 | 54 | | 0344 | LR | 4,A |
| 0A21 | 67 | | 0345 | LISU | 7 |
| 0A22 | 6B | | 0346 | LISL | 3 |
| 0A23 | 2807E0 | 07E0 | 0347 | PI | SUBACK |
| 0A26 | 1A | | 0348 | DI | |
| 0A27 | 2021 | | 0349 | LI | H'21' |
| 0A29 | 54 | | 0350 | LR | 4,A |
| 0A2A | 2807E0 | 07E0 | 0351 | PI | SUBACK |
| 0A2D | 1A | | 0352 | DI | |
| 0A2E | 70 | | 0353 | CLR | |
| 0A2F | 5E | | 0354 | LR | D,A |
| 0A30 | 5E | | 0355 | LR | D,A |
| 0A31 | 66 | | 0356 | LISU | 6 |
| 0A32 | 6B | | 0357 | LISL | 3 |
| 0A33 | 2A10A2 | 10A2 | 0358 | DCI | H'10A2'  ADDRESS FO CO DIST. STO |
| 0A36 | 16 | | 0359 | LM | CO DIST. STO TO ACC |
| 0A37 | 5E | | 0360 | LR | D,A |
| 0A38 | 16 | | 0361 | LM | C1 DIST. STO TO ACC |
| 0A39 | 5E | | 0362 | LR | D,A |
| 0A3A | 70 | | 0363 | CLR | |
| 0A3B | 5E | | 0364 | LR | D,A |
| 0A3C | 5E | | 0365 | LR | D,A |
| 0A3D | 67 | | 0366 | LISU | 7 |
| 0A3E | 6B | | 0367 | LISL | 3 |
| 0A3F | 2A10A2 | 10A2 | 0368 | DCI | H'10A2' |
| 0A42 | 4E | | 0369 | LR | A,D |
| 0A43 | 17 | | 0370 | ST | |
| 0A44 | 4E | | 0371 | LR | A,D |
| 0A45 | 17 | | 0372 | ST | |
| 0A46 | 2807A2 | 07A2 | 0373 | PI | SUBMIN |
| 0A49 | 1A | | 0374 | DI | |
| 0A4A | 67 | | 0375 | LISU | 7 |
| 0A4B | 6B | | 0376 | LISL | 3 |
| 0A4C | 4C | | 0377 | LR | A,S |
| 0A4D | 66 | | 0378 | LISU | 6 |
| 0A4E | 5E | | 0379 | LR | D,A |
| 0A4F | 67 | | 0380 | LISU | 7 |
| 0A50 | 4C | | 0381 | LR | A,S |
| 0A51 | 66 | | 0382 | LISU | 6 |
| 0A52 | 5C | | 0383 | LR | S,A |
| 0A53 | 65 | | 0384 | LISU | 5 |
| 0A54 | 72 | | 0385 | LIS | 2 |
| 0A55 | 5D | | 0386 | LR | I,A |
| 0A56 | 20AA | | 0387 | LI | H'AA' |
| 0A58 | 5C | | 0388 | LR | S,A |
| 0A59 | 2806E2 | 06E2 | 0389 | PI | SUBMUL |
| 0A5C | 1A | | 0390 | DI | |
| 0A5D | 66 | | 0391 | LISU | 6 |
| 0A5E | 69 | | 0392 | LISL | 1 |
| 0A5F | 2A10B3 | 10B3 | 0393 | DCI | H'10B3'  PREPARE TO DIVIDE BY DIST. CAL. |
| | | | 0394 * | | |
| 0A62 | 16 | | 0395 | LM | DIST. CAL. C0 TO ACC |
| 0A63 | 5E | | 0396 | LR | D,A  STORE IN R61 |
| 0A64 | 16 | | 0397 | LM | DIST. CAL. C1 TO ACC |
| 0A65 | 5C | | 0398 | LR | S,A  STORE IN R1 |
| 0A66 | 280730 | 0730 | 0399 | PI | SUBDIV |
| 0A69 | 1A | | 0400 | DI | |
| 0A6A | 65 | | 0401 | LISU | 5 |
| 0A6B | 6B | | 0402 | LISL | 3 |
| 0A6C | 4C | | 0403 | LR | A,S |
| 0A6D | 58 | | 0404 | LR | S,A |
| 0A6E | 62 | | 0405 MPH | LISU | 2 |
| 0A6F | 6B | | 0406 | LISL | 3 |
| 0A70 | 204E | | 0407 | LI | H'4E'  PREPARE TO RESET T3 (1 SEC) |
| | | | 0408 * | | |
| 0A72 | 5C | | 0409 | LR | S,A  T3 RESET |
| 0A73 | 62 | | 0410 G3 | LISU | 2  PREPARE TO CHECK T4 |

```
                    0411  *                      (2-SEC) FOR
0A74 6C             0412         LISL   4        2-SEC SEEDS/SEC UPDATE
0A75 70             0413         CLR             PREPARE TO ACTIVATE
                    0414  *                      STATUS REGISTER
0A76 CC             0415         AS     S        STATUS REGISTER ACTIVATED
                    0416  *                      TO T4
0A77 8404 0A7C      0417         BZ     BA2      JUMP IF T4 IS 0
0A79 290B80 0B80    0418         JMP    H4
0A7C 63             0419  BA2    LISU   3
0A7D 6E             0420         LISL   6
0A7E 74             0421         LIS    4
0A7F FC             0422         NS     S
0A80 8404 0A85      0423         BZ     YBY
0A82 290B7B 0B7B    0424         JMP    YIP
0A85 71             0425  YBY    LIS    1
0A86 55             0426         LR     5,A
0A87 2A10FE 10FE    0427         DCI    H'10FE'
0A8A 2C             0428         XDC
0A8B 2A1080 1080    0429         DCI    H'1080'
0A8E 70             0430         CLR
0A8F 54             0431         LR     4,A
0A90 67             0432  H9     LISU   7
0A91 6B             0433         LISL   3
0A92 2807E0 07E0    0434         PI     SUBACK
0A95 1A             0435         DI
0A96 44             0436         LR     A,4
0A97 1F             0437         INC
0A98 54             0438         LR     4,A
0A99 2807E0 07E0    0439         PI     SUBACK
0A9C 1A             0440         DI
0A9D 70             0441         CLR
0A9E 5E             0442         LR     D,A
0A9F 5E             0443         LR     D,A
0AA0 44             0444         LR     A,4
0AA1 1F             0445         INC
0AA2 54             0446         LR     4,A
0AA3 66             0447         LISU   6
0AA4 6B             0448         LISL   3
0AA5 16             0449         LM
0AA6 5E             0450         LR     D,A
0AA7 16             0451         LM
0AA8 5E             0452         LR     D,A
0AA9 70             0453         CLR
0AAA 5E             0454         LR     D,A
0AAB 5E             0455         LR     D,A
0AAC 20FE           0456         LI     H'FE'
0AAE 8E             0457         ADC
0AAF 67             0458         LISU   7
0AB0 6B             0459         LISL   3
0AB1 4E             0460         LR     A,D
0AB2 17             0461         ST
0AB3 4E             0462         LR     A,D
0AB4 17             0463         ST
0AB5 2807A2 07A2    0464         PI     SUBMIN
0AB8 1A             0465         DI
0AB9 66             0466         LISU   6
0ABA 6B             0467         LISL   3
0ABB 2022           0468         LI     H'22'
0ABD E4             0469         XS     4
0ABE 842B 0AEA      0470         BZ     I4
0AC0 74             0471         LIS    4
0AC1 5E             0472         LR     D,A
0AC2 70             0473         CLR
0AC3 5E             0474         LR     D,A
0AC4 2C             0475         XDC
0AC5 2012           0476         LI     H'12'
0AC7 E4             0477         XS     4
0AC8 9403 0ACC      0478         BNZ    H5
0ACA 71             0479         LIS    1
0ACB 8E             0480         ADC
0ACC 2807A2 07A2    0481  H5     PI     SUBMIN
```

```
0ACF 1A           0482              DI
0AD0 45           0483              LR    A,5
0AD1 2204  0AD6  0484              BC    H6
0AD3 8B           0485              OM
0AD4 9003  0AD8  0486              BR    H7
0AD6 18           0487    H6        COM
0AD7 8A           0488              NM
0AD8 53           0489    H7        LR    3,A
0AD9 20FF         0490              LI    H'FF'
0ADB 8E           0491              ADC
0ADC 43           0492              LR    A,3
0ADD 17           0493              ST
0ADE 20FF         0494              LI    H'FF'
0AE0 8E           0495              ADC
0AE1 2C           0496              XDC
0AE2 45           0497              LR    A,5
0AE3 13           0498              SL    1
0AE4 9402  0AE7  0499              BNZ   H8
0AE6 71           0500              LIS   1
0AE7 55           0501    H8        LR    5,A
0AE8 90A7  0A90  0502              BR    H9
0AEA 71           0503    I4        LIS   1
0AEB 5E           0504              LR    D,A
0AEC 70           0505              CLR
0AED 5E           0506              LR    D,A
0AEE 2807A2 07A2 0507              PI    SUBMTH
0AF1 1A           0508              DI
0AF2 63           0509              LISU  3
0AF3 6E           0510              LISL  6
0AF4 9207  0AFC  0511              BNC   I6
0AF6 20BF         0512              LI    H'BF'     MASK FOR BIT 6
0AF8 FC           0513              NS    S         BIT 6 RESET
0AF9 5C           0514              LR    S,A       RESTORE
0AFA 900A  0B05  0515              BR    I7
0AFC 2040         0516    I6        LI    H'40'     MASK FOR BIT 6
0AFE FC           0517              NS    S         MASK BIT FOR PRESENT
                  0518    *                           STATUS
0AFF 9405  0B05  0519              BNZ   I7        JUMP BIT ALREADY SET
0B01 2040         0520              LI    H'40'     PREPARE TO SET NO DIST.
                  0521    *                           INDICATOR BIT
0B03 CC           0522              AS    S
0B04 5C           0523              LR    S,A       NO DIST. INDICATOR BIT SET
0B05 61           0524    I7        LISU  1
0B06 6C           0525              LISL  4
0B07 2A10FE 10FE 0526              DCI   H'10FE'
0B0A 16           0527              LM
0B0B 5D           0528              LR    I,A
0B0C 16           0529              LM
0B0D 5F           0530              LR    D,A
0B0E 4D           0531              LR    A,I
0B0F 18           0532              COM
0B10 50           0533              LR    0,A
0B11 4E           0534              LR    A,D
0B12 18           0535              COM
0B13 C0           0536              AS    0
0B14 19           0537              LNK
0B15 50           0538              LR    0,A
0B16 2A10AC 10AC 0539              DCI   H'10AC'
0B19 16           0540              LM              ROW ELIM CODE FOR ROWS
                  0541    *                           1 - 8
0B1A 18           0542              COM
0B1B FC           0543              NS    S         ROW INDICATORS RESET IF
                  0544    *                           ROW ELIMINATED
0B1C 5D           0545              LR    I,A       RESTORE NEW ROW FAIL
                  0546    *                           INDICATOR CODE
0B1D 16           0547              LM              ROW ELIM CODE FOR ROWS
                  0548    *                           9 - 16
0B1E 18           0549              COM
0B1F FC           0550              NS    S         ROW INDICATORS RESET IF
                  0551    *                           ROW ELIMINATED
0B20 5D           0552              LR    I,A       RESTORE NEW ROW FAIL
                  0553    *                           INDICATOR CODE
```

| | | | | | |
|---|---|---|---|---|---|
| 0B21 | 63 | | 0554 | LISU | 3 |
| 0B22 | 6E | | 0555 | LISL | 6 |
| 0B23 | 74 | | 0556 | LIS | 4 |
| 0B24 | FC | | 0557 | NS | S |
| 0B25 | 9417 | 0B3D | 0558 | BNZ | H44 |
| 0B27 | 2040 | | 0559 | LI | H'40' |
| 0B29 | FC | | 0560 | NS | S |
| 0B2A | 64 | | 0561 | LISU | 4 |
| 0B2B | 6A | | 0562 | LISL | 2 |
| 0B2C | 8416 | 0B43 | 0563 | BZ | KLM |
| 0B2E | 70 | | 0564 | LIS | 0 |
| 0B2F | C0 | | 0565 | AS | 0 |
| 0B30 | 8412 | 0B43 | 0566 | BZ | KLM |
| 0B32 | 2050 | | 0567 | LI | H'50' |
| 0B34 | 5C | | 0568 | LR | S,A |
| 0B35 | 63 | | 0569 | LISU | 3 |
| 0B36 | 6E | | 0570 | LISL | 6 |
| 0B37 | 4C | | 0571 | LR | A,S |
| 0B38 | 2220 | | 0572 | OI | H'20' |
| 0B3A | 5C | | 0573 | LR | S,A |
| 0B3B | 9011 | 0B4D | 0574 | BR | KIM |
| 0B3D | 64 | | 0575 H44 | LISU | 4 |
| 0B3E | 6A | | 0576 | LISL | 2 |
| 0B3F | 70 | | 0577 | CLR | |
| 0B40 | 5C | | 0578 | LR | S,A |
| 0B41 | 903E | 0B80 | 0579 | BR | H4 |
| 0B43 | 4C | | 0580 KLM | LR | A,S |
| 0B44 | 21BF | | 0581 | NI | H'BF' |
| 0B46 | 5C | | 0582 | LR | S,A |
| 0B47 | 63 | | 0583 | LISU | 3 |
| 0B48 | 6E | | 0584 | LISL | 6 |
| 0B49 | 4C | | 0585 | LR | A,S |
| 0B4A | 21DF | | 0586 | NI | H'DF' |
| 0B4C | 5C | | 0587 | LR | S,A |
| 0B4D | 63 | | 0588 KIM | LISU | 3 |
| 0B4E | 69 | | 0589 | LISL | 1 |
| | | | 0590 * | | |
| 0B4F | 20FE | | 0591 | LI | H'FE' |
| | | | 0592 * | | |
| 0B51 | CC | | 0593 | AS | S |
| 0B52 | 922D | 0B80 | 0594 | BNC | H4 |
| | | | 0595 * | | |
| 0B54 | 68 | | 0596 | LISL | 0 |
| | | | 0597 * | | |
| 0B55 | 70 | | 0598 | CLR | |
| 0B56 | EC | | 0599 | XS | S |
| 0B57 | 9428 | 0B80 | 0600 | BNZ | H4 |
| | | | 0601 * | | |
| | | | 0602 * | | |
| | | | 0603 * | | |
| 0B59 | 6B | | 0604 | LISL | 3 |
| 0B5A | 71 | | 0605 J2 | LIS | 1 |
| 0B5B | CC | | 0606 | AS | S |
| 0B5C | 5C | | 0607 | LR | S,A |
| 0B5D | 2011 | | 0608 | LI | H'11' |
| 0B5F | EC | | 0609 | XS | S |
| 0B60 | 9403 | 0B64 | 0610 | BNZ | I8 |
| 0B62 | 71 | | 0611 | LIS | 1 |
| | | | 0612 * | | |
| 0B63 | 5C | | 0613 | LR | S,A |
| 0B64 | 4C | | 0614 I8 | LR | A,S |
| 0B65 | 2A06D1 | 06D1 | 0615 | DCI | TBL1 |
| | | | 0616 * | | |
| 0B68 | 8E | | 0617 | ADC | |
| | | | 0618 * | | |
| 0B69 | 20F7 | | 0619 | LI | H'F7' |
| | | | 0620 * | | |
| 0B6B | CC | | 0621 | AS | S |
| 0B6C | 16 | | 0622 | LM | |
| 0B6D | 9207 | 0B75 | 0623 | BNC | I9 |
| 0B6F | 2A10AD | 10AD | 0624 | DCI | H'10AD' |
| | | | 0625 * | | |

TEST FOR OPERATE/SET-UP
  MODE

PREPARE TO CHECK FOR
  READOUT SELECTION
PREPARE TO SUBTRACT 2
  FROM S2 COUNT
S2 - 2
JUMP IF SCAN MODE NOT
  NOT APPLICABLE
PREPARE TO TEST S1 FOR
  SCAN MODE

JUMP IF S1 NOT IN SCAN
  MODE
SELECT C1 COUNTER FOR
  INCREMENTING

PREPARE TO ADD 1
C1 + 1
RESTORE NEW ROW #
CHECK FOR ROW > 16

JUMP IF NOT > 16
RESTART S1 COUNTER WITH
  ROW 1
ROW 1 PUT INTO S1

PREPARE TO RETIEVE ROW
  IDENT. CODE
DCO POINTING TO ROW IDENT
  CODE
PREPARE TO TEST FOR ROW
  1 - 8 OR 9 - 16
ROW # - 9
ROW IDENT CODE TO ACC.
JUMP IF ROW 1 - 8
ROW 9 - 16 ON/OFF CODE
  ADDRESS

| | | | | | |
|---|---|---|---|---|---|
| 0B72 8H | | 0626 | | NM | MASK ON/OFF CODE FOR SELECTED ROW |
| | | 0627 | * | | |
| 0B73 9005 | 0B79 | 0628 | | BR J1 | JUMP TO CONTINUE PROCESSING |
| | | 0629 | * | | |
| 0B75 2A10AC | 10AC | 0630 | I9 | DCI H'10AC' | ROW 1 - 8 ON/OFF CODE ADDRESS |
| | | 0631 | * | | |
| 0B78 8A | | 0632 | | NM | |
| 0B79 94E9 | 0B5A | 0633 | J1 | BNZ J2 | JUMP % TRY NEXT ROW IF THIS ROW OFF. |
| | | 0634 | * | | |
| 0B7B 62 | | 0635 | YIP | LISU 2 | |
| 0B7C 6C | | 0636 | | LISL 4 | |
| 0B7D 204E | | 0637 | | LI H'4E' | |
| 0B7F 5D | | 0638 | | LR I,A | |
| 0B80 62 | | 0639 | H4 | LISU 2 | PREPARE TO CHECK TIMER T1 (2-SEC BLANK DISPLAY) |
| | | 0640 | * | | |
| 0B81 6D | | 0641 | | LISL 5 | |
| 0B82 70 | | 0642 | | CLR | |
| 0B83 CC | | 0643 | | AS S | STATUS REGISTER ACTIVATED TO T1 |
| | | 0644 | * | | |
| 0B84 9407 | 0B8C | 0645 | | BNZ J6 | JUMP IF T1 NOT = 0 |
| 0B86 64 | | 0646 | | LISU 4 | PREPARE TO BLANK SELECTED DISPLAY(S) |
| | | 0647 | * | | |
| 0B87 6F | | 0648 | | LISL 7 | |
| 0B88 20F8 | | 0649 | | LI H'F8' | |
| 0B8A FC | | 0650 | | NS S | |
| 0B8B 5C | | 0651 | | LR S,A | |
| 0B8C 7C | | 0652 | J6 | LIS H'C' | PREPARE TO READ KEYBOARD CODE FOR L12 (KEYBOARD) SENT TO DISPLAY |
| 0B8D B0 | | 0653 | | OUTS 0 | |
| | | 0654 | * | | |
| 0B8E 7E | | 0655 | | LIS H'E' | PREPARE TO ACTIVATE STROBE |
| 0B8F B1 | | 0656 | | OUTS 1 | STROBE ACTIVATED |
| 0B90 2030 | | 0657 | | LI H'30' | PREPARE SMALL DELAY |
| 0B92 51 | | 0658 | | LR 1,A | |
| 0B93 31 | | 0659 | J9 | DS 1 | |
| 0B94 94FF | 0B93 | 0660 | | BNZ J9 | SMALL DELAY |
| 0B96 70 | | 0661 | | CLR | |
| 0B97 B1 | | 0662 | | OUTS 1 | STROBE CLEARED |
| 0B98 2030 | | 0663 | | LI H'30' | |
| 0B9A 51 | | 0664 | | LR 1,A | |
| 0B9B 31 | | 0665 | J3 | DS 1 | |
| 0B9C 94FE | 0B9B | 0666 | | BNZ J3 | |
| 0B9E 70 | | 0667 | | CLR | |
| 0B9F B0 | | 0668 | | OUTS 0 | CLEAR PORT 0 FOR READING |
| 0BA0 7D | | 0669 | | LIS H'D' | |
| 0BA1 B1 | | 0670 | | OUTS 1 | |
| 0BA2 2030 | | 0671 | | LI H'30' | |
| 0BA4 51 | | 0672 | | LR 1,A | |
| 0BA5 31 | | 0673 | K1 | DS 1 | |
| 0BA6 94FE | 0BA5 | 0674 | | BNZ K1 | |
| 0BA8 76 | | 0675 | | LIS 6 | PREPARE TO CLEAR INHIBIT ACTIVATE D.B. BUFF |
| | | 0676 | * | | |
| 0BA9 B1 | | 0677 | | OUTS 1 | INHIBIT CLEARED & DATA BUS BUFFER ACTIVATED |
| | | 0678 | * | | |
| 0BAA A0 | | 0679 | | INS 0 | READ KEY BOARD CODE |
| 0BAB 217F | | 0680 | | NI H'7F' | ELIMINATE BIT 7 |
| 0BAD 50 | | 0681 | | LR 0,A | STORE KEYBOARD CODE IN R0 |
| 0BAE 70 | | 0682 | | CLR | |
| 0BAF B1 | | 0683 | | OUTS 1 | CLEAR DATA BUSS BUFFER |
| 0BB0 40 | | 0684 | | LR A,0 | KEYBOARD READ TO ACC |
| 0BB1 63 | | 0685 | | LISU 3 | SELECT K1 (KEYBOARD BYTE STORAGE) |
| | | 0686 | * | | |
| 0BB2 6D | | 0687 | | LISL 5 | |
| 0BB3 EC | | 0688 | | XS S | XOR PRESENT WITH PAST READING |
| | | 0689 | * | | |
| 0BB4 8442 | 0BF7 | 0690 | | BZ BA4 | JUMP IF KEYBOARD NOT CHANGED |
| | | 0691 | * | | |
| 0BB6 51 | | 0692 | | LR 1,A | STORE XOR IN R1 |
| 0BB7 40 | | 0693 | | LR A,0 | |
| 0BB8 5C | | 0694 | | LR S,A | UPDATE K1 (KEYBOARD BYTE STORAGE) |
| | | 0695 | * | | |
| 0BB9 F1 | | 0696 | | NS 1 | CHECK IF KEY BIT SET |

```
0BBA 8415  0BD0 0697        BZ    LAFA       JUMP IF NO ACTION REQUIRED
0BBC 13         0698        SL    1          PREPARE TO TEST FOR SET
                0699   *                       BIT 6
0BBD 811D  0BDB 0700        BP    K3         JUMP IF BIT 6 NOT SET
0BBF 63         0701        LISU  3          PREPARE TO SAVE S1 & S2
0BC0 68         0702        LISL  0
0BC1 2A10B5 10B5 0703       DCI   H'10B5'    STORAGE ADDRESS FOR S1 & S2
0BC4 4D         0704        LR    A,I
0BC5 17         0705        ST
0BC6 4C         0706        LR    A,S
0BC7 17         0707        ST               S1 & S2 STORED
0BC8 7D         0708        LIS   H'D'       PREPARE TO SHUT SYSTEM DOWN
0BC9 54         0709        LR    4,A
0BCA 2807B9 07B9 0710       PI    SUBOUT
0BCD 1A         0711        DI
0BCE 90FF  0BCE 0712   K5   BR    K5         WAIT TO DIE
0BD0 6A         0713  LAFA  LISL  2
0BD1 72         0714        LIS   2
0BD2 EC         0715        XS    S
0BD3 841F  0BF3 0716        BZ    ALFA
0BD5 73         0717        LIS   3
0BD6 EC         0718        XS    S
0BD7 841B  0BF3 0719        BZ    ALFA
0BD9 901D  0BF7 0720        BR    BA4
0BDB 13         0721   K3   SL    1          PREPARE TO TEST IF BIT
                0722   *                       5 SET
0BDC 8121  0BFE 0723        BP    K6         JUMP IF BIT 5 NOT SET
0BDE 63         0724        LISU  3          SELECT L4
0BDF 6E         0725        LISL  6
0BE0 4C         0726        LR    A,S
0BE1 2304       0727        XI    H'04'      COMPLEMENT BIT (OPERATE
                0728   *                       /SET-UP)
0BE3 217C       0729        NI    H'7C'
0BE5 5C         0730        LR    S,A        RESTORE NEW L4 CODE
0BE6 64         0731        LISU  4
0BE7 6F         0732        LISL  7
0BE8 78         0733        LIS   8
0BE9 5C         0734        LR    S,A        RESET FR2
0BEA 62         0735        LISU  2
0BEB 6D         0736        LISL  5
0BEC 20FF       0737        LI    H'FF'
0BEE 5C         0738        LR    S,A        RESET T1 (BLANK DISPLAY
                0739   *                       COUNTER)
0BEF 63         0740        LISU  3
0BF0 6A         0741        LISL  2
0BF1 70         0742        CLR
0BF2 5C         0743        LR    S,A        RESET S3
0BF3 6F         0744  ALFA  LISL  7
0BF4 2021       0745        LI    H'21'
0BF6 5C         0746        LR    S,A        RESET FR1
0BF7 290EE6 0EE6 0747  BA4  JMP   K2
0BFA 52         0748  BA5   LR    2,A
0BFB 290DAA 0DAA 0749       JMP   K7
0BFE 13         0750   K6   SL    1          PREPARE TO TEST IF BIT
                0751   *                       4 SET
0BFF 81FA  0BFA 0752        BP    BA5        JUMP IF BIT 4 NOT SET
0C01 63         0753        LISU  3          TEST FOR OPERATE OR
                0754   *                       SET-UP MODE
0C02 6E         0755        LISL  6
0C03 74         0756        LIS   4
0C04 FC         0757        NS    S          STATUS REGISTER ACTIVATED
                0758   *                       TO L4
0C05 9411  0C17 0759        BNZ   K8         JUMP IF IN SET-UP MODE
0C07 2A10AE 10AE 0760  K2   DCI   H'10AE'    # ROWS STORAGE ADDRESS
0C0A 6B         0761        LISL  3
0C0B 4C         0762        LR    A,S
0C0C 1F         0763        INC
0C0D 8D         0764        CM               TEST IF EXCEEDING MAX ROW
0C0E 9204  0C13 0765        BNC   L4         JUMP IF EXCEEDING MAX
                0766   *                       ROW
0C10 5C         0767        LR    S,A
```

| | | | | | | |
|---|---|---|---|---|---|---|
| 0C11 | 90E5 | 0BF7 | 0768 | | BR | BA4 |
| 0C13 | 71 | | 0769 | L4 | LIS | 1 |
| 0C14 | 5C | | 0770 | | LR | S,A |
| 0C15 | 90E1 | 0BF7 | 0771 | | BR | BA4 |
| 0C17 | 63 | | 0772 | K8 | LISU | 3 |
| 0C18 | 6A | | 0773 | | LISL | 2 |
| | | | 0774 | * | | |
| 0C19 | 75 | | 0775 | | LIS | 5 |
| 0C1A | EC | | 0776 | | XS | S |
| 0C1B | 8404 | 0C20 | 0777 | | BZ | L6L |
| 0C1D | 2990C79 | 0C79 | 0778 | | JMP | L6 |
| | | | 0779 | * | | |
| 0C20 | 6B | | 0780 | L6L | LISL | 3 |
| 0C21 | 4C | | 0781 | | LR | A,S |
| 0C22 | 1F | | 0782 | | INC | |
| 0C23 | 5C | | 0783 | | LR | S,A |
| 0C24 | 2011 | | 0784 | | LI | H'11' |
| 0C26 | EC | | 0785 | | XS | S |
| 0C27 | 9402 | 0C2B | 0786 | | BNZ | L9 |
| 0C29 | 71 | | 0787 | | LIS | H'1' |
| 0C2A | 5C | | 0788 | | LR | S,A |
| 0C2B | 2A10AE | 10AE | 0789 | L9 | DCI | H'10AE' |
| | | | 0790 | * | | |
| 0C2E | 4C | | 0791 | | LR | A,S |
| 0C2F | 17 | | 0792 | | ST | |
| 0C30 | 2A10AD | 10AD | 0793 | | DCI | H'10AD' |
| 0C33 | 30 | | 0794 | | LR | 0,A |
| 0C34 | 2010 | | 0795 | | LI | H'10' |
| 0C36 | 51 | | 0796 | | LR | 1,A |
| 0C37 | 2C | | 0797 | I2 | XDC | |
| 0C38 | 2A06D1 | 06D1 | 0798 | | DCI | TBL1 |
| 0C3B | 41 | | 0799 | | LR | A,1 |
| 0C3C | E0 | | 0800 | | XS | 0 |
| 0C3D | 841A | 0C58 | 0801 | | BZ | SST |
| 0C3F | 41 | | 0802 | | LR | A,1 |
| 0C40 | 8E | | 0803 | | ADC | |
| 0C41 | 16 | | 0804 | | LM | |
| 0C42 | 2C | | 0805 | | XDC | |
| 0C43 | 8B | | 0806 | | OM | |
| 0C44 | 52 | | 0807 | | LR | 2,A |
| 0C45 | 20FF | | 0808 | | LI | H'FF' |
| 0C47 | 8E | | 0809 | | ADC | |
| 0C48 | 42 | | 0810 | | LR | A,2 |
| 0C49 | 17 | | 0811 | | ST | |
| 0C4A | 20FF | | 0812 | | LI | H'FF' |
| 0C4C | 8E | | 0813 | | ADC | |
| 0C4D | 31 | | 0814 | | DS | 1 |
| 0C4E | 78 | | 0815 | | LIS | 8 |
| 0C4F | E1 | | 0816 | | XS | 1 |
| 0C50 | 94E6 | 0C37 | 0817 | | BNZ | I2 |
| 0C52 | 20FF | | 0818 | | LI | H'FF' |
| 0C54 | 8E | | 0819 | | ADC | |
| 0C55 | 90E1 | 0C37 | 0820 | | BR | I2 |
| 0C57 | 2C | | 0821 | STT | XDC | |
| 0C58 | 2A06D1 | 06D1 | 0822 | SST | DCI | TBL1 |
| 0C5B | 41 | | 0823 | | LR | A,1 |
| 0C5C | 8E | | 0824 | | ADC | |
| 0C5D | 16 | | 0825 | | LM | |
| 0C5E | 18 | | 0826 | | COM | |
| 0C5F | 2C | | 0827 | | XDC | |
| 0C60 | 8A | | 0828 | | NM | |
| 0C61 | 52 | | 0829 | | LR | 2,A |
| 0C62 | 20FF | | 0830 | | LI | H'FF' |
| 0C64 | 8E | | 0831 | | ADC | |
| 0C65 | 42 | | 0832 | | LR | A,2 |
| 0C66 | 17 | | 0833 | | ST | |
| 0C67 | 20FF | | 0834 | | LI | H'FF' |
| 0C69 | 8E | | 0835 | | ADC | |
| 0C6A | 31 | | 0836 | | DS | 1 |
| 0C6B | 840A | 0C76 | 0837 | | BZ | BAG |
| 0C6D | 78 | | 0838 | | LIS | 8 |

```
START OVER WITH ROW 1
RESTORE IN C1
JUMP TO CONT.
SET-UP MODE DIGIT ADVANCE
TEST FOR 2 DIGIT ADVANCE
  (# ROWS)
CODE FOR # ROWS

JUMP IF # ROWS NOT
  SELECTED

INCREMENT LSD

RESTORE IN C1

TEST IF UP TO ROW 17
JUMP TO UPDATE IF OK
START OVER WITH ROW 10
RESTORE IN C1
ADDRESS FOR # ROWS
  STORAGE
NEW # ROWS TO ACC
```

```
0C6E E1              0839        XS    1
0C6F 94E7   0C57     0840        BNZ   STT
0C71 20FF            0841        LI    H'FF'
0C73 8E              0842        ADC
0C74 90E2   0C57     0843        BR    STT
0C76 290EE6 0EE6     0844   BA6  JMP   K2           JUMP TO CONT.
0C79 74              0845   L6   LIS   4            TEST FOR ROW ON/OFF
                     0846   *                         SELECTION
0C7A EC              0847        XS    S
0C7B 9404   0C80     0848        BNZ   BA7          JUMP IF ROW ON/OFF
                     0849   *                         NOT SELECTED
0C7D 290C07 0C07     0850        JMP   M2           ROW ON/OFF SELECTED GO->M2
                     0851   *                         SELECTED
0C80 79              0852   BA7  LIS   9            TEST FOR TEST MODE
                     0853   *                         SELECTION
0C81 EC              0854        XS    S
0C82 84F3   0C76     0855        BZ    BA6          JUMP IF TEST MODE
                     0856   *                         SELECTED
0C84 61              0857        LISU  1            4 DIGIT MIDDLE DISPLAY TO
                     0858   *                         BE ADVANCED
0C85 6B              0859        LISL  3
0C86 4C              0860        LR    A,S
0C87 67              0861        LISU  7
0C88 5E              0862        LR    D,A
0C89 61              0863        LISU  1
0C8A 4C              0864        LR    A,S
0C8B 67              0865        LISU  7
0C8C 5E              0866        LR    D,A
0C8D 70              0867        CLR
0C8E 5E              0868        LR    D,A
0C8F 5E              0869        LR    D,A
0C90 2607F4 07F4     0870        PI    SUBDEC       CONVERT TO DECIMAL
0C93 1A              0871        DI
0C94 47              0872        LR    A,7
0C95 53              0873        LR    3,A
0C96 46              0874        LR    A,6
0C97 52              0875        LR    2,A
0C98 63              0876        LISU  3            CHECK FOR DECIMAL PLACE
                     0877   *                         TO BE ADVANCED
0C99 6E              0878        LISL  6            SELECT DS REGISTER
0C9A 73              0879        LIS   3
0C9B FC              0880        NS    S            MASK FOR DIGIT SELECT
                     0881   *                         BITS
0C9C 54              0882        LR    4,A          STORE CODE IN R4
0C9D 61              0883        LISU  1            RESTORE C3 & C4 IN R0
                     0884   *                         & R1
0C9E 6A              0885        LISL  2
0C9F 4D              0886        LR    A,I
0CA0 50              0887        LR    0,A
0CA1 4C              0888        LR    A,S
0CA2 51              0889        LR    1,A
0CA3 70              0890        LIS   0
0CA4 E4              0891        XS    4            CHECK FOR 1000'S PLACE
                     0892   *                         SELECTED
0CA5 8422   0CC8     0893        BZ    N4           JUMP IF 1000'S PLACE
                     0894   *                         SELECTED
0CA7 71              0895        LIS   1
0CA8 E4              0896        XS    4            CHECK FOR 100'S PLACE
                     0897   *                         SELECTED
0CA9 8415   0CBF     0898        BZ    N5           JUMP IF 100'S PLACE
                     0899   *                         SELECTED
0CAB 72              0900        LIS   2
0CAC E4              0901        XS    4
0CAD 8409   0CB7     0902        BZ    N6
0CAF 71              0903        LIS   1            1'S PLACE SELECTED
0CB0 C1              0904        AS    1            ADD 1 TO C3C4
0CB1 51              0905        LR    1,A
0CB2 40              0906        LR    A,0
0CB3 19              0907        LNK
0CB4 50              0908        LR    0,A
```

```
0CB5 901A  0CD0 0909          BR      N7         JUMP TO TEST FOR ROLL
                 0910  *                          OVER
0CB7 7A          0911  N6      LIS     H'A'       ADD 10 TO C3C4
0CB8 C1          0912          AS      1
0CB9 51          0913          LR      1,A
0CBA 40          0914          LR      A,0
0CBB 19          0915          LNK
0CBC 50          0916          LR      0,A
0CBD 9012  0CD0 0917          BR      N7         JUMP TO TEST FOR ROLL
                 0918  *                          OVER
0CBF 2064        0919  N5      LI      H'64'      ADD 100 TO C3C4
0CC1 C1          0920          AS      1
0CC2 51          0921          LR      1,A
0CC3 40          0922          LR      A,0
0CC4 19          0923          LNK
0CC5 50          0924          LR      0,A
0CC6 9009  0CD0 0925          BR      N7         JUMP TO TEST FOR ROLL
0CC8 20E8        0926  N4      LI      H'E8'      ADD 1000 TO C3C4
0CCA C1          0927          AS      1
0CCB 51          0928          LR      1,A
0CCC 73          0929          LIS     3
0CCD 19          0930          LNK
0CCE C0          0931          AS      0
0CCF 50          0932          LR      0,A
0CD0 61          0933  N7      LISU    1          STORE RESULT IN C3C4
0CD1 6A          0934          LISL    2
0CD2 40          0935          LR      A,0
0CD3 5D          0936          LR      I,A
0CD4 41          0937          LR      A,1
0CD5 5C          0938          LR      S,A
0CD6 67          0939          LISU    7
0CD7 41          0940          LR      A,1
0CD8 5E          0941          LR      D,A
0CD9 40          0942          LR      A,0
0CDA 5E          0943          LR      D,A
0CDB 70          0944          CLR
0CDC 5E          0945          LR      D,A
0CDD 5E          0946          LR      D,A
0CDE 2807F4 97F4 0947         PI      SUBDEC     CONVERT TO DECIMAL
0CE1 1A          0948          DI
0CE2 61          0949          LISU    1
0CE3 6B          0950          LISL    3
                 0951  *
                 0952  *---------------------------------------
                 0953  *
                 0954  *
                 0955  *   END OF FIRST TAPE TIMER INTERRUPT
                 0956  *
                 0957  *
                 0958  *---------------------------------------
                 0959  *
0CE4 70          0960          LIS     0          CHECK FOR 9 TO 10 CARRY-
                 0961  *                          OVERS
0CE5 E4          0962          NS      4          CHECK IF 1000'S PLACE
                 0963  *                          SELECTED
0CE6 9412  0CF9 0964          BNZ     09         JUMP IF 1000'S PLACE
                 0965  *                          NOT SELECTED
0CE8 20F0        0966          LI      H'F0'      TEST IF 1000'S PLACE
                 0967  *                          ROLLED OVER
0CEA CE          0968          AS      D
0CEB 51          0969          LR      1,A
0CEC 20D8        0970          LI      H'D8'
0CEE 19          0971          LNK
0CEF CC          0972          AS      S
0CF0 50          0973          LR      0,A
0CF1 9408  0D0C 0974          BNC     P2         JUMP TO UPDATE IF BORROW
                 0975  *                          GENERATED
0CF3 40          0976  P3      LR      A,0        REPLACE WITH CORRECTED #
                 0977  *                          AFTER ROLL
0CF4 5D          0978          LR      I,A        OVER. (# WITH ROLLOVER
                 0979  *                          -10,000)
```

```
0CF5 41            0980        LR    A,1
0CF6 5C            0981        LR    S,A
0CF7 9044    0D3C  0982        BR    P2                JUMP TO UPDATE
0CF9 71            0983   09   LIS   1                 CHECK IF 100'S PLACE
                   0984   *                              SELECTED
0CFA E4            0985        XS    4
0CFB 941C    0D12  0986        BNZ   P4                JMP IF 100'S PLACE NOT SEL
0CFD 20F0          0987        LI    H'F0'             MASK FOR 1000'S PLACE
0CFF F2            0988        NS    2
0D00 52            0989        LR    2,A               1000'S PLACE MASK FOR
0D01 20F0          0990        LI    H'F0'
0D03 F6            0991        NS    6                 1000'S PLACE MASK FOR
0D04 E2            0992        XS    2
0D05 8436    0D3C  0993        BZ    P2                JUMP TO UPDATE IF NO
                   0994   *                              ROLL OVER
0D07 2018          0995        LI    H'18'             SUBTRACT 1000 FOR ROLL
                   0996   *                              OVER
0D09 CC            0997        AS    S
0D0A 5E            0998        LR    D,A
0D0B 20FC          0999        LI    H'FC'
0D0D 19            1000        LNK
0D0E CC            1001        AS    S
0D0F 5C            1002        LR    S,A               ROLL OVER ELIMINATED
0D10 902B    0D3C  1003        BR    P2                JUMP TO UPDATE
0D12 72            1004   F4   LIS   2                 CHECK FOR 10'S PLACE
                   1005   *                              SELECTED
0D13 E4            1006        XS    4
0D14 9414    0D29  1007        BNZ   P6                JUMP IF 10'S PLACE NOT
                   1008   *                              SELECTED
0D16 7F            1009        LIS   H'F'              MASK FOR 100'S PLACE
0D17 F2            1010        NS    2
0D18 52            1011        LR    2,A               100'S PLACE MASKED FOR
0D19 7F            1012        LIS   H'F'
0D1A F6            1013        NS    6                 100'S PLACE MASKED FOR
0D1B E2            1014        XS    2
0D1C 841F    0D3C  1015        BZ    P2                JUMP TO UPDATE IF NO
                   1016   *                              ROLL OVER
0D1E 209C          1017        LI    H'9C'             SUBTRACT 100 FOR ROLL
                   1018   *                              OVER
0D20 CC            1019        AS    S
0D21 5E            1020        LR    D,A
0D22 20FF          1021        LI    H'FF'
0D24 19            1022        LNK
0D25 CC            1023        AS    S
0D26 5C            1024        LR    S,A
0D27 9014    0D3C  1025        BR    P2                JUMP TO UPDATE
0D29 20F0          1026   P6   LI    H'F0'             CHECK FOR 10'S PLACE ROLL
                   1027   *                              OVER
0D2B F3            1028        NS    3
0D2C 53            1029        LR    3,A               10'S PLACE MASKED FOR
0D2D 20F0          1030        LI    H'F0'
0D2F F7            1031        NS    7                 10'S PLACE MASKED FOR
0D30 E3            1032        XS    3
0D31 840A    0D3C  1033        BZ    P2                JUMP TO UPDATE IF NO
                   1034   *                              ROLL OVER
0D33 20F6          1035        LI    H'F6'             SUBTRACT 10 FOR ROLL
                   1036   *                              OVER
0D35 CC            1037        AS    S
0D36 5E            1038        LR    D,A
0D37 20FF          1039        LI    H'FF'
0D39 19            1040        LNK
0D3A CC            1041        AS    S
0D3B 5C            1042        LR    S,A
0D3C 63            1043   P2   LISU  3                 UPDATE SELECTED FUNCTION
0D3D 6A            1044        LISL  2
0D3E 70            1045        LIS   0                 TEST FOR LO FAIL SET
                   1046   *                              SELECTION
0D3F EC            1047        XS    S
0D40 940D    0D4E  1048        BNZ   P7                JUMP IF LO FAIL SET NOT
                   1049   *                              SELECTED
```

```
0D42  2A10AA 10AA  1050        DCI   H'10AA'    STORAGE ADDRESS FOR C3 LO
                   1051   *                       FAIL SET
0D45  61           1052        LISU  1           C3 REGISTER ADDRESS
0D46  6A           1053        LISL  2
0D47  4D           1054        LR    A,I
0D48  17           1055        ST
0D49  4C           1056        LR    A,S
0D4A  17           1057        ST               LO FAIL SET UPDATED
0D4B  290EE6 0EE6  1058        JMP   K2         JUMP TO CONT.
0D4E  71           1059   P7   LIS   1          TEST FOR HI FAIL SET
0D4F  EC           1060        XS    S
0D50  940D   0D5E  1061        BNZ   P8         JUMP IF HI FAIL SET NOT
                   1062   *                       SELECTED
0D52  2A10A8 10A8  1063        DCI   H'10A8'    STORAGE ADDRESS FOR C1
                   1064   *                       HI FAIL SET
0D55  61           1065        LISU  1
0D56  6A           1066        LISL  2
0D57  4D           1067        LR    A,I
0D58  17           1068        ST
0D59  4C           1069        LR    A,S
0D5A  17           1070        ST               HI FAIL SET UPDATED
0D5B  290EE6 0EE6  1071        JMP   K2         JUMP TO CONT.
0D5E  72           1072   P8   LIS   2          TEST FOR FIELD AREA
0D5F  EC           1073        XS    S
0D60  940D   0D6E  1074        BNZ   P9         JUMP IF FIELD AREA NOT
                   1075   *                       SELECTED
0D62  2A10A4 10A4  1076        DCI   H'10A4'    STORAGE ADDRESS FOR C0
                   1077   *                       FIELD AREA
0D65  61           1078        LISU  1
0D66  6B           1079        LISL  3
0D67  4E           1080        LR    A,D
0D68  17           1081        ST
0D69  4C           1082        LR    A,S
0D6A  17           1083        ST               FIELD AREA UPDATED
0D6B  290EE6 0EE6  1084        JMP   K2         JUMP TO CONT.
0D6E  73           1085   P9   LIS   3          TEST FOR TOTAL AREA
0D6F  EC           1086        XS    S
0D70  940D   0D7E  1087        BNZ   Q1         JUMP IF TOTAL AREA NOT
                   1088   *                       SELECTED
0D72  2A10A6 10A6  1089        DCI   H'10A6'    STORAGE ADDRESS FOR LO
                   1090   *                       TOTAL AREA
0D75  61           1091        LISU  1
0D76  6B           1092        LISL  3
0D77  4E           1093        LR    A,D
0D78  17           1094        ST
0D79  4C           1095        LR    A,S
0D7A  17           1096        ST               TOTAL AREA UPDATED
0D7B  290EE6 0EE6  1097        JMP   K2         JUMP TO CONT.
0D7E  76           1098   Q1   LIS   6          TEST FOR ROW SPACE
0D7F  EC           1099        XS    S
0D80  940D   0D8E  1100        BNZ   Q2         JUMP IF ROW SPACE NOT
                   1101   *                       SELECTED
0D82  2A10AF 10AF  1102        DCI   H'10AF'    STORAGE ADDRESS FOR C0
                   1103   *                       ROW SPACE
0D85  61           1104        LISU  1
0D86  6B           1105        LISL  3
0D87  4E           1106        LR    A,D
0D88  17           1107        ST
0D89  4C           1108        LR    A,S
0D8A  17           1109        ST               ROW SPACE UPDATED
0D8B  290EE6 0EE6  1110        JMP   K2         JUMP TO CONT.
0D8E  77           1111   Q2   LIS   7          TEST FOR SEED/WT
0D8F  EC           1112        XS    S
0D90  940D   0D9E  1113        BNZ   Q3         JUMP IF SEED/WT NOT
                   1114   *                       SELECTED
0D92  2A10B1 10B1  1115        DCI   H'10B1'    STORAGE ADDRESS FOR C0
                   1116   *                       SEED/WT
0D95  61           1117        LISU  1
0D96  6B           1118        LISL  3
0D97  4E           1119        LR    A,D
0D98  17           1120        ST
```

| | | | | | | |
|---|---|---|---|---|---|---|
| 0D99 | 4C | | 1121 | | LR | A,S |
| 0D9A | 17 | | 1122 | | ST | | SEED/WT UPDATED |
| 0D9B | 290EE6 0EE6 | 1123 | | JMP | K2 | JUMP TO CONT. |
| 0D9E | 2A10B3 10B3 | 1124 | 03 | DCI | H'10B3' | DIST. CAL. SELECTED |
| 0DA1 | 61 | | 1125 | | LISU | 1 |
| 0DA2 | 6B | | 1126 | | LISL | 3 |
| 0DA3 | 4E | | 1127 | | LR | A,D |
| 0DA4 | 17 | | 1128 | | ST | |
| 0DA5 | 4C | | 1129 | | LR | A,S |
| 0DA6 | 17 | | 1130 | | ST | | DIST. CAL. UPDATED |
| 0DA7 | 290EE6 0EE6 | 1131 | | JMP | K2 | JUMP TO CONT. |
| 0DAA | 42 | | 1132 | K7 | LR | A,2 | PREPARE TO TEST IF BIT 3 SET |
| | | | 1133 | * | | |
| 0DAB | 13 | | 1134 | | SL | 1 |
| 0DAC | 8111 0DBE | 1135 | | BP | Q4 | JUMP IF BIT 3 NOT SET |
| 0DAE | 63 | | 1136 | | LISU | 3 | SELECT DS REGISTER |
| 0DAF | 6E | | 1137 | | LISL | 6 |
| 0DB0 | 73 | | 1138 | | LIS | 3 |
| 0DB1 | FC | | 1139 | | NS | S | MASK FOR BITS 0 & 1 |
| 0DB2 | 1F | | 1140 | | INC | |
| 0DB3 | 2103 | | 1141 | | NI | H'03' | ELIMINATE ANY CARRY INTO BIT 2 |
| | | | 1142 | * | | |
| 0DB5 | 50 | | 1143 | | LR | 0,A | STORE IN R0 |
| 0DB6 | 20FC | | 1144 | | LI | H'FC' |
| 0DB8 | FC | | 1145 | | NS | S | RESET BITS 0 & 1 OF DS REGISTER |
| | | | 1146 | * | | |
| 0DB9 | C0 | | 1147 | | AS | 0 | REPLACE BITS 0 & 1 WITH THOSE IN R0 |
| | | | 1148 | * | | |
| 0DBA | 5C | | 1149 | | LR | S,A | RESTORE DS CODE |
| 0DBB | 290EE6 0EE6 | 1150 | | JMP | K2 | JUMP TO CONT. |
| 0DBE | 13 | | 1151 | 04 | SL | 1 | PREPARE TO TEST IF BIT 2 SET |
| | | | 1152 | * | | |
| 0DBF | 8147 0E07 | 1153 | | BP | Q5 | JUMP IF BIT 2 NOT SET |
| 0DC1 | 63 | | 1154 | | LISU | 3 | SELECT L4 |
| 0DC2 | 6E | | 1155 | | LISL | 6 | TEST FOR OPERATE OR SET-UP MODE |
| | | | 1156 | * | | |
| 0DC3 | 74 | | 1157 | | LIS | 4 |
| 0DC4 | FC | | 1158 | | NS | S | STATUS REGISTER ACTIVATED TO L4 |
| | | | 1159 | * | | |
| 0DC5 | 8432 00F8 | 1160 | | BZ | GET | JUMP IF IN OPERATED MODE |
| | | | 1161 | * | | |
| 0DC7 | 63 | | 1162 | | LISU | 3 | SELECT S3 REGISTER |
| 0DC8 | 6A | | 1163 | | LISL | 2 |
| 0DC9 | 74 | | 1164 | | LIS | 4 | TEST FOR ROW ON/OFF SELECTION |
| | | | 1165 | * | | |
| 0DCA | EC | | 1166 | | XS | S |
| 0DCB | 942F 0DFB | 1167 | | BNZ | Q6 | JUMP IF ROW ON/OFF NOT SELECTED |
| | | | 1168 | * | | |
| 0DCD | 6F | | 1169 | | LISL | 7 | SELECT FR1 |
| 0DCE | 2018 | | 1170 | | LI | H'18' | COMPLEMENT ON/OFF BITS 3 & 4 |
| | | | 1171 | * | | |
| 0DD0 | EC | | 1172 | | XS | S |
| 0DD1 | 5C | | 1173 | | LR | S,A | RESTORE NEW FR1 CODE |
| 0DD2 | 6B | | 1174 | | LISL | 3 | SELECT C1 REGISTER |
| 0DD3 | 2A06D1 06D1 | 1175 | | DCI | TBL1 |
| 0DD6 | 4C | | 1176 | | LR | A,S |
| 0DD7 | 8E | | 1177 | | ADC | |
| 0DD8 | 16 | | 1178 | | LM | |
| 0DD9 | 50 | | 1179 | | LR | 0,A |
| 0DDA | 20F7 | | 1180 | | LI | H'F7' | TEST FOR ROW >9 |
| 0DDC | CC | | 1181 | | AS | S | C1 - 9 |
| 0DDD | 820F 0DED | 1182 | | BC | Q7 | JUMP IF ROW >9 |
| 0DDF | 2A10AC 10AC | 1183 | | DCI | H'10AC' | ROW ON/OFF 1-9 ADDRESS |
| 0DE2 | 2C | | 1184 | | XDC | |
| 0DE3 | 2A10AC 10AC | 1185 | | DCI | H'10AC' |
| 0DE6 | 40 | | 1186 | | LR | A,0 |
| 0DE7 | 8C | | 1187 | | XM | | COMPLEMENT SELECTED ROW'S CODE |
| | | | 1188 | * | | |
| 0DE8 | 2C | | 1189 | | XDC | |
| 0DE9 | 17 | | 1190 | | ST | | RESTORE NEW ROW ON/OFF CODE |
| | | | 1191 | * | | |

```
0DEA  290EE6 0EE6  1192            JMP   K2          JUMP TO CONT.
0DED  2A10AD 10AD  1193    07      DCI   H'10AD'     ROW ON/OFF 9-16 ADDRESS
0DF0  2C            1194           XDC
0DF1  2A10AD 10AD  1195            DCI   H'10AD'
0DF4  40            1196           LR    A,0
0DF5  8C            1197           XM                COMPLEMENT SELECTED
              1198  *                                  ROW'S CODE
0DF6  2C            1199           XDC
0DF7  17            1200           ST                RESTORE NEW ROW ON/OFF
              1201  *                                  CODE
0DF8  290EE6 0EE6  1202   GET      JMP   K2
0DFB  79            1203    06     LIS   9           TEST FOR TEST MODE
              1204  *                                  SELECTION
0DFC  EC            1205           XS    S
0DFD  94FA   00F8  1206           BNZ    GET         JUMP TO CONT. (IGNORE)
0DFF  6F            1207           LISL  7           SELECT FR1
0E00  2060          1208           LI    H'60'       COMPLEMENT CONSOLE/
              1209  *                                  SENSOR BITS 5 & 6
0E02  EC            1210           XS    S
0E03  5C            1211           LR    S,A         RESTORE NEW FR1 CODE
0E04  290EE6 0EE6  1212           JMP    K2          JUMP TO CONT.
0E07  13            1213    05     SL    1           PREPARE TO TEST IF BIT
              1214  *                                  1 SET
0E08  8148   0E51  1215           BP     DA9         JUMP IF BIT 1 NOT SET
0E0A  63            1216           LISU   3          SELECT L4
0E0B  6E            1217           LISL   6          TEST FOR OPERATE OR
              1218  *                                  SET-UP MODE
0E0C  74            1219           LIS    4
0E0D  FC            1220           NS     S          STATUS REGISTER ACTIVATED
              1221  *                                  TO L4
0E0E  9420   0E2F  1222           BNZ    09          JUMP IF IN SET-UP MODE
0E10  63            1223           LISU   4          SELECT FR2
0E11  6F            1224           LISL   7
0E12  72            1225           LIS    2
0E13  FC            1226           NS     S          MASK FOR BIT 1
0E14  8414   0E29  1227           BZ     R1          JUMP IF S2 TO BE
              1228  *                                  DISPLAYED BUT NOT
              1229  *                                  ADVANCED
0E16  63            1230           LISU   3          SELECT S2
0E17  69            1231           LISL   1
0E18  4C            1232           LR     A,S
0E19  1F            1233           INC               INCREMENT TO NEXT
              1234  *                                  SELECTION
0E1A  5C            1235           LR     S,A
0E1B  76            1236           LIS    6
0E1C  EC            1237           XS     S
0E1D  9403   0E21  1238           BNZ    R2
0E1F  70            1239           CLR
0E20  5C            1240           LR     S,A
0E21  62            1241    R2     LISU   2          SET T1 FOR DISPLAY
              1242  *                                  BLANKING TIME
0E22  6D            1243           LISL   5
0E23  207E          1244           LI     H'7E'
0E25  5C            1245           LR     S,A        T1 SET FOR 2 SECONDS
0E26  290EE6 0EE6  1246           JMP    K2          JUMP TO CONT.
0E29  4C            1247    R1     LR     A,S        FR2 CODE TO ACC.
0E2A  2202          1248           OI     H'02'      SET BIT 1
0E2C  5C            1249           LR     S,A        RESTORE NEW FR2 CODE
0E2D  90F3   0E21  1250           BR     R2
0E2F  63            1251    09     LISU   3          SELECT S3
0E30  6A            1252           LISL   2
0E31  72            1253           LIS    2          TEST FOR FIELD AREA
              1254  *                                  SELECTION
0E32  EC            1255           XS     S
0E33  9409   0E3D  1256           BNZ    R3          JUMP IF FIELD AREA NOT
              1257  *                                  SELECTED
0E35  2A10A4 10A4  1258           DCI    H'10A4'     RESET FIELD AREA STORAGE
              1259  *                                  REGISTERS
0E38  70            1260           CLR
0E39  17            1261           ST
```

| | | | | | | |
|---|---|---|---|---|---|---|
| 0E3A | 17 | | | 1262 | | ST | | FIELD AREA STORAGE REGISTERS RESET |
| | | | | 1263 | * | | | |
| 0E3B | 900B | | 0E47 | 1264 | | BR | R4 | |
| 0E3D | 73 | | | 1265 | R3 | LIS | 3 | TEST FOR TOTAL AREA SELECTION |
| | | | | 1266 | * | | | |
| 0E3E | FC | | | 1267 | | XS | S | |
| 0E3F | 9412 | | 0E53 | 1268 | | BNZ | R5 | JUMP IF TOTAL AREA NOT SELECTED |
| | | | | 1269 | * | | | |
| 0E41 | 2A10A6 | 10A6 | | 1270 | | DCI | H'10A6' | RESET FIELD AREA STORAGE REGISTERS |
| | | | | 1271 | * | | | |
| 0E44 | 70 | | | 1272 | | CLR | | |
| 0E45 | 17 | | | 1273 | | ST | | |
| 0E46 | 17 | | | 1274 | | ST | | |
| 0E47 | 6F | | | 1275 | R4 | LISL | 7 | SELECT FR1 REGISTER |
| 0E48 | 20FE | | | 1276 | | LI | H'FE' | |
| 0E4A | FC | | | 1277 | | NS | S | RESET BIT 0 |
| 0E4B | 2202 | | | 1278 | | OI | H'02' | SET BIT 1 |
| 0E4D | 5C | | | 1279 | | LR | S,A | RESTORE NEW FR1 CODE |
| 0E4E | 290EE6 | 0EE6 | | 1280 | | JMP | K2 | JUMP TO CONT. |
| 0E51 | 903F | | 0E91 | 1281 | G09 | BR | Q8 | |
| 0E53 | 78 | | | 1282 | R5 | LIS | 8 | TEST FOR DIST. CAL. SELECTION |
| | | | | 1283 | * | | | |
| 0E54 | EC | | | 1284 | | XS | S | |
| 0E55 | 941A | | 0E70 | 1285 | | BNZ | GOT | JUMP IF DIST. CAL. NOT SELECTED (IGNOR) |
| | | | | 1286 | * | | | |
| 0E57 | 63 | | | 1287 | | LISU | 3 | SELECT FR1 REGISTER |
| 0E58 | 6F | | | 1288 | | LISL | 7 | |
| 0E59 | 74 | | | 1289 | | LIS | 4 | TEST IF CALIBRATE SET |
| 0E5A | FC | | | 1290 | | NS | S | |
| 0E5B | 9417 | | 0E73 | 1291 | | BNZ | R6 | JUMP IF CALIBRATE SET |
| 0E5D | 4C | | | 1292 | | LR | A,S | |
| 0E5E | 2204 | | | 1293 | | OI | H'04' | SET BIT 2 |
| 0E60 | 21FE | | | 1294 | | NI | H'FE' | RESET BIT 0 |
| 0E62 | 5C | | | 1295 | | LR | S,A | RESTORE NEW FR1 CODE |
| 0E63 | 20A7 | | | 1296 | | LI | H'A7' | RESET AC CHIP INPUT #20 |
| | | | | 1297 | * | | | CO |
| 0E65 | 54 | | | 1298 | | LR | 4,A | |
| 0E66 | 57 | | | 1299 | | LISU | 7 | |
| 0E67 | 2807E0 | 07E0 | | 1300 | | PI | SUBACK | |
| 0E6A | 1A | | | 1301 | | DI | | |
| 0E6B | 34 | | | 1302 | | DS | 4 | |
| 0E6C | 2807E0 | 07E0 | | 1303 | | PI | SUBACK | |
| 0E6F | 1A | | | 1304 | | DI | | |
| 0E70 | 290EE6 | 0EE6 | | 1305 | GOT | JMP | K2 | JUMP TO CONT. |
| 0E73 | 4C | | | 1306 | R6 | LR | A,S | |
| 0E74 | 2201 | | | 1307 | | OI | H'01' | SET BIT 0 |
| 0E76 | 21FB | | | 1308 | | NI | H'FB' | RESET BIT 2 |
| 0E78 | 5C | | | 1309 | | LR | S,A | RESTORE NEW FR1 CODE |
| 0E79 | 2A10B3 | 10B3 | | 1310 | | DCI | H'10B3' | STORAGE ADDRESS FOR DIST. CAL |
| | | | | 1311 | * | | | |
| 0E7C | 2027 | | | 1312 | | LI | H'27' | READ CO AC CHIP DIST. ACCUMULATION |
| | | | | 1313 | * | | | |
| 0E7E | 54 | | | 1314 | | LR | 4,A | |
| 0E7F | 60 | | | 1315 | | LISU | 0 | |
| 0E80 | 69 | | | 1316 | | LISL | 1 | |
| 0E81 | 2807E0 | 07E0 | | 1317 | | PI | SUBACK | |
| 0E84 | 1A | | | 1318 | | DI | | |
| 0E85 | 34 | | | 1319 | | DS | 4 | |
| 0E86 | 2807E0 | 07E0 | | 1320 | | PI | SUBACK | |
| 0E89 | 1A | | | 1321 | | DI | | |
| 0E8A | 40 | | | 1322 | | LR | A,0 | |
| 0E8B | 17 | | | 1323 | | ST | | |
| 0E8C | 41 | | | 1324 | | LR | A,1 | |
| 0E8D | 17 | | | 1325 | | ST | | |
| 0E8E | 290EE6 | 0EE6 | | 1326 | | JMP | K2 | JUMP TO CONT. |
| 0E91 | 13 | | | 1327 | Q8 | SL | 1 | PREPARE TO TEST IF BIT 0 SET |
| | | | | 1328 | * | | | |
| 0E92 | 8153 | | 0EE6 | 1329 | | BP | K2 | JUMP IF BIT 0 NOT SET |
| 0E94 | 63 | | | 1330 | | LISU | 3 | SELECT L4 |
| 0E95 | 6E | | | 1331 | | LISL | 6 | |

| | | | | | | |
|---|---|---|---|---|---|---|
| 0E96 | 74 | | 1332 | | LIS | 4 | TEST FOR OPERATE OR SET UP MODE |
| | | | 1333 | * | | | |
| 0E97 | FC | | 1334 | | NS | S | STATUS REGISTER ACTIVATED TO L4 |
| | | | 1335 | * | | | |
| 0E98 | 9430 | 0EC9 | 1336 | | BNZ | S2 | JUMP IF IN SET-UP MODE |
| 0E9A | 63 | | 1337 | | LISU | 3 | SELECT S2 |
| 0E9B | 69 | | 1338 | | LISL | 1 | |
| 0E9C | 70 | | 1339 | | LIS | 0 | TEST FOR SPEED SELECTION |
| 0E9D | EC | | 1340 | | XS | S | |
| 0E9E | 8447 | 0EE6 | 1341 | | BZ | K2 | JUMP IF SPEED SELECTED (IGNOR) |
| | | | 1342 | * | | | |
| 0EA0 | 71 | | 1343 | | LIS | 1 | TEST FOR AREA SELECTION |
| 0EA1 | EC | | 1344 | | XS | S | |
| 0EA2 | 9409 | 0EAC | 1345 | | BNZ | S3 | JUMP IF AREA NOT SELECTED |
| 0EA4 | 64 | | 1346 | | LISU | 4 | SELECT FR2 REGISTER |
| 0EA5 | 6F | | 1347 | | LISL | 7 | |
| 0EA6 | 2018 | | 1348 | | LI | H'18' | |
| 0EA8 | EC | | 1349 | | XS | S | COMPLEMENT BITS 3 & 4 |
| 0EA9 | 5C | | 1350 | | LR | S,A | RESTORE NEW CODE IN FR2 |
| 0EAA | 903B | 0EE6 | 1351 | | BR | K2 | JUMP TO CONT. |
| 0EAC | 64 | | 1352 | S3 | LISU | 4 | SELECT FR2 |
| 0EAD | 6F | | 1353 | | LISL | 7 | |
| 0EAE | 71 | | 1354 | | LIS | 1 | |
| 0EAF | FC | | 1355 | | NS | S | MASK FOR BIT 0 |
| 0EB0 | 8413 | 0EC4 | 1356 | | BZ | S4 | JUMP IF NOT TO BE INCREMENTED YET |
| | | | 1357 | * | | | |
| 0EB2 | 63 | | 1358 | | LISU | 3 | SELECT S1 REGISTER |
| 0EB3 | 68 | | 1359 | | LISL | 0 | |
| 0EB4 | 4C | | 1360 | | LR | A,S | |
| 0EB5 | 1F | | 1361 | | INC | | INCREMENT S1 |
| 0EB6 | 5C | | 1362 | | LR | S,A | RESTORE S1 |
| 0EB7 | 73 | | 1363 | | LIS | 3 | |
| 0EB8 | EC | | 1364 | | XS | S | TEST FOR ROLL OVER |
| 0EB9 | 9403 | 0EBD | 1365 | | BNZ | S5 | JUMP IF OK |
| 0EBB | 70 | | 1366 | | CLR | | |
| 0EBC | 5C | | 1367 | | LR | S,A | START OVER WITH SCAN |
| 0EBD | 62 | | 1368 | S5 | LISU | 2 | SET T1 FOR DISPLAY BLANKING TIME |
| | | | 1369 | * | | | |
| 0EBE | 6D | | 1370 | | LISL | 5 | |
| 0EBF | 2073 | | 1371 | | LI | H'73' | |
| 0EC1 | 5C | | 1372 | | LR | S,A | T1 SET FOR 2 SECONDS |
| 0EC2 | 9023 | 0EE6 | 1373 | | BR | K2 | JUMP TO CONT. |
| 0EC4 | 71 | | 1374 | S4 | LIS | 1 | |
| 0EC5 | CC | | 1375 | | AS | S | |
| 0EC6 | 5C | | 1376 | | LR | S,A | BIT 0 OF FR2 SET |
| 0EC7 | 90F5 | 0EBD | 1377 | | BR | S5 | |
| 0EC9 | 64 | | 1378 | S2 | LISU | 4 | SELECT FR2 |
| 0ECA | 6F | | 1379 | | LISL | 7 | |
| 0ECB | 74 | | 1380 | | LIS | 4 | |
| 0ECC | FC | | 1381 | | NS | S | MASK FOR BIT 2 |
| 0ECD | 8413 | 0EE1 | 1382 | | BZ | S6 | JUMP IF NOT TO BE INCREMENTED YET |
| | | | 1383 | * | | | |
| 0ECF | 63 | | 1384 | | LISU | 3 | SELECT S3 REGISTER |
| 0ED0 | 6A | | 1385 | | LISL | 2 | |
| 0ED1 | 4C | | 1386 | | LR | A,S | |
| 0ED2 | 1F | | 1387 | | INC | | INCREMENT S3 |
| 0ED3 | 5C | | 1388 | | LR | S,A | RESTORE S3 |
| 0ED4 | 7A | | 1389 | | LIS | H'A' | |
| 0ED5 | EC | | 1390 | | XS | S | TEST FOR ROLL OVER |
| 0ED6 | 9403 | 0EDA | 1391 | | BNZ | S7 | JUMP IF OK |
| 0ED8 | 70 | | 1392 | | CLR | | |
| 0ED9 | 5C | | 1393 | | LR | S,A | START OVER WITH SCAN |
| 0EDA | 62 | | 1394 | S7 | LISU | 2 | SET T1 FOR DISPLAY BLANKING TIME |
| | | | 1395 | * | | | |
| 0EDB | 6D | | 1396 | | LISL | 5 | |
| 0EDC | 207E | | 1397 | | LI | H'7E' | |
| 0EDE | 5C | | 1398 | | LR | S,A | T1 SET FOR 2 SECONDS |
| 0EDF | 9006 | 0EE6 | 1399 | | BR | K2 | JUMP TO CONT. |
| 0EE1 | 74 | | 1400 | S6 | LIS | 4 | |
| 0EE2 | CC | | 1401 | | AS | S | |
| 0EE3 | 5C | | 1402 | | LR | S,A | BIT 2 OF FR2 SET |
| 0EE4 | 90F5 | 0EDA | 1403 | | BR | S7 | |

```
0EE6  2A10B9 10B9  1404  K2    DCI   H'10B9'
0EE9  60            1405        LISU  0
0EEA  68            1406        LISL  0
0EEB  16            1407  RS1   LM                   RESTORE R0 THRU R6
0EEC  5D            1408        LR    J,A
0EED  8FFD  0EEB    1409        BR7   RS1
0EEF  16            1410        LM                   RESTORE R7
0EF0  57            1411        LR    7,A
0EF1  16            1412        LM                   RESTORE R9
0EF2  65            1413        LISU  5
0EF3  6C            1414        LISL  4
0EF4  5E            1415        LR    D,A
0EF5  16            1416  RS2   LM                   RESTORE R50 THRU R53
0EF6  5E            1417        LR    D,A
0EF7  8FFD  0EF5    1418        BR7   RS2
0EF9  66            1419        LISU  6
0EFA  6B            1420        LISL  3
0EFB  16            1421  RS3   LM                   RESTORE R60 THRU R63
0EFC  5E            1422        LR    D,A
0EFD  8FFD  0EFB    1423        BR7   RS3
0EFF  67            1424        LISU  7
0F00  6B            1425        LISL  3
0F01  16            1426  RS4   LM                   RESTORE R70 THRU R73
0F02  5E            1427        LR    D,A
0F03  8FFD  0F01    1428        BR7   RS4
0F05  00            1429        LR    A,KU
0F06  5E            1430        LR    D,A             STORE ROW FAIL REGISTER
0F07  01            1431        LR    A,KL
0F08  5D            1432        LR    J,A
0F09  16            1433        LM
0F0A  04            1434        LR    KU,A
0F0B  16            1435        LM                   RECALL PC1
0F0C  05            1436        LR    KL,A
0F0D  09            1437        LR    P,K             PC1 RESTORED
0F0E  4E            1438        LR    A,D
0F0F  04            1439        LR    KU,A
0F10  4C            1440        LR    A,S
0F11  05            1441        LR    KL,A            ROW FAIL REGISTER RESTORE
0F12  16            1442        LM
0F13  59            1443        LR    9,A
0F14  1D            1444        LR    W,J
0F15  C5            1445        LISU  5
0F16  6C            1446        LISL  4
0F17  4C            1447        LR    A,S
0F18  59            1448        LR    9,A
0F19  0F            1449        LR    DC,Q
0F1A  2C            1450        XDC
0F1B  2A10B7 10B7   1451        DCI   H'10B7'
0F1E  16            1452        LM
0F1F  06            1453        LR    QU,A
0F20  16            1454        LM
0F21  07            1455        LR    QL,A
0F22  0F            1456        LR    DC,Q
0F23  41            1457        LR    A,1
0F24  0B            1458        LR    IS,A            RESTORE SAVED ISAR
0F25  40            1459        LR    A,0             RESTORE SAVED ACC
0F26  1B            1460        EI                    ENABLE INTERUPT
0F27  1C            1461        POP                   RELAX UNTIL NEXT 25.6
                    1462        *                     MSEC
      06D1          1463  TDL1  EQU   H'6D1'
      06E2          1464  SUBMUL EQU  H'6E2'
      0730          1465  SUBDIV EQU  H'730'
      078F          1466  SUBPLS EQU  H'78F'
      07A2          1467  SUBMIN EQU  H'7A2'
      07B9          1468  SUBOUT EQU  H'7B9'
      07E0          1469  SUBACK EQU  H'7E0'
      07F4          1470  SUBDEC EQU  H'7F4'
                    1471        END
00 ERRS
```

While a specific embodiment of the present invention has been illustrated and described herein, the invention is not limited thereto. On the contrary, the invention includes such changes, alternatives and modifications as may become apparent to those skilled in the art, insofar as such changes, alternatives and modifications fall within the spirit and scope of the appended claims.

The invention is claimed as follows:

1. A monitoring apparatus for monitoring a plurality of functions of a multi-row field seed planting machine including ground speed sensor means and including seed sensor means associated with each row of said multi-row seed planting machine, comprising: means including a microprocessor operating in accordance with a predetermined program for continually receiving and storing population data simultaneously from all of said plurality of seed sensor means and from said ground speed sensor means, and user accessible control means coupled with said microprocessor and including observable indicator means, the microprocessor including means for energizing said observable indicator means for producing observable indications derived from the population data substantially immediately as such indications are called for by said user accessible control means.

2. A monitoring apparatus according to claim 1 wherein said microprocessor includes receiving and storing control means which operates in accordance with said predetermined program in a predetermined time cycle for taking sequential population data readings, for storing a predetermined plural number of said sequential readings, and for eliminating the earliest taken of said population data readings as the latest taken reading is stored.

3. A monitoring apparatus according to claim 2 wherein said microprocessor includes averaging means which operates in accordance with said predetermined program and in response to commands from said user accessible control means for calculating the average values of data derived from said stored population data readings.

4. A monitoring apparatus according to claim 1 or claim 3 wherein said user accessible control means includes means for providing input data to said microprocessor means representative of machine characteristics of a given machine whose functions are to be monitored, said microprocessor including means operating in accordance with the predetermined program for customizing the program to accommodate said given machine whose functions are to be monitored and for calculating further machine functions in accordance with said machine characteristics.

5. A monitoring apparatus according to claim 1 or claim 3 wherein said user accessible control means further includes means for delivering input data to said microprocessor corresponding to predetermined high and low limits for the respective functions to be monitored, said microprocessor including means for operating in accordance with said predetermined program for customizing the program to receive said high and low limits.

6. A monitoring apparatus according to claim 5 wherein said observable indicator means include means responsive to said microprocessor, in accordance with said predetermined program, for producing an observable indication in the event any detected one of the respective functions being monitored fails to fall within said predetermined high and low limits.

7. A monitoring apparatus for use with a multi-row seed planting machine comprising an electronic circuit including means for simultaneously and continually detecting data corresponding to the planting of seeds in all rows of said multi-row planting machine and means for storing the detected data.

8. A monitoring apparatus according to claim 7 wherein said electronic circuit includes means operating in a predetermined cycle for recording samples of said data corresponding to the number of seeds planted over successive predetermined intervals of distance travelled by the planting mahcine, and further includes means for storing a predetermined plural number of said recorded data samples and for eliminating the earliest stored of said samples upon reception of the latest sample to be stored.

9. A monitoring apparatus according to claim 8 wherein said electronic circuit means further includes means for averaging said stored data samples and means for producing an observable indication of said average.

10. A monitoring apparatus for a multi-row seed planting machine, comprising: a plurality of seed sensor means respectively associated with each row of said multi-row planting machine and each for providing a seed signal responsive to the planting of each seed in the associated row, electronic circuit means for continually and simultaneously receiving and storing a cumulative count of the seed signals from all of said sensor means, distance measuring means for producing distance signals corresponding to the distance travelled by the planting machine over the ground, said electronic circuit means being further responsive to said distance signals for storing successive cumulative counts of said seed signals occurring in each row within successive predetermined increments of distance travelled by said planting apparatus, display means, and control means accessible to an operator for causing said electronic circuit means to energize said display means for producing an observable indication of the seed population for each row in seeds per unit distance, and an observable indication of the identity of the row whose seed population is being displayed.

11. A monitoring apparatus according to claim 10 wherein said operator accessible control means further includes means for delivering a row spacing signal and a number of rows signal to said electronic circuit means, corresponding respectively to the number of planting units of the multi-row planting machine and the spacing between said planting units, said electronic circuit means further including means for calculating total seed population planted based both upon the seed count in each row and upon the total seed count in all rows and for energizing said display means, upon command from said operator accessible control means, to produce an observable indication of the seed population being planted in seeds per unit area based upon the seed count in each row of said multi-row planting machine, and based upon the total seed count for all rows of the planting machine.

12. A monitoring apparatus according to claim 11 wherein said electronic circuit means further includes means for storing a predetermined plural number of said population calculations made over sequentially occurring ones of said predetermined increments of distance, and for energizing said display means, upon command from the operator accessible control means, to produce an observable indication of the average of said population calculations based upon the seed count in each row of said multi-row planting machine.

13. A monitoring apparatus according to claim 12 wherein said electronic circuit means is further adapted to energize said display means for producing an observable indication corresponding to the average seed population planted by all of said rows of said multi-row planting machine.

14. A monitoring apparatus according to claim 13 wherein said operator accessible control means further includes means for delivering limit signal means to said electronic circuit means corresponding to desired maximum and minimum seed populations per unit area to be planted, and said electronic circuit means includes means for energizing said display means to provide an observable indication of any row of said multi-row planting machine failing to achieve a planted seed population within said maximum and minimum desired populations, in the event that any of said rows fails to plant a population within said desired maximum and minimum limits.

15. A monitoring apparatus according to claim 10 or claim 14 wherein said electronic circuit means comprises a microprocessor operating in accordance with a predetermined program.

16. A special purpose computer operating in accordance with a predetermined program for continually and simultaneously determining the actual seed population planted in each row of a multi-row seed planting machine while the planting machine is travelling over any given distance, and for producing an observable indication of seed planting to an operator of said multi-row seed planting machine.

17. A monitoring apparatus for a seed planting machine having seed sensing means for producing a seed signal for each seed delivered to the ground to be planted and distance sensor means for providing distance signals corresponding to the distance travelled by the planting machine over the ground, said monitoring apparatus comprising: microprocessor means operating in accordance with a predetermined program for receiving said storing said seed signals and said distance signals and including means for counting the number of said seed signals which are received over a predetermined increment of travel as determined by said distance signals, means for calculating seed population planted in seeds per acre and means for storing a predetermined plural number of said population calculations made over sequential ones of said increments of distance, display means, and means for energizing said display means to produce an observable indication corresponding to the average of said stored calculated seed populations.

18. A monitoring apparatus according to claim 17 wherein said monitoring apparatus further includes operator accessible control means, and said microprocessor includes means responsive to operation of said operator accessible control means for receiving and storing data corresponding to predetermined high and low limits for the values of said seed population.

19. A monitoring apparatus according to claim 18 wherein said microprocessor includes means for energizing said display means to produce an observable indication of the seed population calculation currently being stored if the population fails to fall within said predetermined maximum and minimum limits, and to produce said observable indication of said average taking into account only ones of said stored seed population calculations which fall within said predetermined high and low limits.

20. A monitoring apparatus for a seed planting machine including seed sensor means for producing a seed signal in response to delivery of a seed to the ground to be planted and distance sensing means for producing distance signals corresponding to the distance travelled by the seed planting machine over the ground, said monitoring apparatus comprising: microprocessor means operating in accordance with a predetermined program and including means for modifying said predetermined program to achieve customizing of the monitoring apparatus for use with a given seed planting machine, said last-mentioned means including operator accessible control means for delivering signals to said microprocessor for modifying said program to receive data corresponding to the number of rows simultaneously planted by said multi-row seed planting machine and data corresponding to the spacing between adjacent ones of said rows.

21. A monitoring apparatus according to claim 20 wherein said operator accessible control means further includes means for delivering data to said microprocessor for modifying said program in accordance with a desired number of rows to be planted, when said desired number is less than the total rows simultaneously planted by the seed planting machine, and said microprocessor includes means for ceasing to respond to seed signals from those rows not selected as desired rows.

22. A monitoring apparatus for a seed planting machine including seed sensor means for producing a seed signal in response to each seed planted, and distance sensor means for producing distance signals corresponding to given increments of distance travelled by the seed planting machine, said monitoring apparatus comprising: microprocessor means for operating in accordance with a predetermined program for receiving and storing said seed signals and said distance signals, and operator accessible control means for delivering data to said microprocessor corresponding to the weight of a predetermined number of the particular seeds being planted, said microprocessor further including means for calculating the weight of seeds planted per unit of area, and display means responsive to said microprocessor means for producing an observable indication of the weight of seeds planted per unit area.

23. A monitoring apparatus for a seed planting machine including seed sensor means for producing a seed signal in response to each seed planted and distance sensor means for producing a distance pulse signal for each predetermined increment of distance travelled by said seed planting machine, said monitoring apparatus comprising: a microprocessor operating in accordance with a predetermined program to receive and store said seed signals and said distance pulse signals, and operator accessible control means for delivering data to said microprocessor corresponding to the number of pulses produced by said distance sensor means in response to travel over a predetermined increment of distance, said microprocessor including means for calculating the number of seeds dispensed per unit distance travelled by the seed planting machine, in accordance with the particular distance sensor means associated with the seed planting machine.

24. A monitoring apparatus according to claim 23 wherein said operator accessible control means includes a selectively actuatable means, said microprocessor means including means responsive to a first actuation of said selectively actuatable means for counting said distance pulses starting from zero, and further responsive to a subsequent actuation of said selectively actuatable means for ceasing said counting of said distance pulses and storing the theretofore accumulated count of said distance pulses and for calculating therefrom the number of distance pulses produced by the distance sensor per predetermined increment distance travelled, whereby, when the operator actuates said selectively actuatable control means at the beginning and end of travel, respectively, of said seed planting machine over said predetermined increment of distance, the microprocessor is programmed to operate with the given distance sensor means associated with the seed planting machine.

* * * * *

UNITED STATES PATENT AND TRADEMARK OFFICE
CERTIFICATE OF CORRECTION

PATENT NO. : 4,225,930
DATED : September 30, 1980
INVENTOR(S) : DAVID E. STEFFEN It is certified that error appears in the above-identified patent and that said Letters Patent are hereby corrected as shown below:

In the Abstract, line 3, change "plating" to --planting--;

Column 14, line 2, after "anode" insert --connected--;

Column 16, line 44, change "supplied" to --supplies--;

Column 112, line 12, change "mahcine" to --machine--;

Column 113, line 42, change first occurrence of "said"

to --and--.

Signed and Sealed this

Sixth Day of January 1981

[SEAL]

Attest:

SIDNEY A. DIAMOND

Attesting Officer

Commissioner of Patents and Trademarks